(12) United States Patent
Park et al.

(10) Patent No.: US 11,855,927 B2
(45) Date of Patent: Dec. 26, 2023

(54) METHOD AND APPARATUS FOR SCHEDULING IN COMMUNICATION SYSTEM SUPPORTING ULTRA-HIGH FREQUENCY AND ULTRA-WIDE BAND

(71) Applicant: ELECTRONICS AND TELECOMMUNICATIONS RESEARCH INSTITUTE, Daejeon (KR)

(72) Inventors: Soon Gi Park, Daejeon (KR); Jun Sik Kim, Daejeon (KR); Heesoo Lee, Daejeon (KR); Seok Bong Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 17/523,307

(22) Filed: Nov. 10, 2021

(65) Prior Publication Data
US 2022/0158806 A1    May 19, 2022

(30) Foreign Application Priority Data

Nov. 18, 2020  (KR) .................. 10-2020-0155006
Oct. 26, 2021  (KR) .................. 10-2021-0143940

(51) Int. Cl.
*H04L 5/00*     (2006.01)
*H04B 1/00*     (2006.01)
(Continued)

(52) U.S. Cl.
CPC ......... *H04L 5/0073* (2013.01); *H04B 1/0064* (2013.01); *H04B 7/043* (2013.01);
(Continued)

(58) Field of Classification Search
CPC ............... H04L 5/0073; H04W 72/23; H04W 72/0453; H04W 72/046; H04W 16/28;
(Continued)

(56) References Cited

U.S. PATENT DOCUMENTS 8,867,646 B2   10/2014  Clerckx et al.
10,057,025 B2   8/2018  Park et al.
(Continued)

FOREIGN PATENT DOCUMENTS

JP         2018-037916 A    3/2018
KR    10-2009-0101729 A    9/2009
(Continued)

OTHER PUBLICATIONS

KIPO Office Action, dated Sep. 8, 2022, for Korean Patent Application No. 10-2021-0143940 which corresponds to the above-identified U.S. application.

*Primary Examiner* — Mewale A Ambaye
(74) *Attorney, Agent, or Firm* — LRK PATENT LAW FIRM

(57) ABSTRACT

An operation method of a central control apparatus in a communication system may include: configuring a unit cluster using a first transceiver and a second transceiver; performing first scheduling so that at least one port among N ports of the first transceiver and M ports of the second transceiver provides communication services to a service coverage of the unit cluster for each scheduling period in a beam sweeping scheme by using a first sub-frequency band; generating first scheduling information including information on identifiers of transceivers and indexes of ports proving the communication services for each scheduling period according to the first scheduling, and transmitting the first scheduling information to the terminal; and controlling the first transceiver and the second transceiver to commu- (Continued)

nicate with the terminal according to the first scheduling information.

15 Claims, 108 Drawing Sheets

(51) Int. Cl.
 *H04W 72/044* (2023.01)
 *H04B 7/0426* (2017.01)
 *H04W 72/0453* (2023.01)
 *H04W 72/23* (2023.01)

(52) U.S. Cl.
 CPC ..... *H04W 72/046* (2013.01); *H04W 72/0453* (2013.01); *H04W 72/23* (2023.01)

(58) Field of Classification Search
 CPC ... H04B 1/0064; H04B 1/0053; H04B 7/0695
 See application file for complete search history.

(56) References Cited

U.S. PATENT DOCUMENTS

| | | | |
|---|---|---|---|
| 10,237,887 | B2 | 3/2019 | Jung et al. |
| 10,667,144 | B2 | 5/2020 | Xu et al. |
| 10,687,222 | B2 | 6/2020 | Shimizu et al. |
| 10,833,736 | B2 | 11/2020 | Hong et al. |
| 11,304,072 | B2 | 4/2022 | Siomina et al. |
| 2018/0083680 | A1* | 3/2018 | Guo ................. H04B 7/088 |
| 2018/0167979 | A1* | 6/2018 | Guo ................. H04W 74/0833 |
| 2018/0287682 | A1* | 10/2018 | Kwak ................. H04L 5/0057 |
| 2019/0007957 | A1* | 1/2019 | Chae ................. H04W 72/0446 |
| 2019/0116605 | A1 | 4/2019 | Luo et al. |
| 2019/0174346 | A1 | 6/2019 | Murray et al. |
| 2019/0280834 | A1 | 9/2019 | Joseph et al. |
| 2020/0177242 | A1 | 6/2020 | Kim et al. |
| 2021/0266982 | A1 | 8/2021 | Guo et al. |
| 2022/0038225 | A1* | 2/2022 | Chendamarai Kannan ................. H04L 5/0007 |

FOREIGN PATENT DOCUMENTS

| | | | | |
|---|---|---|---|---|
| KR | 10-2019-0085520 A | | 7/2019 | |
| KR | 10-2020-0080305 A | | 7/2020 | |
| WO | WO-2019133048 A1 | * | 7/2019 | ........... H04B 17/318 |

* cited by examiner

METHOD AND APPARATUS FOR SCHEDULING IN COMMUNICATION SYSTEM SUPPORTING ULTRA-HIGH FREQUENCY AND ULTRA-WIDE BAND

CROSS-REFERENCE TO RELATED APPLICATIONS

This application claims priority to Korean Patent Applications No. 10-2020-0155006 filed on Nov. 18, 2020, and No. 10-2021-0143940 filed on Oct. 26, 2021 with the Korean Intellectual Property Office (KIPO), the entire contents of which are hereby incorporated by reference.

BACKGROUND

1. Technical Field

The present disclosure relates to a scheduling technique, and more particularly, to a scheduling technique based on clustering in a communication system supporting an ultra-high frequency and ultra-wide band.

2. Description of Related Art

The communication system (e.g., new radio (NR) communication system or 6G communication system) using a higher frequency band (e.g., frequency band of 6 GHz or above) than a frequency band (e.g., frequency band of 6 GHz or below) of the long term evolution (LTE) communication system (or, LTE-A communication system) is being considered for processing of soaring wireless data. The NR communication system and/or 6G communication system may support not only a frequency band of 6 GHz or below, but also a frequency band of 6 GHz or above, and may support various communication services and scenarios compared to the LTE system. For example, usage scenarios of the NR communication system may include enhanced Mobile BroadBand (eMBB), Ultra Reliable Low Latency Communication (URLLC), and Massive Machine Type Communication (mMTC).

Meanwhile, it may be important to secure a new frequency band so that the communication system can handle the wireless data transmission capacity required in the future. The radio wave propagation characteristics (reflection/diffraction/refraction/transmission, etc.) when using ultra-high frequency (e.g., terahertz) and ultra-wide bands and the radio wave propagation characteristics when using an existing cellular frequency band may be different from each other.

The communication system may use a beamforming scheme to reduce a free space loss proportional to a square of a frequency as the frequency increases. When the communication system uses a high frequency band, blocking may occur due to the strong straightness of radio waves, but spatial interference may not spread due to the strong straightness of the radio waves. Accordingly, the communication system may simultaneously use a large number of beams to secure a coverage of communication services. Also, the communication system may use a beam sweeping scheme. In the beam sweeping scheme, beams may be temporally and spatially separated. As a result, in order for the communication system to use ultra-high frequency bands, it may be required to change configurations and operations of the existing radio access network.

SUMMARY

Accordingly, exemplary embodiments of the present disclosure are directed to providing a method and an apparatus for scheduling based on clustering in a communication system supporting an ultra-high frequency and ultra-wide band.

According to a first exemplary embodiment of the present disclosure, an operation method of a central control apparatus in a communication system may comprise: configuring a unit cluster using a first transceiver and a second transceiver, the first transceiver and the second transceiver being connected to the central control apparatus; performing first scheduling so that at least one port among N ports of the first transceiver and M ports of the second transceiver provides communication services to a service coverage of the unit cluster for each scheduling period in a beam sweeping scheme by using a first sub-frequency band; generating first scheduling information including information on identifiers of transceivers and indexes of ports proving the communication services for each scheduling period according to the first scheduling, and transmitting the first scheduling information to the terminal by using the first transceiver or the second transceiver; and controlling the first transceiver and the second transceiver to communicate with the terminal according to the first scheduling information.

The operation method may further comprise: instructing a measurement report of received signal strengths; receiving, from the first transceiver, information on received signal strength(s) of signal(s) received by the first transceiver from the second transceiver, information on reception port(s) of the first transceiver, and information on transmission port(s) of the second transceiver; deriving information on opposing ports of the first transceiver and the second transceiver based on the information on the received signal strength(s), the information of the reception port(s) of the first transceiver, and the information of the transmission port(s) of the second transceiver; allocating port indexes to the N ports and the M ports based on the information on the opposing ports of the first transceiver and the second transceiver.

The operation method may further comprise: obtaining a maximum received signal strength from the information on the received signal strength(s); and estimating a distance between the first transceiver and the second transceiver based on the obtained maximum received signal strength.

The operation method may further comprise: performing second scheduling so that at least two ports, among the N ports of the first transceiver and the M ports of the second transceiver, provide communication services to the service coverage of the unit cluster, for each scheduling period, in a beam sweeping scheme using K sub-frequency bands, K being a natural number not less than 2; generating, according to the second scheduling, second scheduling information on indexes of the at least two ports and identifiers of transceivers to which the at least two ports belong, which provide the communication services for each scheduling period, and transmitting the second scheduling information to the terminal through the first transceiver or the second transceiver; and controlling the first transceiver and the second transceiver to perform communications using multiple beams in a radio link established with the terminal according to the second scheduling information.

The operation method may further comprise: generating a per-region scheduling map for each scheduling period; determining a position of the terminal in the service coverage; performing third scheduling according to the identified position of the terminal based on the per-region scheduling map; generating, according to the third scheduling, third scheduling information including indexes of per-region port(s) and per-region transceiver(s), which provide communication services to the position of the terminal for each scheduling period, and transmitting the third scheduling information to the terminal through the first transceiver or the second transceiver; and controlling the first transceiver and the second transceiver to perform communications using per-region multiple beams in a radio link established with the terminal according to the third scheduling information.

The generating of the per-region scheduling map may comprise: determining beam patterns formed in the service coverage of the unit cluster for each scheduling period; and generating the per-region scheduling map for each scheduling period based on the determined beam patterns.

The determining of the beam patterns may comprise: determining the beam patterns in a same sub-frequency band for consecutive scheduling periods, and/or determining the beam patterns in consecutive sub-frequency bands for one scheduling time.

The determining of the position may comprise: controlling each of the first transceiver and the second transceiver to transmit at least one subframe including transceiver identifier(s) (ID(s)) and port index(es) to the terminal; receiving, from the terminal, a first transceiver ID and a first port index for a first subframe successfully decoded by the terminal among the at least one subframe; and identifying the position of the terminal based on the first transceiver ID and the first port index.

Each of the at least one subframe may further include flag bit(s) indicating type information, and may be transmitted on a physical downlink shared channel(s) (PDSCH(s)) at an interval of L subframes, L being a natural number.

According to a second exemplary embodiment of the present disclosure, a central control apparatus may comprise: a processor; a memory electronically communicating with the processor; and instructions stored in the memory, wherein when executed by the processor, the instructions cause the central control apparatus to: configure a unit cluster using a first transceiver and a second transceiver, the first transceiver and the second transceiver being connected to the central control apparatus;

perform first scheduling so that at least one port among N ports of the first transceiver and M ports of the second transceiver provides communication services to a service coverage of the unit cluster for each scheduling period in a beam sweeping scheme by using a first sub-frequency band; generate first scheduling information including information on identifiers of transceivers and indexes of ports proving the communication services for each scheduling period according to the first scheduling, and transmit the first scheduling information to the terminal by using the first transceiver or the second transceiver; and control the first transceiver and the second transceiver to communicate with the terminal according to the first scheduling information.

The instructions may further cause the central control apparatus to: instruct a measurement report of received signal strengths; receive, from the first transceiver, information on received signal strength(s) of signal(s) received by the first transceiver from the second transceiver, information on reception port(s) of the first transceiver, and information on transmission port(s) of the second transceiver; derive information on opposing ports of the first transceiver and the second transceiver based on the information on the received signal strength(s), the information of the reception port(s) of the first transceiver, and the information of the transmission port(s) of the second transceiver; allocate port indexes to the N ports and the M ports based on the information on the opposing ports of the first transceiver and the second transceiver.

The instructions may further cause the central control apparatus to: perform second scheduling so that at least two ports, among the N ports of the first transceiver and the M ports of the second transceiver, provide communication services to the service coverage of the unit cluster, for each scheduling period, in a beam sweeping scheme using K sub-frequency bands, K being a natural number not less than 2; generate, according to the second scheduling, second scheduling information on indexes of the at least two ports and identifiers of transceivers to which the at least two ports belong, which provide the communication services for each scheduling period, and transmit the second scheduling information to the terminal through the first transceiver or the second transceiver; and control the first transceiver and the second transceiver to perform communications using multiple beams in a radio link established with the terminal according to the second scheduling information.

The instructions may further cause the central control apparatus to: generate a per-region scheduling map for each scheduling period; determine a position of the terminal in the service coverage; perform third scheduling according to the identified position of the terminal based on the per-region scheduling map; generate, according to the third scheduling, third scheduling information including indexes of per-region port(s) and per-region transceiver(s), which provide communication services to the position of the terminal for each scheduling period, and transmit the third scheduling information to the terminal through the first transceiver or the second transceiver; and control the first transceiver and the second transceiver to perform communications using per-region multiple beams in a radio link established with the terminal according to the third scheduling information.

In the generating of the per-region scheduling map, the instructions may further cause the central control apparatus to: determine beam patterns formed in the service coverage of the unit cluster for each scheduling period; and generate the per-region scheduling map for each scheduling period based on the determined beam patterns.

In the determining of the beam patterns, the instructions may further cause the central control apparatus to: control each of the first transceiver and the second transceiver to transmit at least one subframe including transceiver identifier(s) (ID(s)) and port index(es) to the terminal; receive, from the terminal, a first transceiver ID and a first port index for a first subframe successfully decoded by the terminal among the at least one subframe; and identify the position of the terminal based on the first transceiver ID and the first port index.

According to the exemplary embodiments of the present disclosure, transceivers constituting a unit cluster may perform beam sweeping for each sub-frequency band to provide a radio link to a terminal. In this manner, as the transceivers perform beam sweeping for each sub-frequency band to provide radio links to terminals, thereby reliably providing communication services in the entire usable frequency band. Further, according to the exemplary embodiments of the present disclosure, transceivers constituting a unit cluster may cooperate to provide a radio link to a terminal. Accordingly, a received signal quality can be improved, the reliability of radio connection can be improved, and the capacity of the communication system can be increased. Further, according to the exemplary embodiments of the present disclosure, as transceivers constituting a unit cluster cooperate to provide a radio link to a terminal, when a link interruption occurs between any one transceiver and the terminal, the other transceivers can reliably provide the communication service to the terminal.

BRIEF DESCRIPTION OF DRAWINGS

Exemplary embodiments of the present disclosure will become more apparent by describing in detail embodiments of the present disclosure with reference to the accompanying drawings, in which:

FIG. 25 is a conceptual diagram illustrating a first exemplary embodiment of a method for reusing unit cluster identifiers.

FIG. 57 is a conceptual diagram illustrating a first exemplary embodiment of a procedure of scheduling a plurality of terminals using a scheduling map.

FIG. 58 is a conceptual diagram illustrating a second exemplary embodiment of a procedure of scheduling a plurality of terminals using a scheduling map.

DETAILED DESCRIPTION OF THE EMBODIMENTS

Figure 1:
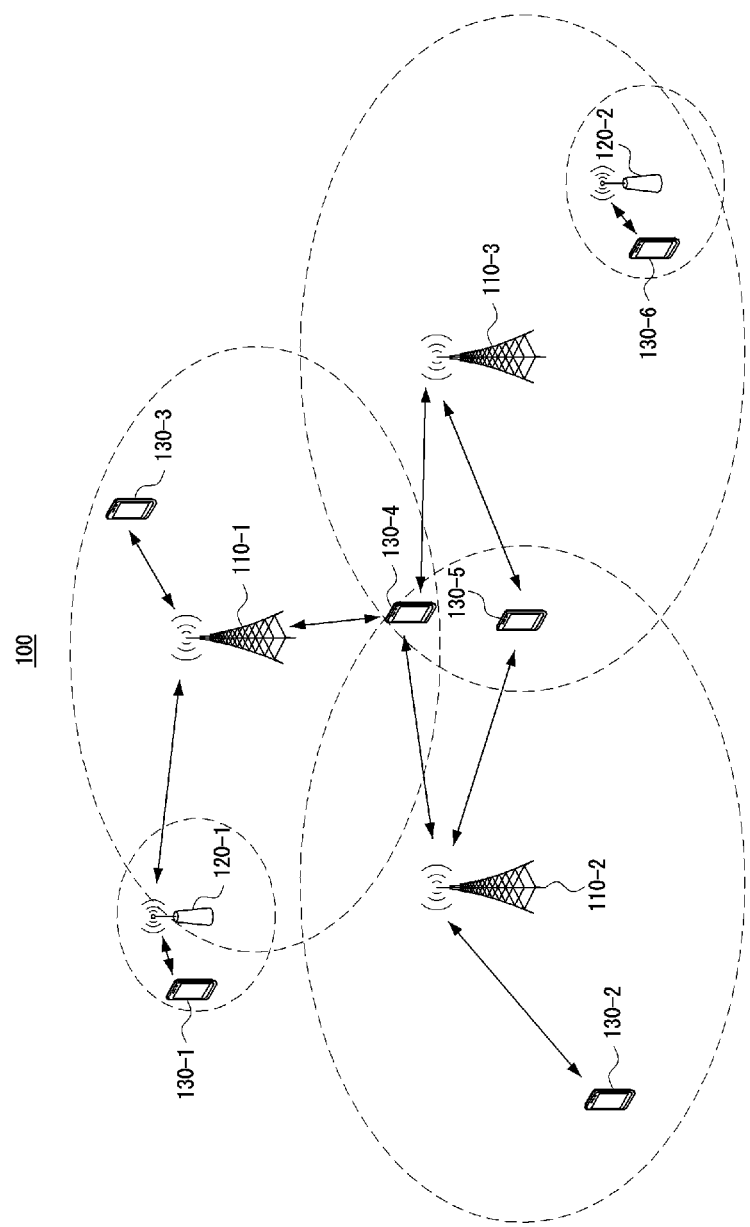
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
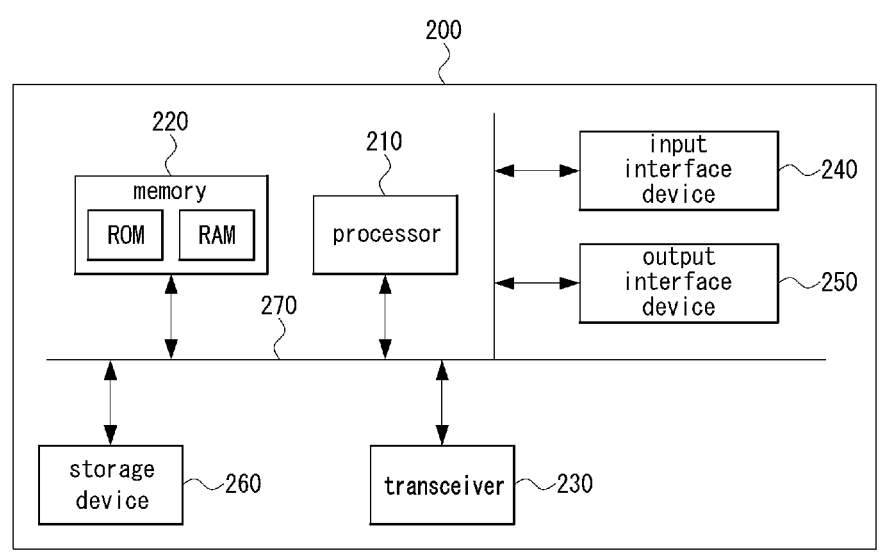
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3A:
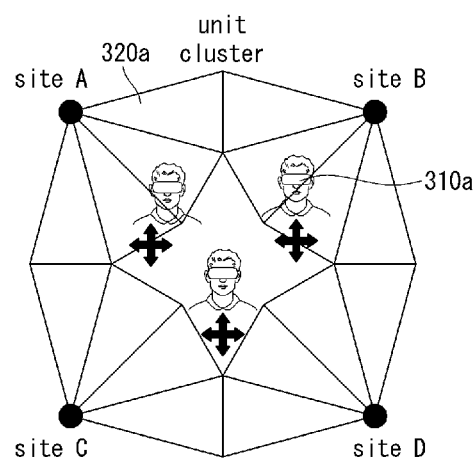
FIGS. 3A and 3B are conceptual diagrams illustrating a first exemplary embodiment of a unit cluster configuration method.
Figure 3B:
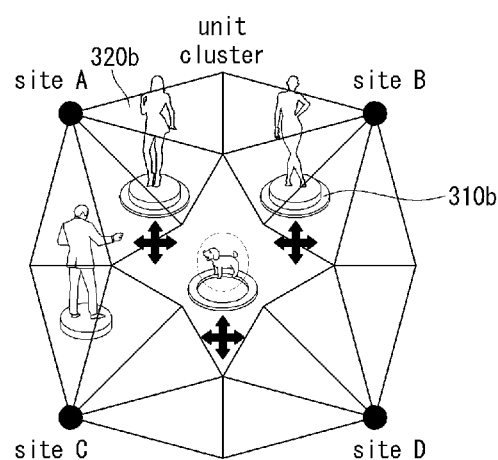

FIGS. 3A and 3B are conceptual diagrams illustrating a first exemplary embodiment of a unit cluster configuration method.

Referring to FIG. 3A, sites A to D may be respectively located at four vertices of an imaginary rectangle to configure a unit cluster. In addition, the sites A to D may provide communication services to a service coverage of the unit cluster. Such the sites A to D may be located indoors or outdoors. In addition, the sites A to D may provide communication services to a virtual reality (VR) headset 310*a* worn by a user located in the service coverage of the unit cluster. Each of the sites A to D may use a plurality of beams 320*a* to provide the communication services to the service coverage of the unit cluster, and may use four beams as an example. Here, the site may be a transceiver, and may be referred to as a transmission reception point (TRP) or TRX. Here, the service coverage of the unit cluster may be a service coverage located between the sites A to D constituting the unit cluster.

Referring to FIG. 3B, sites A to D may be respectively located at four vertices of an imaginary rectangle to configure a unit cluster. In addition, the sites A to D may provide communication services to a service coverage of the unit cluster. Such the sites A to D may be located indoors or outdoors. In addition, the sites A to D may provide communication services to a hologram display device 310*b* located in the service coverage of the unit cluster. Each of the sites A to D may use a plurality of beams 330*b* to provide the communication services to the service coverage of the unit cluster, and may use four beams as an example. Here, the site may be a transceiver (i.e., TRP). In addition, the hologram display device 310*b* may include a movable plate, and may display people or things as a hologram on the plate. Accordingly, a user may conduct a meeting between the people by performing an interaction with the people or things displayed by the hologram display device 310*b* as a hologram.

Figure 4A:
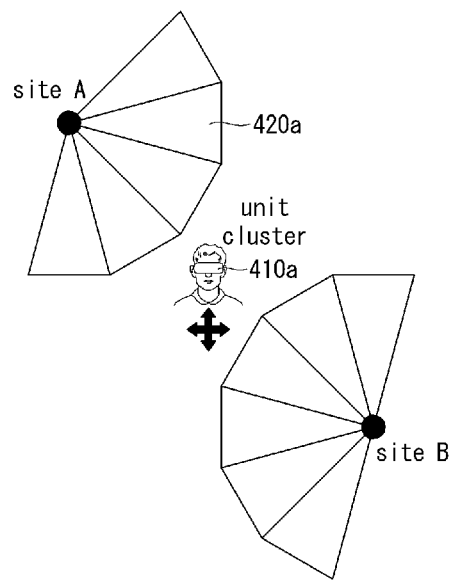
FIGS. 4A and 4B are conceptual diagrams illustrating a second exemplary embodiment of a unit cluster configuration method.
Figure 4B:
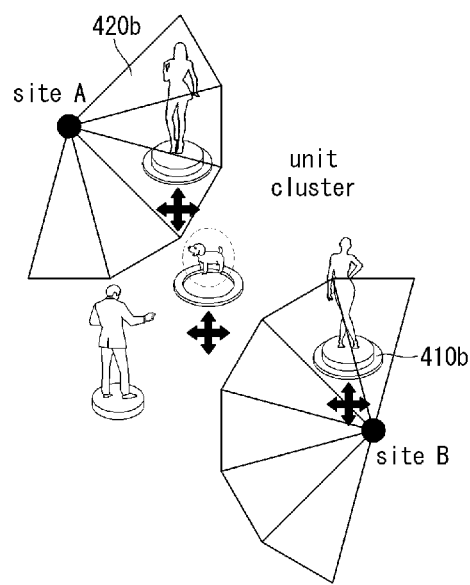

FIGS. 4A and 4B are conceptual diagrams illustrating a second exemplary embodiment of a unit cluster configuration method.

Referring to FIG. 4A, sites A and B may be located to face each other to configure a unit cluster. In addition, the sites A and B may provide communication services to a service coverage of the unit cluster formed between the sites A and B. Such the sites A and B may be located indoors or outdoors. In addition, the sites A to D may provide communication services to a VR headset 410*a* worn by a user located in the service coverage of the unit cluster. Each of the sites A and B may use a plurality of beams 420*a* to provide the communication services to the service coverage of the unit cluster, and may use four beams as an example. Here, the site may be a transceiver (i.e., TRP).

Referring to FIG. 4B, sites A and B may be located to face each other to configure a unit cluster. In addition, the sites A and B may provide communication services to a service coverage of the unit cluster formed therebetween. Such the sites A and B may be located indoors or outdoors. In addition, the sites A and B may provide the communication services to a hologram display device 410*b* located in the service coverage of the unit cluster. Each of the sites A and B may use a plurality of beams 430*b* to provide the communication services to the service coverage of the unit cluster, and may use four beams as an example. Here, the site may be a transceiver (i.e., TRP). In addition, the hologram display device 410*b* may include a movable plate, and may display people or things as a hologram on the plate. Accordingly, a user may conduct a meeting between the people by performing an interaction with the people or things displayed by the hologram display device 410*b* displays as a hologram.

Figure 5A:
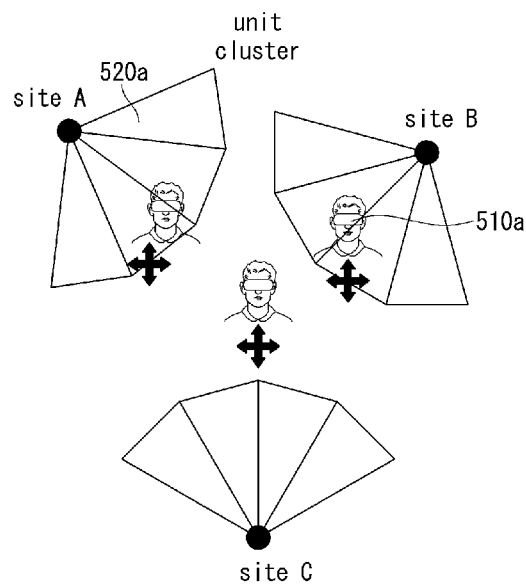
FIGS. 5A and 5B are conceptual diagrams illustrating a third exemplary embodiment of a unit cluster configuration method.
Figure 5B:
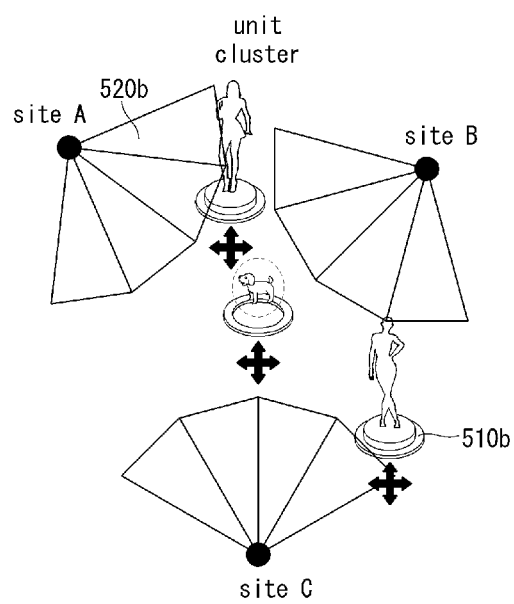

FIGS. 5A and 5B are conceptual diagrams illustrating a third exemplary embodiment of a unit cluster configuration method.

Referring to FIG. 5A, sites A to C may be respectively located at three vertices of an imaginary triangle to configure a unit cluster. In addition, the sites A to C may provide communication services to a service coverage of the unit cluster. Such the sites A to C may be located indoors or outdoors. In addition, the sites A to C may provide communication services to a VR headset 510*a* worn by a user located in the service coverage of the unit cluster. Each of the sites A to C may use a plurality of beams 520*a* to provide the communication services to the service coverage of the unit cluster, and may use four beams as an example. Here, the site may be a transceiver (i.e., TRP).

Referring to FIG. 5B, sites A to C may be respectively located at three vertices of an imaginary triangle to configure a unit cluster. In addition, the sites A to C may provide communication services to a service coverage of the unit cluster. Such the sites A to C may be located indoors or outdoors. In addition, the sites A to C may provide the communication services to a hologram display device 510*b* located in the service coverage of the unit cluster. Each of the sites A to C may use a plurality of beams 530*b* to provide the communication services to the service coverage of the unit cluster, and may use four beams as an example. Here, the site may be a transceiver (i.e., TRP). In addition, the hologram display device 510*b* may include a movable plate, and may display people or things as a hologram on the plate. Accordingly, a user may conduct a meeting between the people by performing an interaction with the people or things displayed by the hologram display device 510*b* as a hologram.

All the sites constituting the unit clusters of FIGS. 3A to 5B described above may transmit or receive the same content to or from the devices at the same time using the same time resources and spatial resources.

Figure 6A:
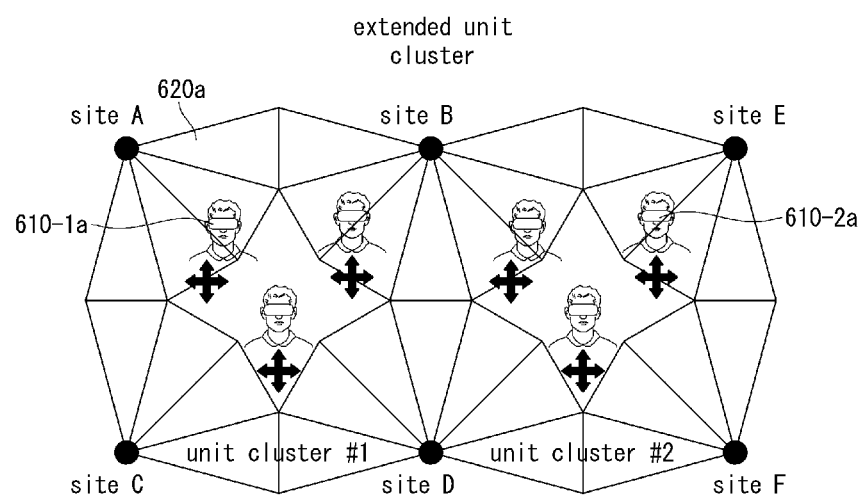
FIGS. 6A and 6B are conceptual diagrams illustrating a first exemplary embodiment of an extended unit cluster configuration method.
Figure 6B:
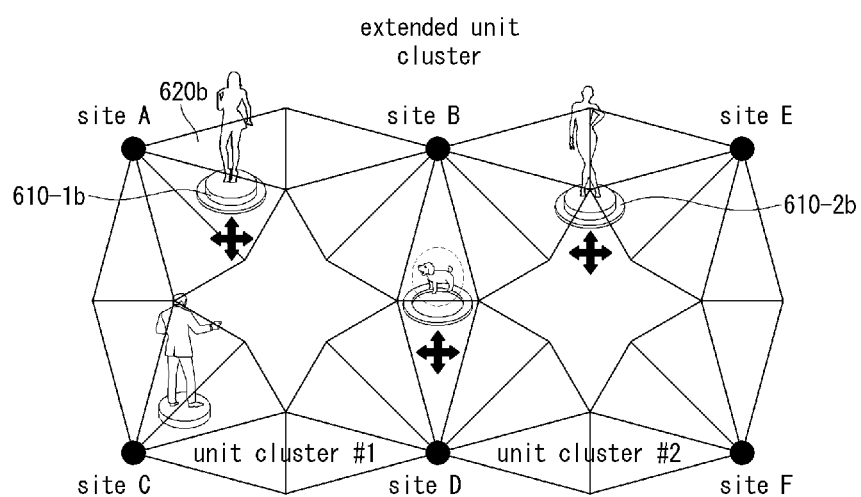

FIGS. 6A and 6B are conceptual diagrams illustrating a first exemplary embodiment of an extended unit cluster configuration method.

Referring to FIG. 6A, a unit cluster #1 configured by sites A to D and a unit cluster #2 configured by sites B, D, E, and F may be combined to configure an extended unit cluster. As described above, the sites A to D may configure the unit cluster #1, and may provide communication services to a VR headset 610-1*a* worn by a user located in a service coverage of the unit cluster #1. In addition, the sites B, D, E, and F may configure the unit cluster #2, and may provide communication services to a VR headset 610-2*a* worn by a user located in a service coverage of the unit cluster #2. In this case, each of the sites A to F may use a plurality of beams 620*a*. Here, each of the sites A, C, E, and F may use four beams as an example, and each of the sites B and D may use seven beams as an example.

Such the extended unit cluster may have a service coverage twice as wide as the service coverage of the unit cluster. As described above, as the service coverage that the extended unit cluster can provide is expanded than the service coverage that the unit cluster can provide, an operation range of the VR headsets 610-1*a* and 610-2*a* may be expanded.

Referring to FIG. 6B, a unit cluster #1 configured by sites A to D and a unit cluster #2 configured by sites B, D, E, and F may be combined to form an extended unit cluster. As described above, the sites A to D may configure the unit cluster #1 and provide communication services to a hologram display device 610-1*b* located in a service coverage of the unit cluster #1. In addition, the sites B, D, E, and F may configure the unit cluster #2, and may provide communication services to a hologram display device 610-2*b* located in a service coverage of the unit cluster #2.

Here, each of the hologram display devices 610-1*b* and 610-2*b* may include a movable plate, and may display people or things as a hologram on the plate. Accordingly, in a person-to-person meeting, the user may interact with people or things displayed by the hologram display devices 610-1*b* and 610-2*b*. In this case, each of the sites A to F may use a plurality of beams 620*b*. Here, each of the sites A, C, E, and F may use four beams as an example, and each of the sites B and D may use seven beams as an example.

Such the extended unit cluster may have a service coverage twice as wide as the service coverage of the unit cluster. As described above, as the service coverage that the extended unit cluster can provide is expanded than the service coverage that the unit cluster can provide, an operation range of the hologram display devices 610-1*b* and 610-2*b* may be expanded.

Meanwhile, a communication speed required for the communication system to provide a smooth communication service to the hologram display device or the VR headset may be 10 Gbps or more for each device. As such, in order for the communication system to provide a communication service to the hologram display device or VR headset, a high-capacity communication speed may be required. Moreover, in order for the communication system to provide communication services to a plurality of hologram devices and a plurality of VR headsets, the required communication speed may further increase. Accordingly, in order to satisfy such the requirements, the communication system may use ultra-high frequency and ultra-wide bands. As such, when the communication system uses ultra-high frequency and ultra-wide bands, the straightness becomes strong and blocking may occur. Accordingly, a network operation method may be needed that enables the communication system to support smooth scheduling while overcoming these problems.

Figure 7:
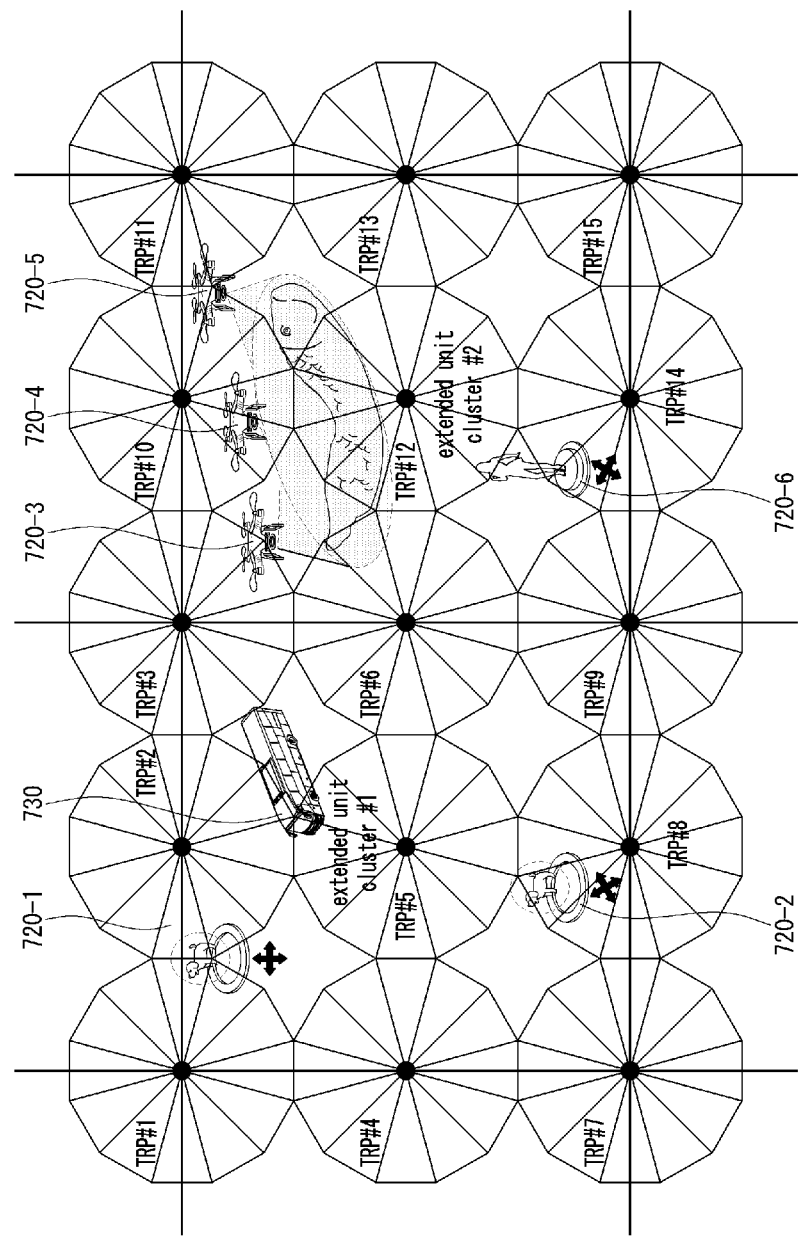
FIG. 7 is a conceptual diagram illustrating a second exemplary embodiment of an extended unit cluster configuration method.

FIG. 7 is a conceptual diagram illustrating a second exemplary embodiment of an extended unit cluster configuration method.

Referring to FIG. 7, a plurality of transceivers TRP #1 to TRP #15 may be located indoors or outdoors, and may be respectively located at vertices of a grid formed by imaginary squares. In this case, four adjacent transceivers may configure a unit cluster. For example, four adjacent transceivers TRP #1, TRP #2, TRP #4, and TRP #5 may configure a unit cluster #1. In addition, four adjacent transceivers TRP #2, TRP #3, TRP #5, and TRP #6 may configure a unit cluster #2. In addition, four adjacent transceivers TRP #4, TRP #5, TRP #7, and TRP #8 may configure a unit cluster #3, and four adjacent transceivers TRP #5, TRP #6, TRP #8, and TRP #9 may configure a unit cluster #4. In addition, four adjacent transceivers TRP #3, TRP #10, TRP #6 and TRP #12 may configure a unit cluster #5, and four adjacent transceivers TRP #10, TRP #11, TRP #12, and TRP #13 may configure a unit cluster #6. In addition, four adjacent transceivers TRP #6, TRP #12, TRP #9 and TRP #14 may configure a unit cluster #7, and four adjacent transceivers TRP #12, TRP #13, TRP #14, and TRP #15 may configure a unit cluster #8.

Meanwhile, four adjacent unit clusters may be combined to form an extended unit cluster. For example, four adjacent unit clusters #1 to #4 may configure an extended unit cluster #1. In addition, four adjacent unit clusters #5 to #8 may configure an extended unit cluster #2.

In such the communication system, first and second hologram display devices 720-1 and 720-2 and a bus 730 on which a plurality of persons ride may be located in the extended unit cluster #1. In addition, third to fifth hologram display devices 720-3 to 720-5 mounted on drones and a sixth hologram display device 720-6 may be located in the extended unit cluster #2. Here, the third to fifth hologram display devices 720-3 to 720-5 mounted on the drones may display a super-sized hologram.

In the above-described situation, the transceivers TRP #1 to #9 configuring the extended unit cluster #1 may provide large-capacity wireless communication services to the first hologram display device 720-1, the second hologram display device 720-2, and the bus 730. In addition, the transceivers TRP #3, TRP #6, TRP #9, and TRP #10 to TRP #15 configuring the extended unit cluster #2 may provide large-capacity wireless communication services to the third to sixth hologram display devices 720-3 to 720-6.

Figure 8:
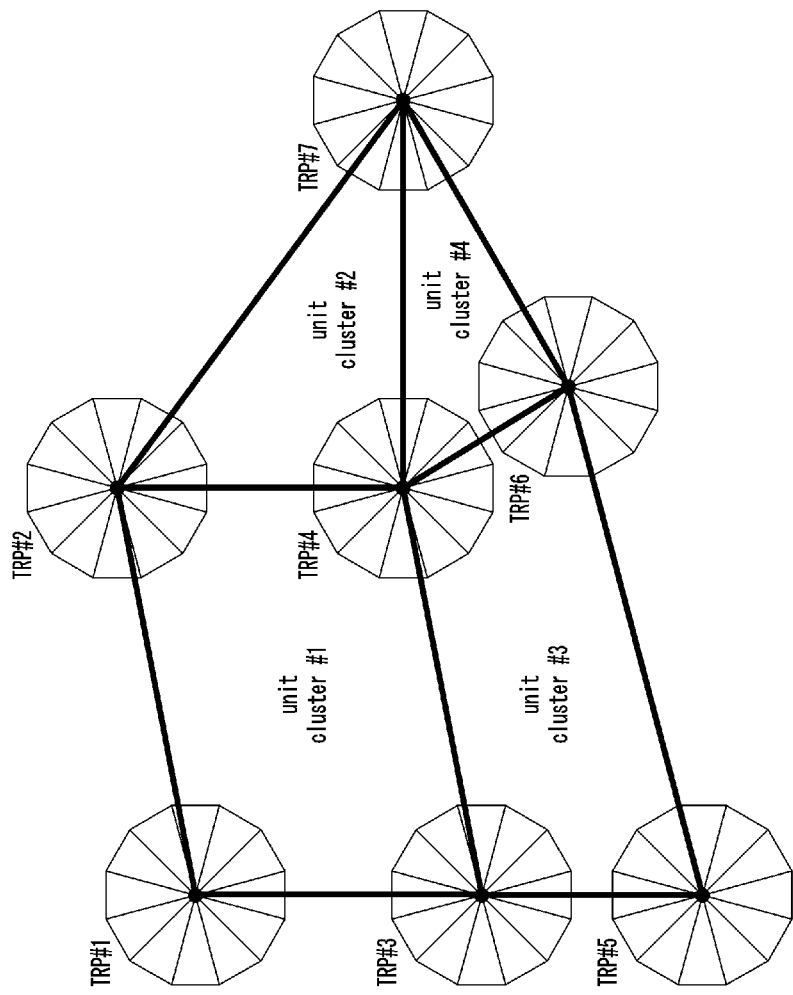
FIG. 8 is a conceptual diagram illustrating a third exemplary embodiment of an extended unit cluster configuration method.

FIG. 8 is a conceptual diagram illustrating a third exemplary embodiment of an extended unit cluster configuration method.

Referring to FIG. 8, a plurality of transceivers TRP #1 to TRP #7 may be located indoors or outdoors, and may be respectively located at vertices of a grid formed by a plurality of imaginary rhombuses or triangles. In this case, four adjacent transceivers may configure a unit cluster of a rhombus rather than a square. For example, four adjacent transceivers TRP #1 to TRP #4 may configure a unit cluster #1. In addition, four adjacent transceivers TRP #3 to TRP #6 may configure a unit cluster #3. In addition, three adjacent transceivers may configure a triangular unit cluster instead of a square. For example, three adjacent transceivers TRP #2, TRP #4, and TRP #7 may configure a unit cluster #2. In addition, three adjacent transceivers TRP #4, TRP #6, and TRP #7 may configure a unit cluster #4.

These four unit clusters (unit clusters #1 to #4) may form an extended unit cluster. As described above, the unit cluster may have a shape of a rhombus or triangle rather than a square. In addition, the unit cluster may have various shapes.

All the sites constituting the extended unit cluster of FIGS. 6A and 8 described above may transmit the same content to or receive the same content from the devices at the same time using the same time resources and spatial resources.

Figure 9:
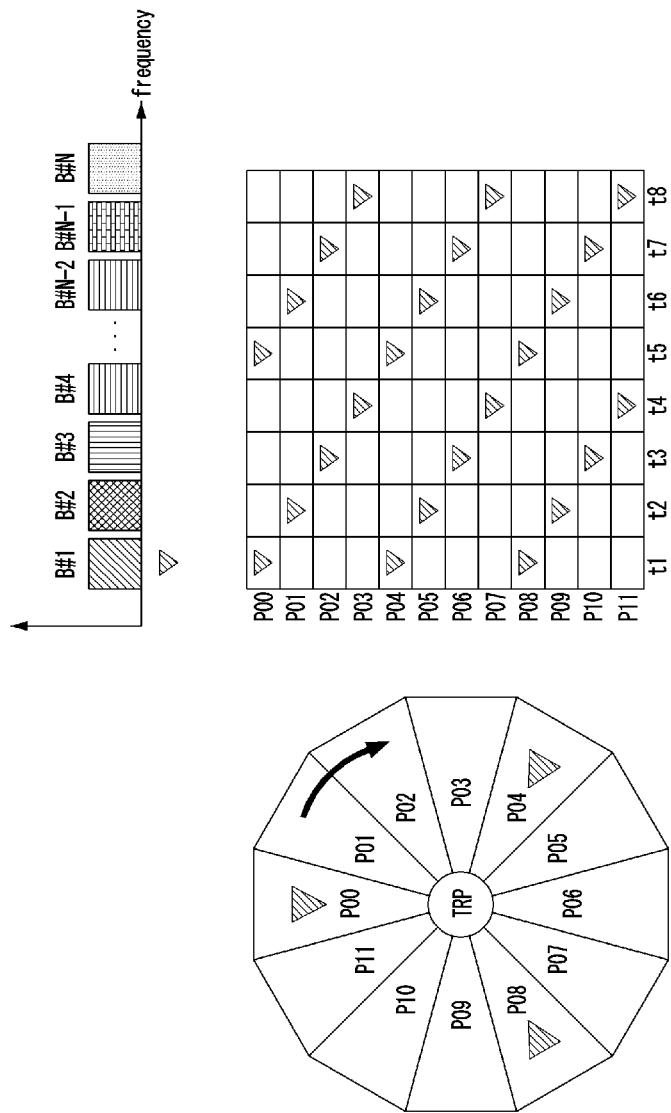
FIG. 9 is a conceptual diagram illustrating a first embodiment exemplary of a beam sweeping method of a transceiver.

FIG. 9 is a conceptual diagram illustrating a first embodiment exemplary of a beam sweeping method of a transceiver.

Referring to FIG. 9, a transceiver TRP may divide the entire usable frequency band into N sub-frequency bands B #1 to B #N for operations. Here, N may be a natural number. In addition, the transceiver may include M transmission or reception ports arranged in a physically unchanging circular form. M may be a natural number. Here, the port may mean a beam space in which a beam temporarily resides when beam sweeping is performed. Also, M may be 12 as an example, and accordingly, the ports may have port indexes of P00 to P11. In such the transceiver, each port may generate one beam by using one sub-frequency band. For example, the port P00 may generate a beam 1 by using the sub-frequency band B #1, the port P01 may generate a beam 2 by using the sub-frequency band B #2, the port P02 may generate a beam 2 by using the sub-frequency band B #2, the port P03 may generate a beam 3 by using the sub-frequency band B #3, and the port P03 may generate a beam 4 by using the sub-frequency band B #4. Of course, a plurality of ports may generate beams by using the same sub-frequency band. For example, the port P00 may generate a beam 1 by using the sub-frequency band B #1, the port P01 may generate a beam 2 by using the same sub-frequency band B #1, the port P02 may generate a beam 3 by using the same sub-frequency band B #1, and the port P03 may generate a beam 4 by using the same sub-frequency band B #1.

Of course, in such the transceiver, each port may generate a beam for each sub-frequency band. For example, the port P00 may generate a beam 1 for the sub-frequency band B #1, may generate a beam 2 for the sub-frequency band B #2, generate a beam 3 for the sub-frequency band B #3, and generate a beam 4 for the sub-frequency band B #4. In addition, the respective ports in the transceiver may generate beams for the respective sub-frequency bands in the same time period, and may position the beams in the same space. However, in the present disclosure, a case in which each port generates one beam by using one sub-frequency band to provide communication services to a service coverage of a unit cluster may be considered.

A minimum time (e.g., a minimum scheduling time t) for each port to provide communication services using a beam may be a transmission time interval (TTI). Accordingly, the transceiver may configure a scheduling time t in which each port provides communication services using a beam on a TTI basis. The transceiver may control beam generation by controlling each port to be ON/OFF. Here, the operation of the port in an ON state may mean that the corresponding port is activated, and the operation of the port in an OFF state may mean that the corresponding port is deactivated.

Meanwhile, the transceiver may select and activate K ports whose transmission directions are spaced apart by a predetermined angle in a first scheduling time t1. Here, K may be a natural number, K may be, for example, 3, and the predetermined angle may be 120°. Accordingly, the transceiver may select and activate ports P00, P04, and P08 as an example in the first scheduling time t1. The transceiver may allocate the sub-frequency band B #1 to the ports P00, P04, and P08 selected in the scheduling time t1. Accordingly, the ports P00, P04, and P08 of the transceiver may generate beams using the sub-frequency band B #1 in the scheduling time t1 to provide communication services.

Then, in a next scheduling time t2, the transceiver may select and activate the next K ports of the previously selected ports in order to transmit beams to the service coverage of the unit cluster by moving the beams at a constant movement angle based on the beam sweeping scheme. In this case, the movement angle may be, for example, 30°. Accordingly, the transceiver may select and activate the ports P01, P05, and P09 as an example in the scheduling time t2. The transceiver may allocate the sub-frequency band B #1 to the ports P01, P05, and P09 selected in the scheduling time t2. Accordingly, the ports P01, P05, and P09 of the transceiver may generate beams using the sub-frequency band B #1 in the scheduling time t2 to provide communication services.

Then, in a next scheduling time t3, the transceiver may select and activate the next K ports of the previously selected ports in order to transmit beams to the service coverage of the unit cluster by moving the beams at a constant movement angle based on the beam sweeping scheme. In this case, the movement angle may be, for example, 30°. Accordingly, the transceiver may select and activate the ports P02, P06 and P10 as an example in the scheduling time t3. The transceiver may allocate the sub-frequency band B #1 to the ports P02, P06, and P10 selected in the scheduling time t3. Accordingly, the ports P02, P06, and P10 of the transceiver may generate beams using the sub-frequency band B #1 in the scheduling time t3 to provide communication services.

Then, in a next scheduling time t4, the transceiver may select and activate the next K ports of the previously selected ports in order to transmit beams to the service coverage of the unit cluster by moving the beams at a constant movement angle based on the beam sweeping scheme. In this case, the movement angle may be, for example, 30°. Accordingly, the transceiver may select and activate the ports P03, P07, and P11 as an example in the scheduling time t4. The transceiver may allocate the sub-frequency band B #1 to the ports P03, P07, and P11 selected in the scheduling time t4. Accordingly, the ports P03, P07, and P11 of the transceiver may generate beams using the sub-frequency band B #1 in the scheduling time t4 to provide communication services.

Then, in a next scheduling time t5, the transceiver may select and activate the next K ports of the previously selected ports in order to transmit beams to the service coverage of the unit cluster by moving the beams at a constant movement angle based on the beam sweeping scheme. In this case, the movement angle may be, for example, 30°. Accordingly, the transceiver may select and activate the ports P00, P04 and P08 again, for example, in the scheduling time t5. The transceiver may allocate the sub-frequency band B #1 to the reselected ports P00, P04 and P08 in the scheduling time t5. Accordingly, the ports P00, P04, and P08 of the transceiver may generate beams using the sub-frequency band B #1 in the scheduling time t5 to provide communication services.

In this manner, the transceiver may be configured such that beams using one selected sub-frequency band are repeatedly beam-swept for the service coverage in units of four scheduling times (e.g., t1 to t4, t5 to t8, t9 to t12, etc.).

Figure 10:
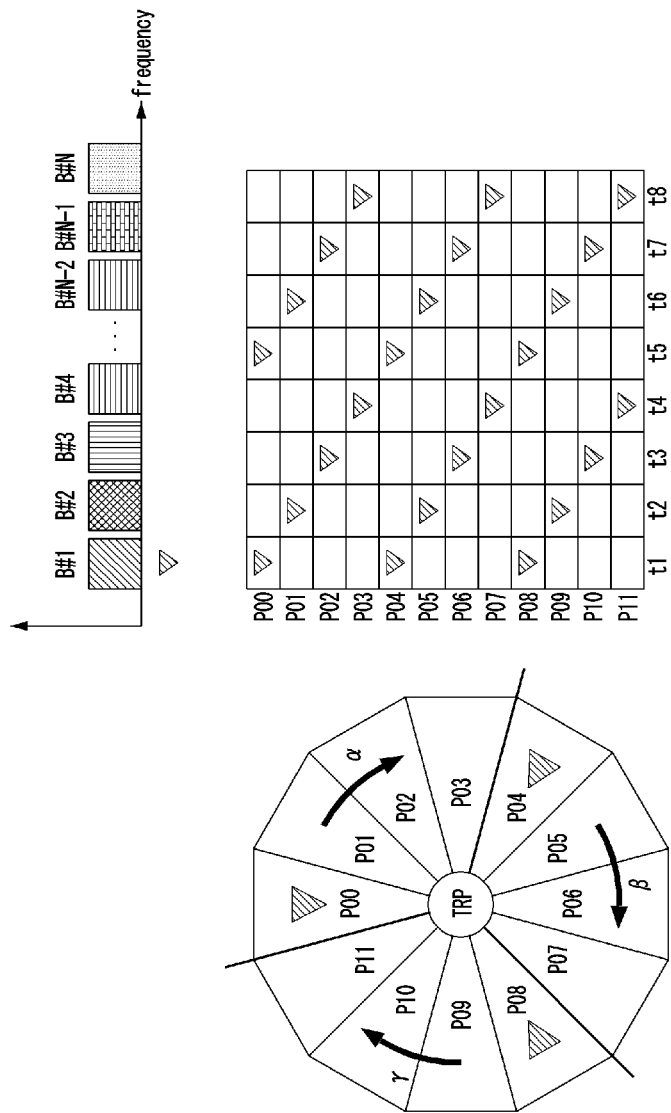
FIG. 10 is a conceptual diagram illustrating a second exemplary embodiment of a beam sweeping method of a transceiver.

FIG. 10 is a conceptual diagram illustrating a second exemplary embodiment of a beam sweeping method of a transceiver.

Referring to FIG. 10, a transceiver TRP may divide a service coverage into three sectors: an alpha (α) sector, a beta (β) sector, and a gamma (γ) sector. In addition, the entire usable frequency band may be divided into N sub-frequency bands B #1 to B #N for operations. Here, N may be a natural number. In addition, the transceiver may include M transmission or reception ports arranged in a physically unchanging circular form. M may be a natural number. M may be, for example, 12, and thus the ports may be P00 to P11. The transceiver may allocate the ports P00 to P03 for the alpha sector, allocate the ports P04 to P07 for the beta sector, and allocate the ports P08 to P011 for the gamma sector.

Such the transceiver may provide communication services by performing beam sweeping using the ports allocated to each sector. The transceiver may select one port from the ports allocated to each sector in a first scheduling time t1. Accordingly, the transceiver may select and activate the ports P00, P04 and P08 as an example in the first scheduling time t1. The transceiver may allocate the sub-frequency band B #1 to the ports P00, P04, and P08 selected in the scheduling time t1. Accordingly, the ports P00, P04, and P08 of the transceiver may generate beams using the sub-frequency band B #1 in the scheduling time t1 to provide communication services.

Then, in a next scheduling time t2, the transceiver may select one port next to the previously selected ports from the ports allocated to each sector so that the transmission direction is changed at a constant movement angle in the clockwise direction to proceed with the beam sweeping operation. Accordingly, the transceiver may select ports the P01, P05, and P09 as an example in the scheduling time t2. The transceiver may allocate the sub-frequency band B #1 to the ports P01, P05, and P09 selected in the scheduling time t2. Then, the ports P01, P05, and P09 of the transceiver may generate beams using the sub-frequency band B #1 in the scheduling time t2 to provide communication services.

Then, in a next scheduling time t3, the transceiver may select one port next to the previously selected ports from the ports allocated to each sector so that the transmission direction is changed at a constant movement angle in the clockwise direction to proceed with the beam sweeping operation. Accordingly, the transceiver may select, for example, the ports P02, P06, and P10 in the scheduling time t3. The transceiver may allocate the sub-frequency band B #1 to the ports P02, P06, and P10 selected in the scheduling time t3. Then, the ports P02, P06, and P10 of the transceiver may generate beams using the sub-frequency band B #1 in the scheduling time t3 to provide communication services.

Then, in a next scheduling time t4, the transceiver may select one port next to the previously selected ports from the ports allocated to each sector so that the transmission direction is changed at a constant movement angle in the clockwise direction to proceed with the beam sweeping operation. Accordingly, the transceiver may select, for example, the ports P03, P07, and P11 in the scheduling time t4. The transceiver may allocate the sub-frequency band B #1 to the ports P03, P07, and P11 selected in the scheduling time t4. Then, the ports P03, P07, and P11 of the transceiver may generate beams using the sub-frequency band B #1 in the scheduling time t4 to provide communication services.

Then, in a next scheduling time t5, the transceiver may select one port next to the previously selected ports from the ports allocated to each sector so that the transmission direction is changed at a constant movement angle in the clockwise direction to proceed with the beam sweeping operation. Accordingly, the transceiver may select again the ports P00, P04 and P08 as an example in the scheduling time t5. The transceiver may allocate the sub-frequency band B #1 to the reselected ports P00, P04 and P08 in the scheduling time t5. Then, the ports P00, P04, and P08 of the transceiver may generate beams using the sub-frequency band B #1 in the scheduling time t5 to provide communication services.

As described above, FIG. 10 may be almost identical to FIG. 9, and a difference therebetween may be in that the service coverage is divided into the alpha, beta, and gamma sectors in terms of sectors. In FIG. 10, the transceiver may be configured such that beams using one selected sub-frequency band are repeatedly beam-swept for the service coverage divided into three sectors in units of four scheduling times (e.g., t1 to t4, t5 to t8, t9 to t12, etc.).

Figure 11:
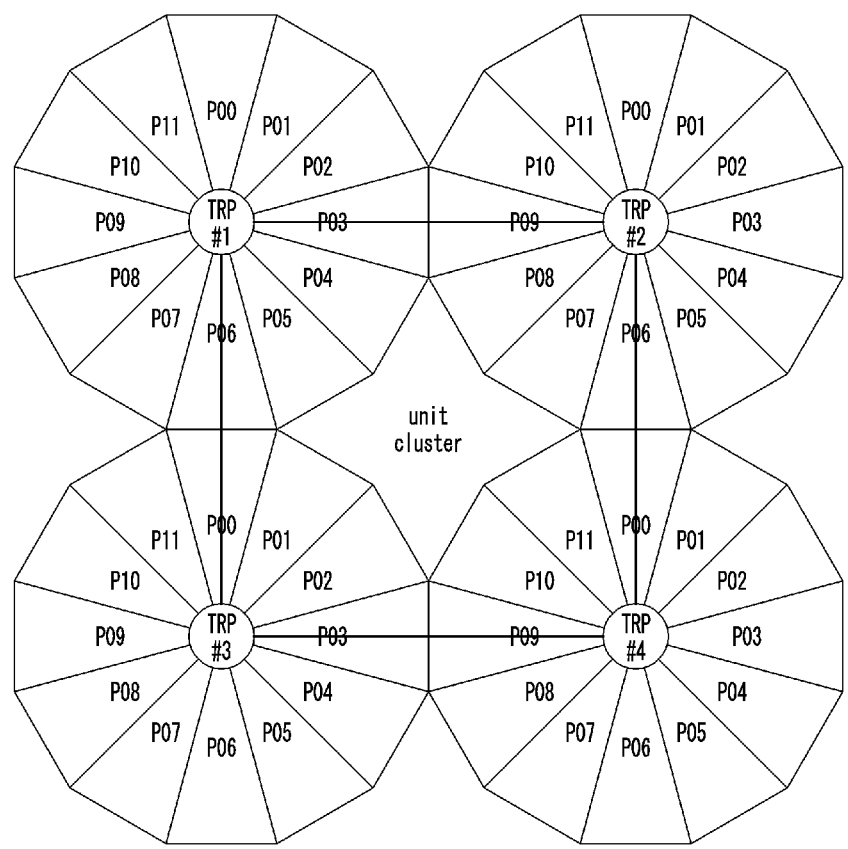
FIG. 11 is a conceptual diagram illustrating a first exemplary embodiment of a unit cluster configuration method in consideration of ports.

FIG. 11 is a conceptual diagram illustrating a first exemplary embodiment of a unit cluster configuration method in consideration of ports.

Referring to FIG. 11, four transceivers TRP #1 to TRP #4 may be respectively located at vertices of an imaginary rectangle to configure a unit cluster. In this case, four ports P03, P04, P05, and P06 of the first transceiver TRP #1 may participate in providing communication services to a service coverage of the unit cluster. In addition, four ports P06, P07, P08, and P09 of the second transceiver TRP #2 may participate in providing communication services to the service coverage of the unit cluster. In addition, four ports P00, P01, P02, and P03 of the third transceiver TRP #1 may participate in providing communication services to the service coverage of the unit cluster. In addition, four ports P09, P10, P11, and P00 of the fourth transceiver TRP #4 may participate in providing communication services to the service coverage of the unit cluster. In this case, each of the four transceivers TRP #1 to TRP #4 may provide communication services to the service coverage of the unit cluster by using four ports. Here, the number of transceivers providing communication services to the service coverage of the unit cluster may be greater than or less than four. In addition, the number of ports of each transceiver providing communication services to the service coverage of the unit cluster may be greater than or less than four.

Figure 12A:
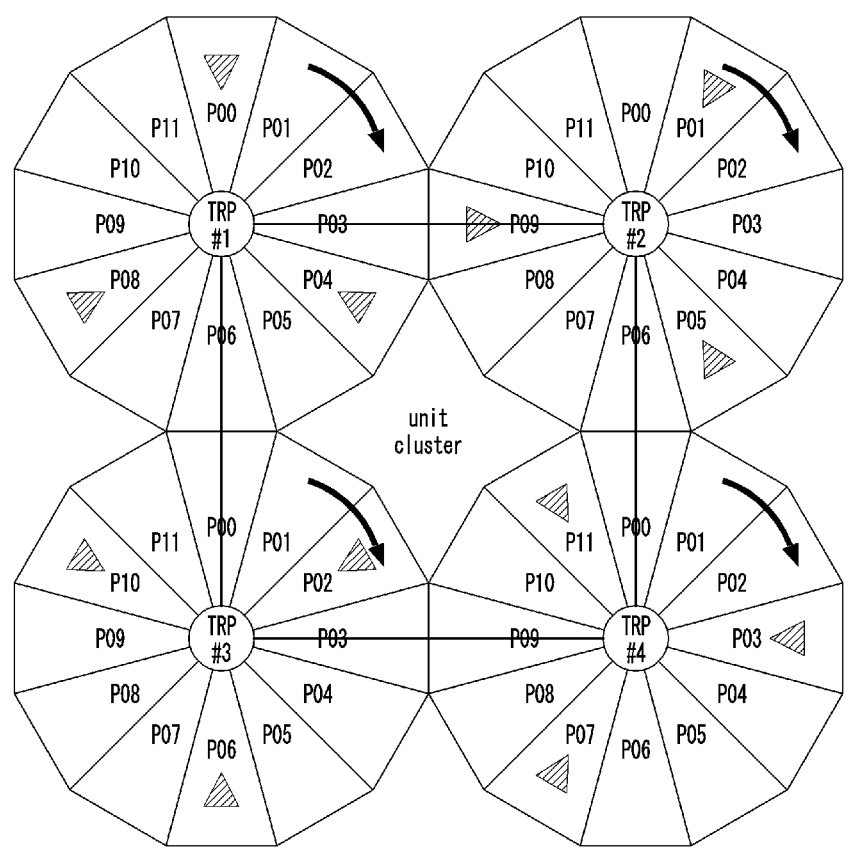
FIGS. 12A and 12B are conceptual diagrams illustrating a first exemplary embodiment of a unit cluster operation method.
Figure 12B:
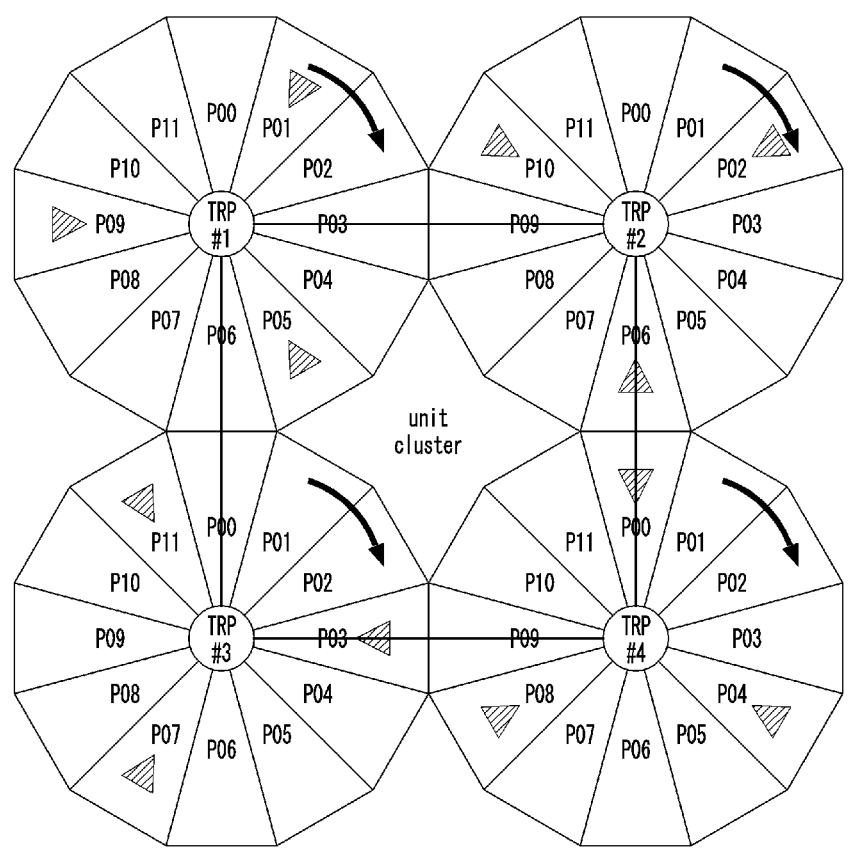

FIGS. 12A and 12B are conceptual diagrams illustrating a first exemplary embodiment of a unit cluster operation method.

Referring to FIG. 12A, four transceivers TRP #1 to TRP #4 may operate by dividing the entire usable frequency band into N sub-frequency bands B #1 to B #N. Here, N may be a natural number. In addition, the transceivers TRP #1 to TRP #4 may include M transmission or reception ports arranged in a physically unchanging circular form. M may be a natural number. As an example, M may be 12, and accordingly, indexes of the ports may be P00 to P11.

Such the transceivers TRP #1 to TRP #4 may select K ports whose transmission directions are spaced apart by a predetermined angle in a first scheduling time t1. Here, K may be a natural number, K may be, for example, 3, and the predetermined angle may be 120°.

Accordingly, the first transceiver TRP #1 may select and activate the ports P00, P04, and P08, for example, in the first scheduling time t1. The first transceiver TRP #1 may allocate the sub-frequency band B #1 to the ports P00, P04, and P08 selected in the scheduling time t1. Then, the ports P00, P04, and P08 of the first transceiver TRP #1 may generate beams by using the sub-frequency band B #1 in the scheduling time t1.

Also, the second transceiver TRP #2 may select and activate the ports P01, P05, and P09 as an example in the first scheduling time t1. The second transceiver TRP #2 may allocate the sub-frequency band B #1 to the ports P01, P05, and P09 selected in the scheduling time t1. Then, the ports P01, P05, and P09 of the second transceiver TRP #2 may generate beams by using the sub-frequency band B #1 in the scheduling time t1.

Also, the third transceiver TRP #3 may select and activate the ports P02, P06 and P10 as an example in the first scheduling time t1. The third transceiver TRP #3 may allocate the sub-frequency band B #1 to the ports P02, P06, and P10 selected in the scheduling time t1. Then, the ports P02, P06, and P10 of the third transceiver TRP #3 may generate beams by using the sub-frequency band B #1 in the scheduling time t1.

Also, the fourth transceiver TRP #4 may select and activate the ports P03, P07, and P11 as an example in the first scheduling time t1. The fourth transceiver TRP #4 may allocate the sub-frequency band B #1 to the ports P03, P07, and P11 selected in the scheduling time t1. Then, the ports P03, P07, and P11 of the fourth transceiver TRP #4 may generate beams by using the sub-frequency band B #1 in the scheduling time t1.

In this case, the ports providing communication services to the service coverage of the unit cluster in the scheduling time t1 may be the port P04 of the first transceiver TRP #1, the port P09 of the second transceiver TRP #2, the port P02 of the third transceiver TRP #3, and the port P11 of the fourth transceiver TRP #4.

On the other hand, referring to FIG. 12B, in a next scheduling time t2, the transceivers TRP #1 to TRP #4 may select the next K ports of the previously selected ports so that the transmission direction is changed at a constant movement angle in the clockwise direction to proceed with the beam sweeping operation. In this case, the movement angle may be, for example, 30°.

Accordingly, the first transceiver TRP #1 may select and activate the ports P01, P05, and P09 as an example in the next scheduling time t2. The first transceiver TRP #1 may allocate the sub-frequency band B #1 to the ports P01, P05, and P09 selected in the scheduling time t2. Then, the ports P01, P05, and P09 of the first transceiver TRP #1 may generate beams by using the sub-frequency band B #1 in the scheduling time t2.

Also, the second transceiver TRP #2 may select and activate the ports P02, P06 and P10 as an example in the next scheduling time t2. The second transceiver TRP #2 may allocate the sub-frequency band B #1 to the ports P02, P06, and P10 selected in the scheduling time t2. Then, the ports P02, P06, and P10 of the second transceiver TRP #2 may generate beams by using the sub-frequency band B #1 in the scheduling time t2.

Also, the third transceiver TRP #3 may select and activate ports the P03, P07, and P11 as an example in the next scheduling time t2. The third transceiver TRP #3 may allocate the sub-frequency band B #1 to the ports P03, P07, and P11 selected in the scheduling time t2. Then, the ports P03, P07, and P11 of the third transceiver TRP #3 may generate beams by using the sub-frequency band B #1 in the scheduling time t2.

Also, the fourth transceiver TRP #4 may select and activate the ports P00, P04, and P08 as an example in the next scheduling time t2. The fourth transceiver TRP #4 may allocate the sub-frequency band B #1 to the ports P00, P04, and P08 selected in the scheduling time t2. Then, the ports P00, P04, and P08 of the fourth transceiver TRP #4 may generate beams by using the sub-frequency band B #1 in the scheduling time t2.

In this case, the ports providing communication services to the service coverage of the unit cluster in the scheduling time t2 may be the port P05 of the first transceiver TRP #1, the port P06 of the second transceiver TRP #2, the port P03 of the third transceiver TRP #3, and the port P00 of the fourth transceiver TRP #4. As described above, the transceivers TRP #1 to TRP #4 may be configured such that the generated beams are repeatedly beam-swept to provide communication services to the service coverage of the unit cluster as the scheduling time progresses.

Figure 13:
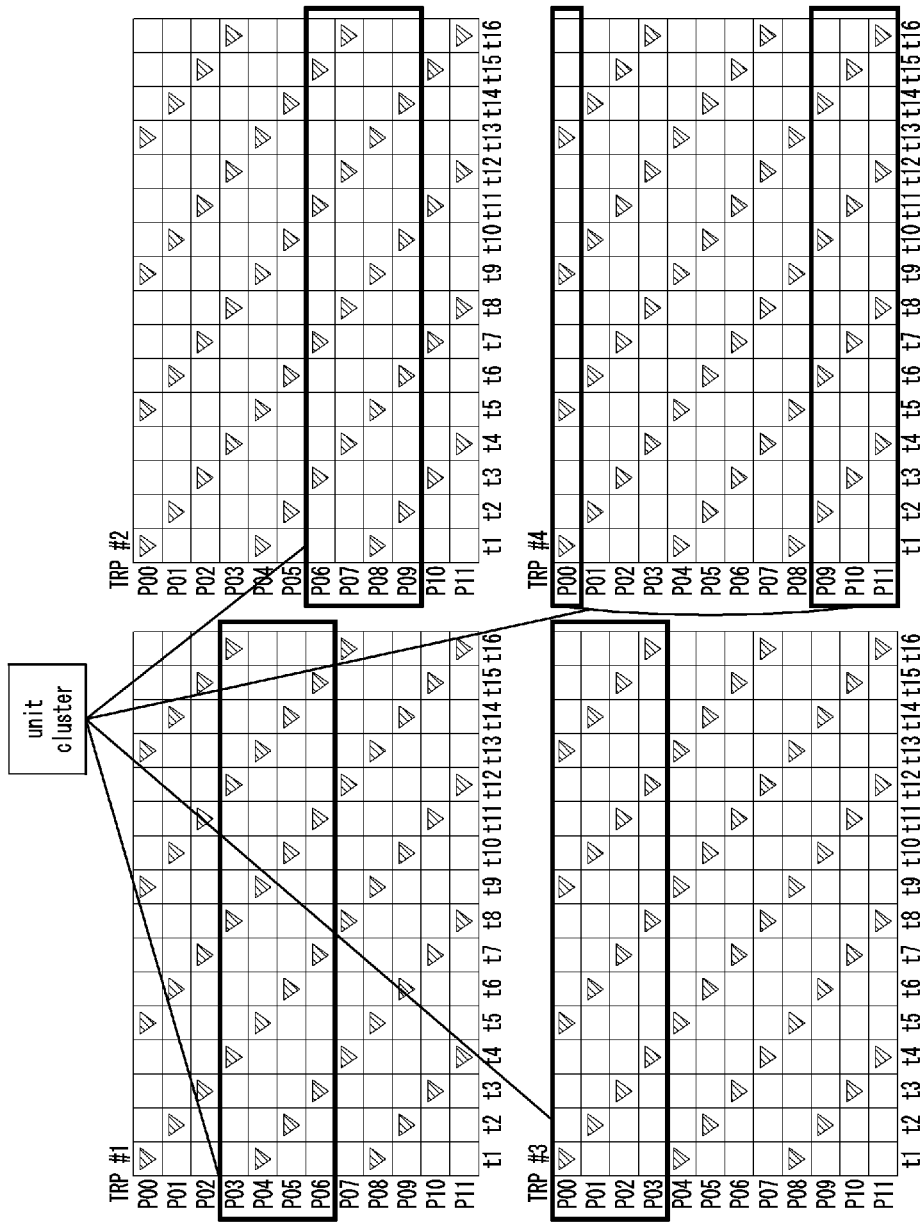
FIG. 13 is a conceptual diagram illustrating a first exemplary embodiment of beams transmitted by transceivers over time.

FIG. 13 is a conceptual diagram illustrating a first exemplary embodiment of beams transmitted by transceivers over time.

Referring to FIG. 13, beams transmitted by transceivers using a sub-frequency band B #1 at scheduling times t1 to t16 are indicated by triangles. Here, the horizontal axis may be a time axis, and the scheduling times (i.e., t1 to t16) may be indicated. The vertical axis may be a port index axis, and port indexes P00 to P11 of transceivers TRP #1 to TRP #4 may be indicated. Boxes identified by solid lines may indicate port indexes of the transceivers TRP #1 to TRP #4 that transmit beams to the service coverage of the unit cluster and the beams over time. For example, in the first transceiver TRP #1, four ports P03, P04, P05, and P06 may transmit beams to the service coverage of the unit cluster by using the sub-frequency band B #1, and in the second transceiver TRP #2, four ports P06, P07, P08 and P09 may transmit beams to the service coverage of the unit cluster by using the sub-frequency band B #1. In addition, in the third transceiver TRP #3, four ports P00, P01, P02 and P03 may transmit beams to the service coverage of the unit cluster by using the sub-frequency band B #1, and in the fourth transceiver TRP #4, four ports P09, P10, P11, and P00 may transmit beams to the service coverage of the unit cluster by using the sub-frequency band B #1.

Figure 14:
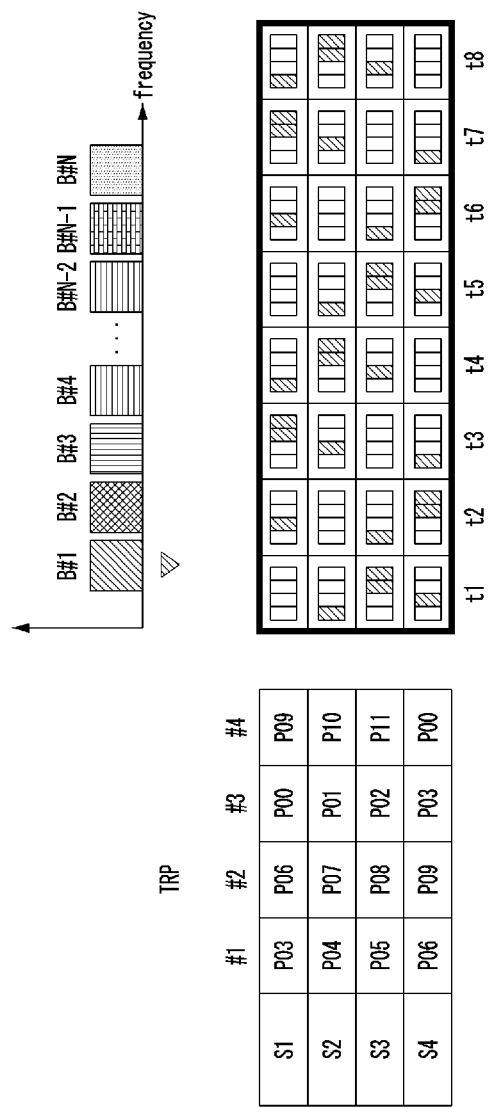
FIG. 14 is a conceptual diagram integrally illustrating the beams transmitted by the transceivers of FIG. 13 over time.

FIG. 14 is a conceptual diagram integrally illustrating the beams transmitted by the transceivers of FIG. 13 over time.

Referring to FIG. 14, the port P03 of the first transceiver TRP #1, the port P06 of the second transceiver TRP #2, the port P00 of the third transceiver TRP #3, and the port P09 of the fourth transceiver TRP #4 may form a first port set S1 involved in unit cluster configuration. The port P04 of the first transceiver TRP #1, the port P07 of the second transceiver TRP #2, the port P01 of the third transceiver TRP #3, and the port P10 of the fourth transceiver TRP #4 may form a second port set S2 involved in unit cluster configuration. The port P05 of the first transceiver TRP #1, the port P08 of the second transceiver TRP #2, the port P02 of the third transceiver TRP3, and the port P11 of the fourth transceiver TRP #4 may form a third port set S3 involved in unit cluster configuration. The port P06 of the first transceiver TRP #1, the port P09 of the second transceiver TRP #2, the port P03 of the third transceiver TRP #3, and the port P00 of the fourth transceiver TRP #4 may form a fourth port set S4 involved in unit cluster configuration.

As described above, beams transmitted by the port sets S1 to S4 using the sub-frequency band B #1 in the service coverage of the unit cluster in a scheduling time may be identified for each port set. As such, if beams transmitted by the port sets S1 to S4 to the service coverage of the unit cluster in a scheduling time are identified for each port set, it is possible to easily determine which port set(s) are involved in communication services. For example, in a scheduling time t1, the first port set S1 may not participate in the communication services for the service coverage of the unit cluster. On the other hand, in the scheduling time t1, the second to fourth port sets S2 to S4 may be involved in the communication services for the service coverage of the unit cluster. In particular, in the scheduling time t1, it can be easily seen that two ports of the third port set S3 are involved in the communication services for the service coverage of the unit cluster.

Figure 15A:
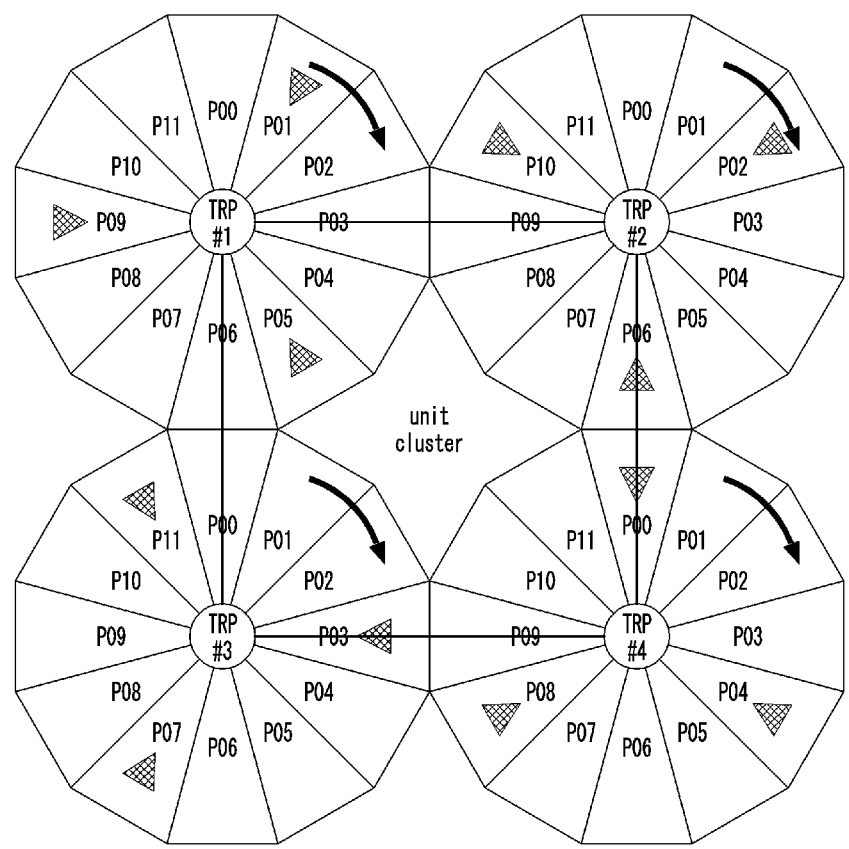
FIGS. 15A and 15B are conceptual diagram illustrating a second exemplary embodiment of a unit cluster operation method.
Figure 15B:
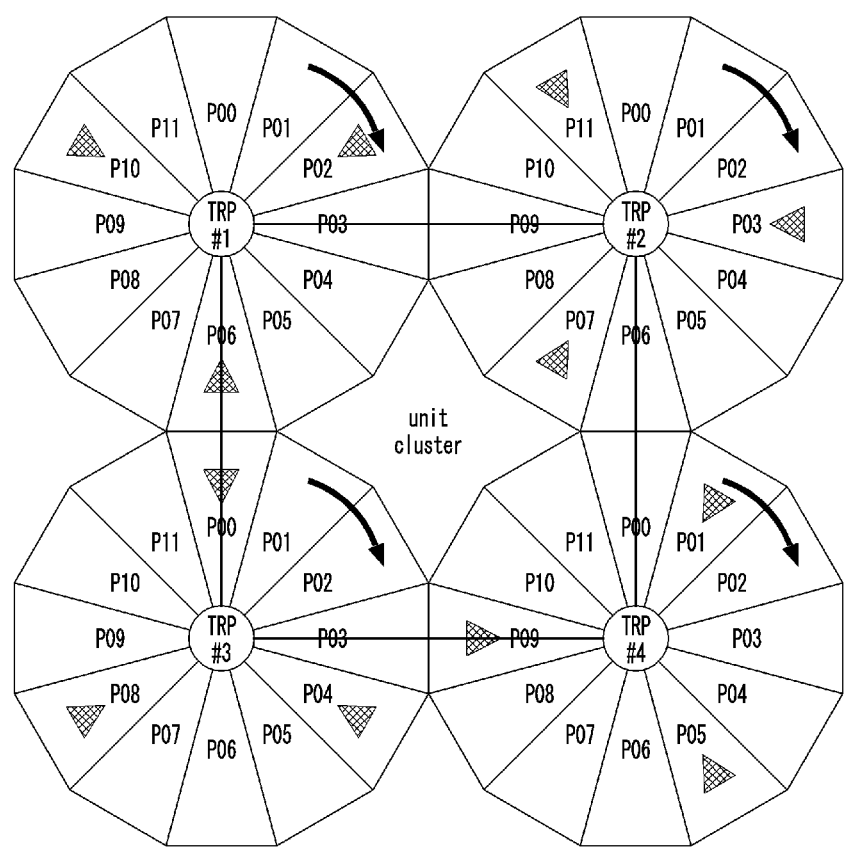

FIGS. 15A and 15B are conceptual diagram illustrating a second exemplary embodiment of a unit cluster operation method.

Referring to FIG. 15A, a first transceiver TRP #1 may allocate a sub-frequency band B #2 to ports P05, P09, and P01 in a scheduling time t1. Accordingly, the first transceiver TRP #1 may generate beams through the ports P05, P09, and P01 by using the sub-frequency band B #2 in the scheduling time t1, and transmit signals to a device by using the generated beams. A second transceiver TRP #2 may allocate the sub-frequency band B #2 to ports P02, P06 and P10 at scheduling time t1. Accordingly, the second transceiver TRP #2 may generate beams through the ports P02, P06, and P10 by the using sub-frequency band B #2 in the scheduling time t1, and transmit signals to the device by using the generated beams. A third transceiver TRP #3 may allocate the sub-frequency band B #2 to ports P03, P07, and P11 in the scheduling time t1. Accordingly, the third transceiver TRP #3 may generate beams through the ports P03, P07, and P11 by using the sub-frequency band B #2 in the scheduling time t1, and transmit signals to the device by using the generated beams. A fourth transceiver TRP #4 may allocate the sub-frequency band B #2 to ports P04, P08 and P00 in the scheduling time t1. Accordingly, the fourth transceiver TRP #4 may generate beams through the ports P04, P08 and P00 by using the sub-frequency band B #2 in the scheduling time t1, and transmit signals to the device by using the generated beams. In this case, the ports providing communication services to the service coverage of the unit cluster in the scheduling time t1 may be the port P05 of the first transceiver TRP #1, the port P06 of the second transceiver TRP #2, the port P03 of the third transceiver TRP #3, and the port P00 of the fourth transceiver TRP #4.

Referring to FIG. 15B, the first transceiver TRP #1 may allocate the sub-frequency band B #2 to ports P02, P06 and P10 in a scheduling time t2. Accordingly, the first transceiver TRP #1 may generate beams through the ports P02, P06, and P10 by the using sub-frequency band B #2 in the scheduling time t2, and transmit signals to the device by using the generated beams. The second transceiver TRP #2 may allocate the sub-frequency band B #2 to ports P03, P07 and P11 in the scheduling time t2. Accordingly, the second transceiver TRP #2 may generate beams through the ports P03, P07, and P11 by using the sub-frequency band B #2 in the scheduling time t2, and transmit signals to the device by using the generated beams. The third transceiver TRP #3 may allocate the sub-frequency band B #2 to ports P00, P04, and P08 in the scheduling time t2. Accordingly, the third transceiver TRP #3 may generate beams through the ports P00, P04, and P08 by using the sub-frequency band B #2 in the scheduling time t2, and transmit signals to the device by using the generated beams. The fourth transceiver TRP #4 may allocate the sub-frequency band B #2 to ports P01, P05, and P09 in the scheduling time t2. Accordingly, the fourth transceiver TRP #4 may generate beams through the ports P01, P05, and P09 by using the sub-frequency band B #2 in the scheduling time t2, and transmit signals to the device by using the generated beams. In this case, the ports providing communication services to the service coverage of the unit cluster in the scheduling time t2 may be the port P06 of the first transceiver TRP #1, the port P07 of the second transceiver TRP #2, the port P04 of the third transceiver TRP #3, and the port P01 of the fourth transceiver TRP #4.

As described above, the transceivers TRP #1 to TRP #4 may be configured such that the generated beams are repeatedly beam-swept to provide communication services to the service coverage of the unit cluster over time.

Figure 16:
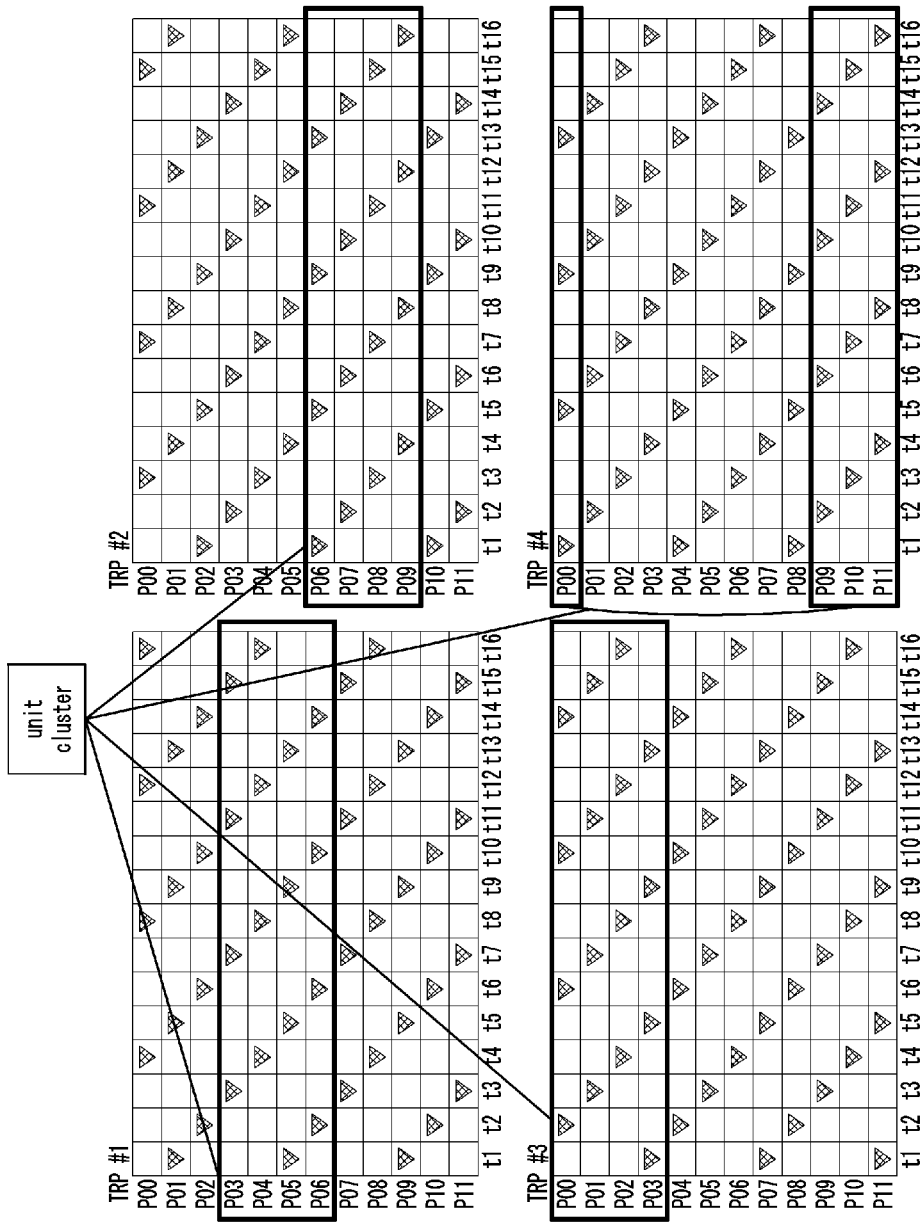
FIG. 16 is a conceptual diagram illustrating a second exemplary embodiment of beams transmitted by transceivers over time.

FIG. 16 is a conceptual diagram illustrating a second exemplary embodiment of beams transmitted by transceivers over time.

Referring to FIG. 16, beams transmitted by transceivers using the sub-frequency band B #2 in scheduling times t1 to t16 may be indicated by triangles. Here, the horizontal axis may be a time axis, and the scheduling times (i.e., t1 to t16) may be indicated. The vertical axis may be a port index axis, and port indexes P00 to P11 of the transceivers TRP #1 to TRP #4 may be indicated. Boxes identified by solid lines may indicate port indexes of the transceivers TRP #1 to TRP #4 that transmit beams to the service coverage of the unit cluster and the beams over time. For example, in the first transceiver TRP #1, four ports P03, P04, P05, and P06 may transmit beams to the service coverage of the unit cluster by using the sub-frequency band B #2, and in the second transceiver TRP #2, four ports P06, P07, P08 and P09 may transmit beams to the service coverage of the unit cluster by using the sub-frequency band B #2. In addition, in the third transceiver TRP #3, four ports P00, P01, P02 and P03 may transmit beams to the service coverage of the unit cluster by using the sub-frequency band B #2, and in the fourth transceiver TRP #4, four ports P09, P10, P11, and P00 may transmit beams to the service coverage of the unit cluster by using the sub-frequency band B #2.

Figure 17:
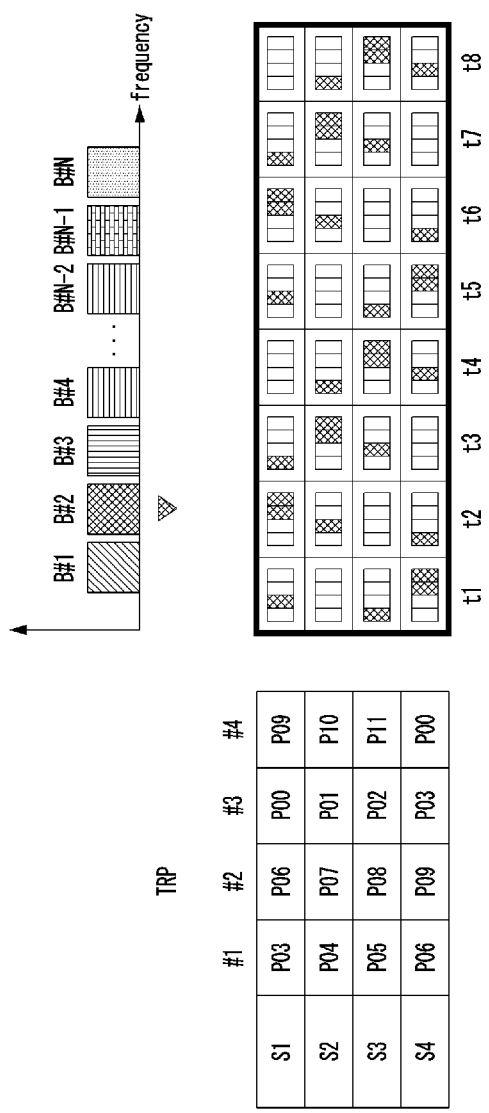
FIG. 17 is a conceptual diagram integrally illustrating the beams transmitted by the transceivers of FIG. 16 over time.

FIG. 17 is a conceptual diagram integrally illustrating the beams transmitted by the transceivers of FIG. 16 over time.

Referring to FIG. 17, the port P03 of the first transceiver TRP #1, the port P06 of the second transceiver TRP #2, the port P00 of the third transceiver TRP #3, and the port P09 of the fourth transceiver TRP #4 may form a first port set S1 involved in unit cluster configuration. The port P04 of the first transceiver TRP #1, the port P07 of the second transceiver TRP #2, the port P01 of the third transceiver TRP #3, and the port P10 of the fourth transceiver TRP #4 may form a second port set S2 involved in unit cluster configuration. The port P05 of the first transceiver TRP #1, the port P08 of the second transceiver TRP #2, the port P02 of the third transceiver TRP3, and the port P11 of the fourth transceiver TRP #4 may form a third port set S3 involved in unit cluster configuration. The port P06 of the first transceiver TRP #1, the port P09 of the second transceiver TRP #2, the port P03 of the third transceiver TRP #3, and the port P00 of the fourth transceiver TRP #4 may form a fourth port set S4 involved in unit cluster configuration.

As described above, beams transmitted by the port sets S1 to S4 using the sub-frequency band B #2 in the service coverage of the unit cluster in a scheduling time may be identified for each port set. As such, if beams transmitted by the port sets S1 to S4 to the service coverage of the unit cluster in a scheduling time are identified for each port set, it is possible to easily determine which port set(s) are involved in communication services. For example, in a scheduling time t2, the second port set S2 may not participate in the communication services for the service coverage of the unit cluster. On the other hand, in the scheduling time t2, the first, third, and fourth port sets S1, S3, and S4 may be involved in the communication services for the service coverage of the unit cluster. In particular, in the scheduling time t2, it can be easily seen that two ports of the fourth port set S4 are involved in the communication services for the service coverage of the unit cluster.

Meanwhile, one transceiver may allocate four beams of four sub-frequency bands B #1 to B #4 three times in succession to 12 ports, so that interference between the four beams does not occur.

Figure 18A:
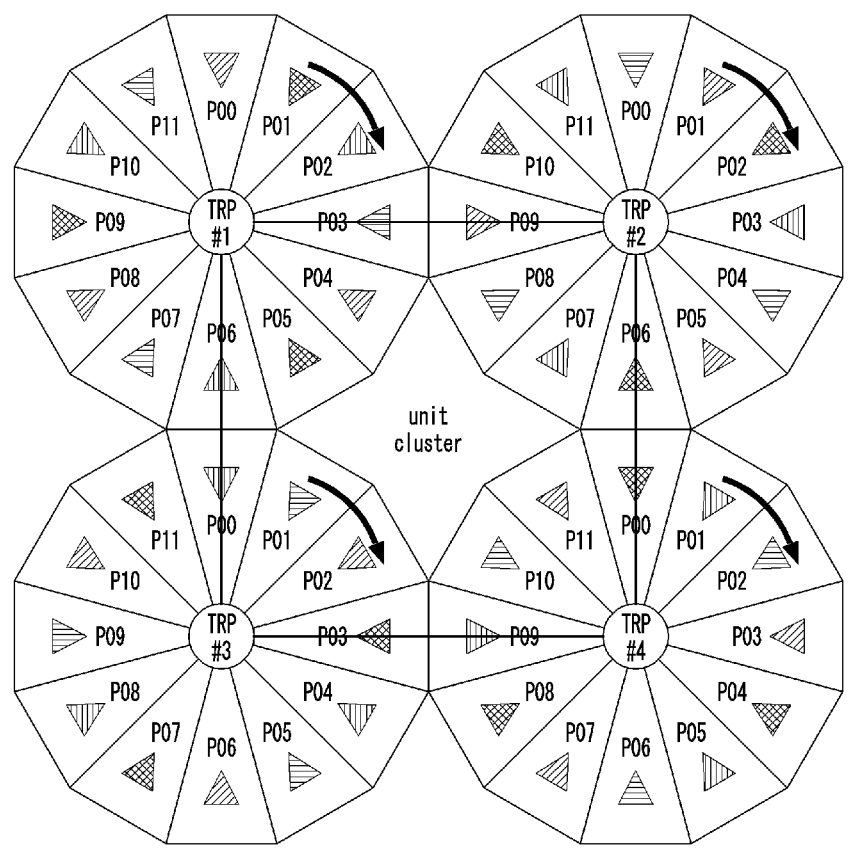
FIGS. 18A and 18B are conceptual diagrams illustrating a third exemplary embodiment of a unit cluster operation method.
Figure 18B:
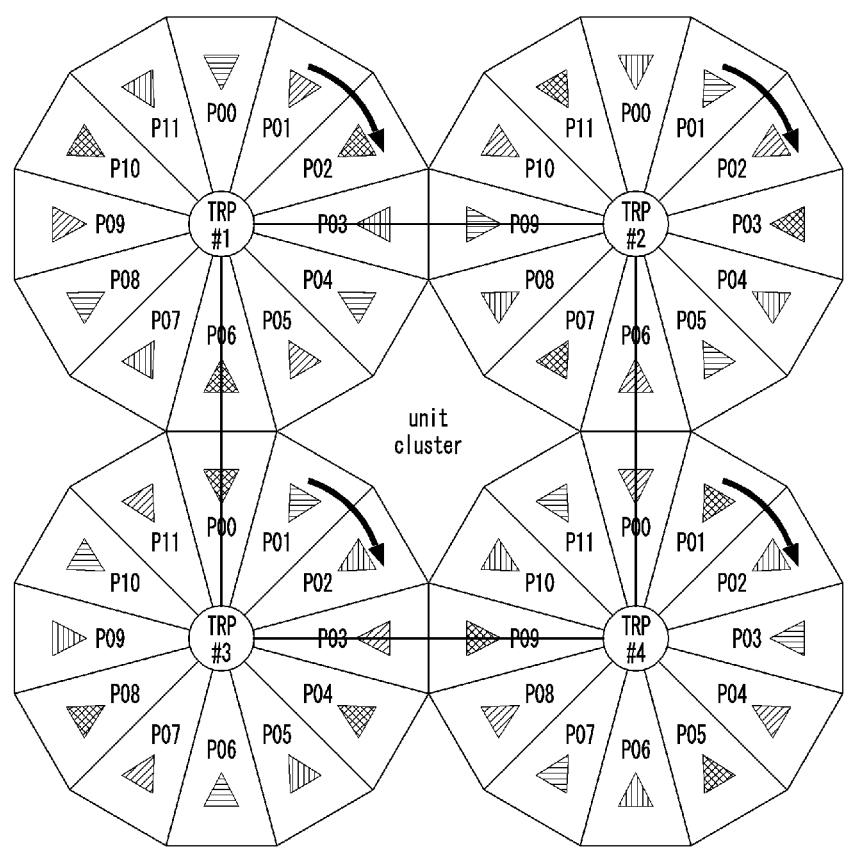

FIGS. 18A and 18B are conceptual diagrams illustrating a third exemplary embodiment of a unit cluster operation method.

Referring to FIG. 18A, a first transceiver TRP #1 may allocate a sub-frequency band B #1 to ports P00, P04 and P08 in a scheduling time t1. Accordingly, the first transceiver TRP #1 may generate beams through the ports P00, P04, and P08 by using the sub-frequency band B #1 in the scheduling time t1, and transmit signals to a device by using the generated beams. Also, the first transceiver TRP #1 may allocate a sub-frequency band B #2 to ports P01, P05, and P09 in the scheduling time t1. Accordingly, the first transceiver TRP #1 may generate beams through the ports P01, P05, and P09 by using the sub-frequency band B #2 in the scheduling time t1, and transmit signals to the device by using the generated beams.

Also, the first transceiver TRP #1 may allocate a sub-frequency band B #3 to ports P02, P06 and P10 in the scheduling time t1. Accordingly, the first transceiver TRP #1 may generate beams through the ports P02, P06, and P10 by using the sub-frequency band B #3 in the scheduling time t1, and transmits signals to the device by using the generated beams. Also, the first transceiver TRP #1 may allocate a sub-frequency band B #4 to ports P03, P07, and P #11 in the scheduling time t1. Accordingly, the first transceiver TRP #1 may generate beams through the ports P03, P07, and P11 by using the sub-frequency band B #4 in the scheduling time t1, and transmit signals to the device by using the generated beams.

Further, a second transceiver TRP #2 may allocate the sub-frequency band B #1 to ports P01, P05, and P09 in the scheduling time t1. Accordingly, the second transceiver TRP #2 may generate beams through the ports P01, P05, and P09 by using the sub-frequency band B #1 in the scheduling time t1, and transmit signals to the device by using the generated beams. Also, the second transceiver TRP #2 may allocate the sub-frequency band B #2 to ports P02, P06 and P10 in the scheduling time t1. Accordingly, the second transceiver TRP #2 may generate beams through the ports P02, P06, and P10 by using the sub-frequency band B #2 in the scheduling time t1, and transmit signals to the device by using the generated beams.

Also, the second transceiver TRP #2 may allocate the sub-frequency band B #3 to ports P03, P07, and P11 in the scheduling time t1. Accordingly, the second transceiver TRP #2 may generate beams through the ports P03, P07, and P11 by using the sub-frequency band B #3 in the scheduling time t1, and transmit signals to the device by using the generated beams. Also, the second transceiver TRP #2 may allocate the sub-frequency band B #4 to ports P04, P08 and P00 in the scheduling time t1. Accordingly, the second transceiver TRP #2 may generate beams through the ports P04, P08, and P00 by using the sub-frequency band B #4 in the scheduling time t1, and transmit signals to the device by using the generated beams.

Further, a third transceiver TRP #3 may allocate the sub-frequency band B #1 to ports P02, P06 and P10 in the scheduling time t1. Accordingly, the third transceiver TRP #3 may generate beams through the ports P02, P06, and P10 by using the sub-frequency band B #1 in the scheduling time t1, and transmit signals to the device by using the generated beams. Also, the third transceiver TRP #3 may allocate the sub-frequency band B #2 to ports P03, P07 and P11 in the scheduling time t1. Accordingly, the third transceiver TRP #3 may generate beams through the ports P03, P07, and P11 by using the sub-frequency band B #2 in the scheduling time t1, and transmit signals to the device by using the generated beams.

Also, the third transceiver TRP #3 may allocate the sub-frequency band B #3 to ports P04, P08 and P00 in the scheduling time t1. Accordingly, the third transceiver TRP #3 may generate beams through the ports P04, P08, and P00 by using the sub-frequency band B #3 in the scheduling time t1, and transmit signals to the device by using the generated beams. Also, the third transceiver TRP #3 may allocate the sub-frequency band B #4 to ports P05, P09 and P01 in scheduling time t1. Accordingly, the third transceiver TRP #3 may generate beams through the ports P05, P09, and P01 by using the sub-frequency band B #4 in the scheduling time t1, and transmit signals to the device by using the generated beams.

Further, a fourth transceiver TRP #4 may allocate the sub-frequency band B #1 to ports P03, P07, and P11 in the scheduling time t1. Accordingly, the fourth transceiver TRP #4 may generate beams through the ports P03, P07, and P11 by using of the sub-frequency band B #1 in the scheduling time t1, and transmit signals to the device by using the generated beams. Also, the fourth transceiver TRP #4 may allocate the sub-frequency band B #2 to ports P04, P08 and P00 in the scheduling time t1. Accordingly, the fourth transceiver TRP #4 may generate beams through the ports P04, P08, and P00 by using the sub-frequency band B #2 in the scheduling time t1, and transmit signals to the device by using the generated beams.

Also, the fourth transceiver TRP #4 may allocate the sub-frequency band B #3 to ports P05, P09 and P01 in the scheduling time t1. Accordingly, the fourth transceiver TRP #4 may generate beams through the ports P05, P09 and P01 by using the sub-frequency band B #3 in the scheduling time t1, and transmit signals to the device by using the generated beams. Also, the fourth transceiver TRP #4 may allocate the sub-frequency band B #4 to ports P06, P10, and P02 in the scheduling time t1. Accordingly, the fourth transceiver TRP #4 may generate beams through the ports P06, P10, and P02 by using the sub-frequency band B #4 in the scheduling time t1, and transmit signals to the device by using the generated beams.

Referring to FIG. 18B, the first transceiver TRP #1 may allocate the sub-frequency band B #1 to ports P01, P05, and P09 in a scheduling time t2. Accordingly, the first transceiver TRP #1 may generate beams through the ports P01, P05, and P09 by using the sub-frequency band B #1 in the scheduling time t2, and transmit signals to the device by using the generated beams. Also, the first transceiver TRP #1 may allocate the sub-frequency band B #2 to ports P02, P06 and P10 in the scheduling time t2. Accordingly, the first transceiver TRP #1 may generate beams through the ports P02, P06, and P10 by using the sub-frequency band B #2 in the scheduling time t2, and transmit signals to the device by using the generated beams.

Also, the first transceiver TRP #1 may allocate the sub-frequency band B #3 to ports P03, P07, and P11 in the scheduling time t2. Accordingly, the first transceiver TRP #1 may generate beams through the ports P03, P07, and P11 by using the sub-frequency band B #3 in the scheduling time t2, and transmit signals to the device by using the generated beams. Also, the first transceiver TRP #1 may allocate the sub-frequency band B #4 to ports P04, P08 and P00 in the scheduling time t2. Accordingly, the first transceiver TRP #1 may generate beams through the ports P04, P08 and P00 by using the sub-frequency band B #4 in the scheduling time t2, and transmit signals to the device by using the generated beams.

Further, the second transceiver TRP #2 may allocate the sub-frequency band B #1 to ports P02, P06 and P10 in the scheduling time t2. Accordingly, the second transceiver TRP #2 may generate beams through the ports P02, P06, and P10 by using the sub-frequency band B #1 in the scheduling time t2, and transmit signals to the device by using the generated beams. Also, the second transceiver TRP #2 may allocate the sub-frequency band B #2 to ports P03, P07, and P11 in the scheduling time t2. Accordingly, the second transceiver TRP #2 may generate beams through the ports P03, P07, and P11 by using the sub-frequency band B #2 in the scheduling time t2, and transmit signals to the device by using the generated beams.

Also, the second transceiver TRP #2 may allocate the sub-frequency band B #3 to ports P04, P08, and P00 in the scheduling time t2. Accordingly, the second transceiver TRP #2 may generate beams through the ports P04, P08, and P00 by using the sub-frequency band B #3 in the scheduling time t2, and transmit signals to the device by using the generated beams. Also, the second transceiver TRP #2 may allocate the sub-frequency band B #4 to ports P05, P09 and P01 in the scheduling time t2. Accordingly, the second transceiver TRP #2 may generate beams through the ports P05, P09, and P01 by using the sub-frequency band B #4 in the scheduling time t2, and transmit signals to the device by using the generated beams.

Further, the third transceiver TRP #3 may allocate the sub-frequency band B #1 to ports P03, P07, and P11 in the scheduling time t2. Accordingly, the third transceiver TRP #3 may generate beams through the ports P03, P07, and P11 by using the sub-frequency band B #1 in the scheduling time t2, and transmit signals to the device by using the generated beams. Also, the third transceiver TRP #3 may allocate the sub-frequency band B #2 to ports P04, P08, and P00 in the scheduling time t2. Accordingly, the third transceiver TRP #3 may generate beams through the ports P04, P08, and P00 by using the sub-frequency band B #2 in the scheduling time t2, and transmit signals to the device by using the generated beams.

Also, the third transceiver TRP #3 may allocate the sub-frequency band B #3 to ports P05, P09, and P01 in the scheduling time t2. Accordingly, the third transceiver TRP #3 may generate beams through the ports P05, P09, and P01 by using of the sub-frequency band B #3 in the scheduling time t2, and transmit signals to the device by using the generated beams. Also, the third transceiver TRP #3 may allocate the sub-frequency band B #4 to ports P06, P10, and P02 in the scheduling time t2. Accordingly, the third transceiver TRP #3 may generate beams through the ports P06, P10, and P02 by using the sub-frequency band B #4 in the scheduling time t2, and transmit signals to the device by using the generated beams.

Further, the fourth transceiver TRP #4 may allocate the sub-frequency band B #1 to ports P04, P08 and P00 in the scheduling time t2. Accordingly, the fourth transceiver TRP #4 may generate beams through the ports P04, P08, and P00 by using the sub-frequency band B #1 in the scheduling time t2, and transmit signals to the device by using the generated beams. Also, the fourth transceiver TRP #4 may allocate the sub-frequency band B #2 to ports P05, P09 and P01 in the scheduling time t2. Accordingly, the fourth transceiver TRP #4 may generate beams through the ports P05, P09, and P01 by using the sub-frequency band B #2 in the scheduling time t2, and transmit signals to the device by using the generated beams.

Also, the fourth transceiver TRP #4 may allocate the sub-frequency band B #3 to ports P06, P10, and P02 in the scheduling time t2. Accordingly, the fourth transceiver TRP #4 may generate beams through the ports P06, P10 and P02 by using the sub-frequency band B #3 in the scheduling time t2, and transmit signals to the device by using the generated beams. Also, the fourth transceiver TRP #4 may allocate the sub-frequency band B #4 to ports P07, P11 and P03 in the scheduling time t2. Accordingly, the fourth transceiver TRP #4 may generate beams through the ports P07, P11, and P03 by using the sub-frequency band B #4 in the scheduling time t2, and transmit signals to the device by using the generated beams.

As described above, the transceiver constituting the unit cluster may allocate four beams of four sub-frequency bands B #1 to B #4 three times in succession to 12 ports, so that interference between the four beams does not occur.

Figure 19:
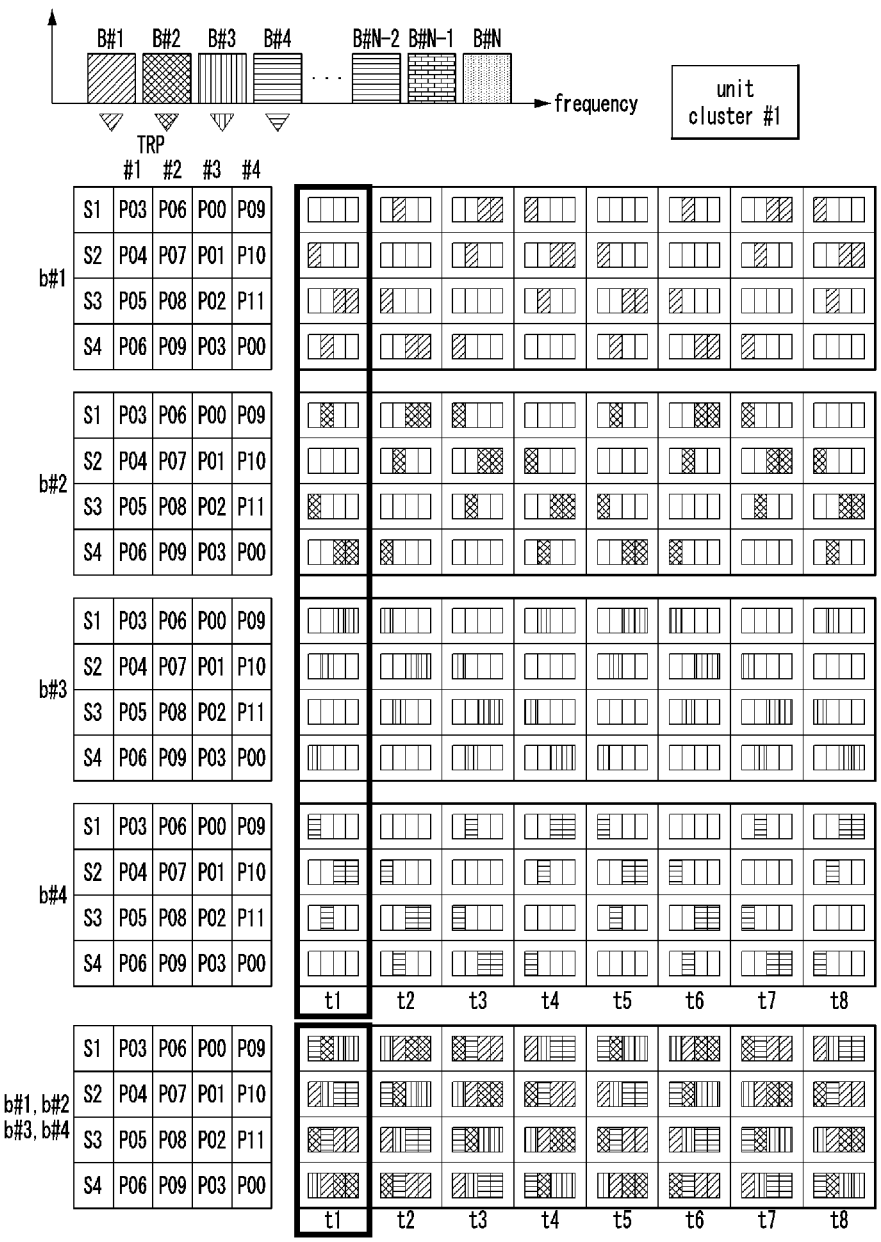
FIG. 19 is a conceptual diagram illustrating a third exemplary embodiment of beams transmitted by transceivers over time.

FIG. 19 is a conceptual diagram illustrating a third exemplary embodiment of beams transmitted by transceivers over time.

Referring to FIG. 19, the port P03 of the first transceiver TRP #1, the port P06 of the second transceiver TRP #2, the port P00 of the third transceiver TRP #3, and the port P09 of the fourth transceiver TRP #4 may form a first port set S1 involved in unit cluster configuration. The port P04 of the first transceiver TRP #1, the port P07 of the second transceiver TRP #2, the port P01 of the third transceiver TRP #3, and the port P10 of the fourth transceiver TRP #4 may form a second port set S2 involved in unit cluster configuration. The port P05 of the first transceiver TRP #1, the port P08 of the second transceiver TRP #2, the port P02 of the third transceiver TRP3, and the port P11 of the fourth transceiver TRP #4 may form a third port set S3 involved in unit cluster configuration. The port P06 of the first transceiver TRP #1, the port P09 of the second transceiver TRP #2, the port P03 of the third transceiver TRP #3, and the port P00 of the fourth transceiver TRP #4 may form a fourth port set S4 involved in unit cluster configuration.

As described above, beams transmitted by the port sets S1 to S4 in the service coverage of the unit cluster in scheduling times may be identified for each sub-frequency band. As such, if beams transmitted by the port sets S1 to S4 to the service coverage of the unit cluster in scheduling times are identified for each sub-frequency band, it is possible to easily determine the number of ports involved in communication services. Accordingly, the number of ports participating in the communication services using any one sub-frequency band for the service coverage of the unit cluster in any one scheduling time may be 4. In addition, the number of ports involved in the communication services for the service coverage of the unit cluster in one scheduling time may be a total of 16. As such, since a total of 16 ports form beams in the service coverage of the unit cluster in one scheduling time to provide the communication services, the blocking probability may be reduced. In addition, since a total of 16 ports form beams in the service coverage of the unit cluster to provide the communication services, it is possible to provide radio capacity without interferences.

Referring to FIG. 19, the beams transmitted by the port sets S1 to S4 in the service coverage of the unit cluster in the scheduling times may be integrally shown in the entire sub-frequency band.

Meanwhile, a central control apparatus performing a scheduling function may transmit scheduling information to the terminal through a control channel using at least one transceiver belonging to each unit cluster. In this case, the scheduling information may include a unit cluster identifier, identifiers of transceivers constituting the unit cluster, port indexes for each transceiver providing communication services to the unit cluster, and information on a time period during which port indexes for each transceiver are activated. A schematic representation of such the scheduling information may be shown in FIG. 17 or FIG. 19. Here, the scheduling information may further include information on positions of the transceivers.

Accordingly, the terminal may receive the scheduling information from at least one transceiver belonging to the unit cluster. In addition, the terminal may identify the identifier of the unit cluster providing communication services to the service coverage to which the terminal belongs, from the scheduling information. Also, from the scheduling information, the terminal may identify the identifiers of the transceivers belonging to the unit cluster that provides the communication services to the service coverage of the unit cluster in which it is located. In addition, the terminal may identify the indexes of the ports by which each transceiver provides communication services from the scheduling information. In addition, the terminal may identify the information on the time period during which the ports for each transceiver are activated to provide the communication services from the scheduling information.

As an example, from the scheduling information of FIG. 17, the terminal may identify that the port P04 of the TRP #1, the port P09 of the TRP #2, the port P02 of TRP #3, and the port P11 of TRP #04 are activated using the sub-frequency band B #1 in the scheduling time t4. Accordingly, the terminal may transmit and receive data by forming a radio link with at least one port among the corresponding ports in the scheduling time t4. Also, from the scheduling information of FIG. 17, the terminal may identify that the port P05 of TRP #1, the port P06 of TRP #2, the port P03 of TRP #3, and the port P00 of TRP #04 are activated in the scheduling time t1. Accordingly, the terminal may transmit and receive data by forming a radio link with at least one port among the corresponding ports at the scheduling time t1.

As another example, from the scheduling information of FIG. 19, the terminal may identify that the port P04 of TRP #1, the port P09 of TRP #2, the port P02 of TRP #3, and the port P11 of TRP #04 are activated by using the sub-frequency band B #1 in the scheduling time t1, that the port P05 of TRP #1, the port P06 of TRP #2, the port P03 of TRP #3, and the port P00 of TRP #04 are activated using the sub-frequency band B #2 in the scheduling time t1, that the port P06 of TRP #1, the port P07 of TRP #2, the port P00 of TRP #3, and the port P09 of TRP #04 are activated using sub-frequency band B #3 in the scheduling time t1, and that the port P03 of TRP #1, the port P08 of TRP #2, the port P01 of TRP #3, and the port P10 of TRP #4 are activated by using the sub-frequency band B #4 in scheduling time t1. Accordingly, the terminal may transmit and receive data by forming a radio link using at least one port among the corresponding ports and at least one sub-frequency band in the scheduling time t1.

Further, from the scheduling information of FIG. 19, the terminal may identify that the port P05 of TRP #1, the port P06 of TRP #2, the port P03 of TRP #3, and the port P00 of TRP #04 are activated by using the sub-frequency band B #1 in the scheduling time t2, that the port P06 of TRP #1, the port P07 of TRP #2, the port P00 of TRP #3, and the port P09 of TRP #04 are activated by using the sub-frequency band B #2 in the scheduling time t2, that the port P03 of TRP #2, the port P08 of TRP #3, the port P01 of TRP #3, and the port P10 of TRP #04 are activated by using the sub-frequency band B #3 in the scheduling time t2, and that the port P04 of TRP #1, the port P09 of TRP #2, the port P02 of TRP #3, and the port P11 of TRP #04 are activated by using the sub-frequency band B #4 in the scheduling time t2. Accordingly, the terminal may transmit and receive data by forming a radio link using at least one port among the corresponding ports and at least one sub-frequency band in the scheduling time t2.

Meanwhile, the terminal may identify information on the positions of the transceivers additionally included in the scheduling information. In addition, the terminal may identify the unit cluster identifier of the unit cluster to which the terminal belongs based on its position information. Accordingly, the terminal may transmit and receive data by forming a radio link with ports of the transceivers included in the unit cluster according to the process described above.

Figure 20A:
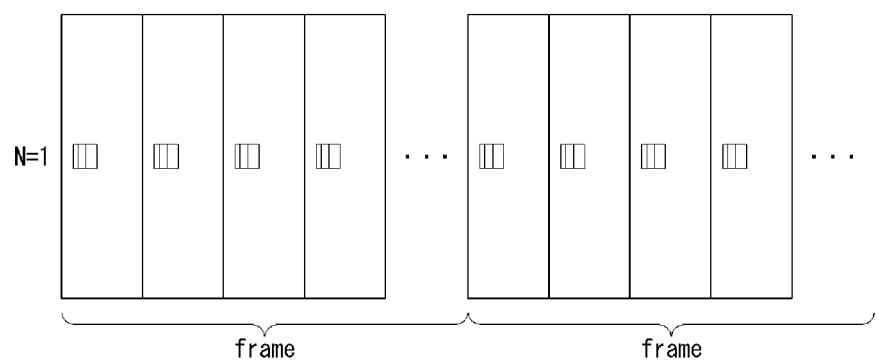
FIGS. 20A to 20C are conceptual diagrams illustrating a first exemplary embodiment of a method for transmitting a unit cluster identifier, a transceiver identifier, and a beam index.
Figure 20B:
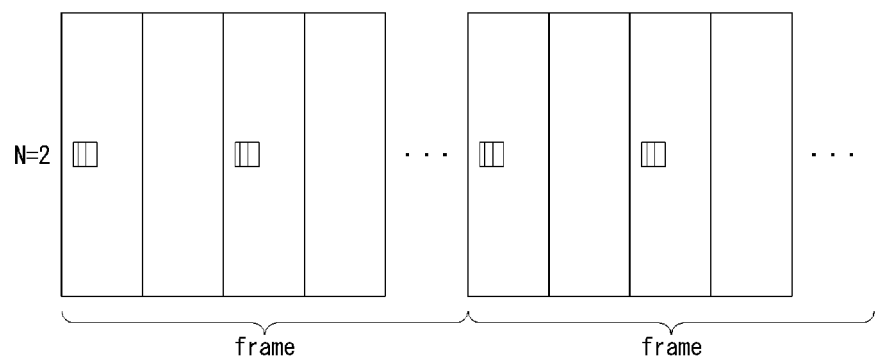
Figure 20C:
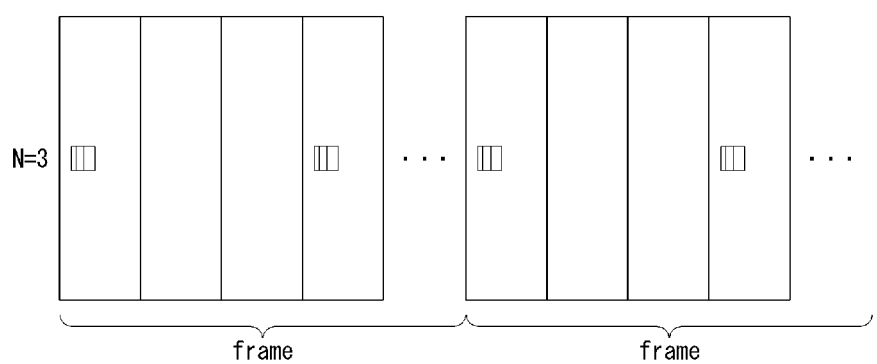

FIGS. 20A to 20C are conceptual diagrams illustrating a first exemplary embodiment of a method for transmitting a unit cluster identifier, a transceiver identifier, and a beam index.

Referring to FIGS. 20A to 20C, when each port of transceivers generates a beam and transmits signals, a central control apparatus may transmit, to a terminal, a subframe including a unit cluster identifier (ID), a transceiver identifier (ID), and a beam index for each corresponding beam on a data channel (e.g., physical downlink shared channel (PDSCH)) at an interval of L subframes. Here, N may be a natural number. Accordingly, the terminal may receive the subframe, and may obtain the unit cluster ID, transceiver ID, and beam index by decoding the received subframe. In this case, that the terminal can decode the received subframe may correspond to a case in which a received signal strength of the received subframe is equal to or greater than a certain threshold. That is, it may correspond to a case in which a beam direction of the beam generated by the port used to transmit the subframe in the transceiver may be a direction toward the terminal. On the other hand, when the beam direction of the beam generated by the port used to transmit the subframe in the transceiver is far away from the terminal, the terminal cannot decode the subframe.

Meanwhile, the terminal may feed the unit cluster ID, transceiver ID, and beam index, which are identified by decoding the subframe, back to at least one transceiver constituting the unit cluster. In this case, the terminal may transmit an ID of the terminal together to the transceiver. Accordingly, the transceiver may receive the unit cluster ID, transceiver ID, beam index, and the terminal ID from the terminal. Then, the transceiver may transmit, to the central control apparatus, the unit cluster ID, transceiver ID, beam index, and terminal ID, which are received from the terminal. Through the above process, the central control apparatus may receive, from the transceiver(s) belonging to the unit cluster, the feedback information including the unit cluster ID, transceiver ID, beam index, and terminal ID, which are received from the terminal. Also, the central control apparatus may estimate a position of the terminal based on the received feedback information.

In this regard, referring to FIG. 20A, in a case where N is 1, the transceivers may transmit the subframe including the unit cluster identifier, transceiver ID, and beam index to the terminal at an interval of one subframe. That is, each of the transceivers may transmit the subframe to the terminal by including the cluster ID, transceiver ID and beam index in the subframe (i.e., SF #0, SF #1, SF #2, SF #3, etc.). Here, the beam index may be a port index.

Alternatively, referring to FIG. 20B, in a case where N is 2, the transceivers may transmit the subframe including the unit cluster ID, transceiver ID and beam index to the terminal at an interval of two subframes. That is, each of the transceivers may transmit the subframe to the terminal by including the cluster ID, transceiver ID, and beam index in the subframe (e.g., SF #0, SF #2, SF #4, etc.).

Alternatively, referring to FIG. 20C, in a case where N is 3, the transceivers may transmit the subframe including the unit cluster ID, transceiver ID and beam index to the terminal at an interval of three subframes. That is, each of the transceivers may transmit the subframe to the terminal by including the cluster ID, transceiver ID, and beam index in the subframe (e.g., SF #0, SF #3, SF #6, etc.).

Meanwhile, the transceivers may define a cluster ID range, a transceiver ID range, and a beam index range by using flag bits.

FIGS. 21A to 21D are conceptual diagrams illustrating a first exemplary embodiment of a subframe for transmitting a cluster identifier, a transceiver identifier, and a beam index.

Referring to FIGS. 21A to 21D, a subframe may include cluster ID(s), transceiver ID(s), and beam index(es) in various manners by using two flag bits. In this regard, FIG. 21A may show a type 1 subframe. In the type 1 subframe, the flag bits may be set to '00', and 64 bits may be used for indicating the unit cluster IDs. In this case, one unit cluster ID may have a length of 4 bits. Accordingly, the type 1 subframe may include a total of 16 unit cluster IDs. In addition, in the type 1 subframe, 180 bits may be allocated as bits for indicating the transceiver IDs. In this case, one transceiver ID may have a length of 5 bits. Accordingly, the type 1 subframe may include a total of 36 transceiver IDs. In addition, 2048 bits may be allocated as bits for indicating the beam indexes. In this case, one beam index may have a length of 8 bits. Accordingly, the type 1 subframe may include a total of 256 beam indexes.

Figure 21A:
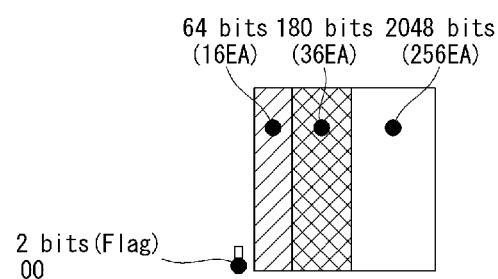
FIGS. 21A to 21D are conceptual diagrams illustrating a first exemplary embodiment of a subframe for transmitting a cluster identifier, a transceiver identifier, and a beam index.
Figure 21B:
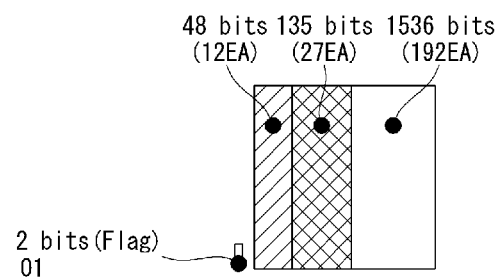

FIG. 21B may show a type 2 subframe. In the type 2 subframe, the flag bits may be set to '01', and 48 bits may be used for indicating the unit cluster IDs. In this case, one unit cluster ID may have a length of 4 bits. Accordingly, the type 2 subframe may include a total of 12 unit cluster IDs. In addition, in the type 2 subframe, 135 bits may be allocated as bits for indicating the transceiver IDs. In this case, one transceiver ID may have a length of 5 bits. Accordingly, the type 2 subframe may include a total of 27 transceiver IDs. In addition, in the type 2 subframe, 1536 bits may be allocated as bits for indicating the beam indexes. In this case, one beam index may have a length of 8 bits. Accordingly, the type 2 subframe may include a total of 192 beam indexes.

Figure 21C:
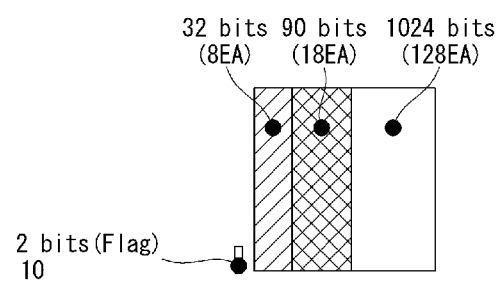

FIG. 21C may show a type 3 subframe. In the type 3 subframe, the flag bits may be set to '10', and 32 bits may be used for indicating the unit cluster IDs. In this case, one unit cluster ID may have a length of 4 bits. Accordingly, the type 3 subframe may include a total of 8 unit cluster IDs. In addition, in the type 3 subframe, 90 bits may be allocated as bits for indicating the transceiver IDs. In this case, one transceiver ID may have a length of 5 bits. Accordingly, the type 3 subframe may include a total of 18 transceiver IDs. In addition, in the type 3 subframe, 1024 bits may be allocated as bits for indicating the beam indexes. In this case, one beam index may have a length of 8 bits. Accordingly, the type 3 subframe may include a total of 128 beam indexes.

Figure 21D:
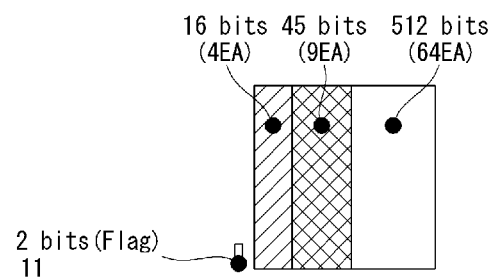

FIG. 21D may show a type 4 subframe. In the type 4 subframe, the flag bits may be set to '11', and 16 bits may be used for indicating the unit cluster IDs. In this case, one unit cluster ID may have a length of 4 bits. Accordingly, the type 4 subframe may include a total of 4 unit cluster IDs. In addition, in the type 4 subframe, 45 bits may be allocated as bits for indicating the transceiver IDs. In this case, one transceiver ID may have a length of 5 bits. Accordingly, the type 4 subframe may include a total of 9 transceiver IDs. In addition, in the type 4 subframe, 512 bits may be allocated as bits for indicating the beam indexes. In this case, one beam index may have a length of 8 bits. Accordingly, the type 4 subframe may include a total of 64 beam indexes.

Figure 22:
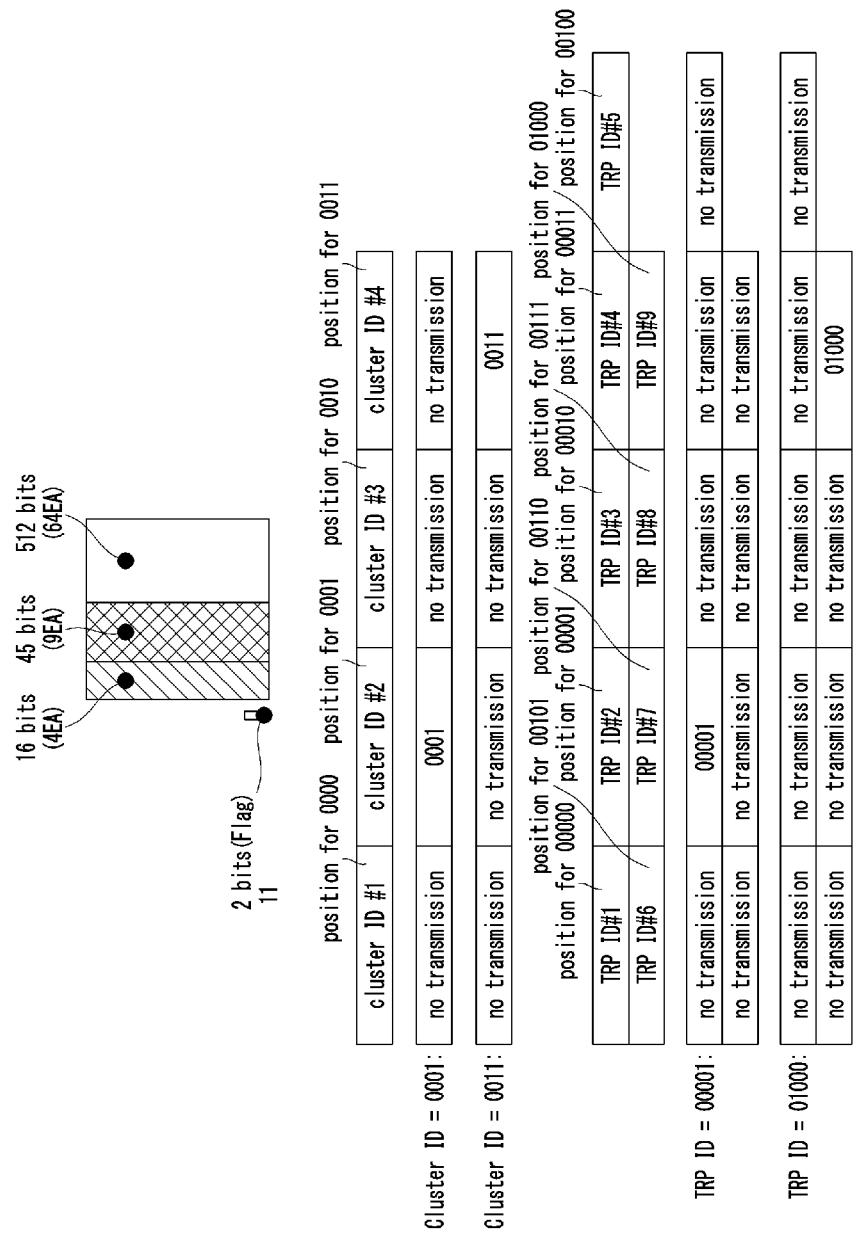
FIG. 22 is a conceptual diagram illustrating a first exemplary embodiment of a type 4 subframe.

FIG. 22 is a conceptual diagram illustrating a first exemplary embodiment of a type 4 subframe.

Referring to FIG. 22, the flag bits may be set to '11' in the type 4 subframe. The flag bits may be located at the beginning of the subframe. The bits used for indicating unit cluster IDs may be 16 bits. In this case, one unit cluster ID may have a length of 4 bits. Accordingly, the type 4 subframe may include a total of 4 unit cluster IDs. In this case, the unit cluster IDs may be 0000, 0001, 0010, and 0011. Further the unit cluster IDs may be located after the flag bits. In this case, the positions of the unit cluster IDs may be predetermined. The unit cluster IDs may be arranged in the order of 0000-0001-0010-0011. Accordingly, each of the unit cluster IDs may be allocated to and transmitted in the corresponding position, and in this case, other positions may not be used. For example, the unit cluster ID 0001 may be allocated to and transmitted in the second position of the unit cluster IDs, and the remaining positions may not be used. In addition, the unit cluster ID 0011 may be allocated to and transmitted in the last position, and the remaining positions may not be used.

In the type 4 subframe, 45 bits may be allocated as bits for indicating transceiver IDs. In this case, one transceiver ID may have a length of 5 bits. Accordingly, the type 4 subframe may include a total of 9 transceiver IDs. In this case, the transceiver IDs may be 0000 to 01000. The transceiver IDs may be located after the unit cluster IDs. In this case, the positions for the transceiver IDs may be predetermined. For example, the transceiver IDs may be arranged in the order of 00000-00001-00010-00011-00100-00101-00110-00111-01000. Accordingly, the transceiver ID may be assigned to and transmitted in the corresponding position, and in this case, other positions may not be used. For example, the transceiver ID 00001 may be allocated to and transmitted in the second position of the transceiver IDs, and the remaining positions may not be used. In addition, the transceiver ID 01000 may be allocated to and transmitted in the last position, and the remaining positions may not be used. Also, in the type 4 subframe, 512 bits may be allocated as the bits for indicating beam indexes. In this case, one beam index may have a length of 8 bits. Accordingly, the type 4 subframe may include a total of 64 beam indexes. These beam indexes may also be transmitted in the same manner as the cluster IDs or transceiver IDs are transmitted.

Figure 23:
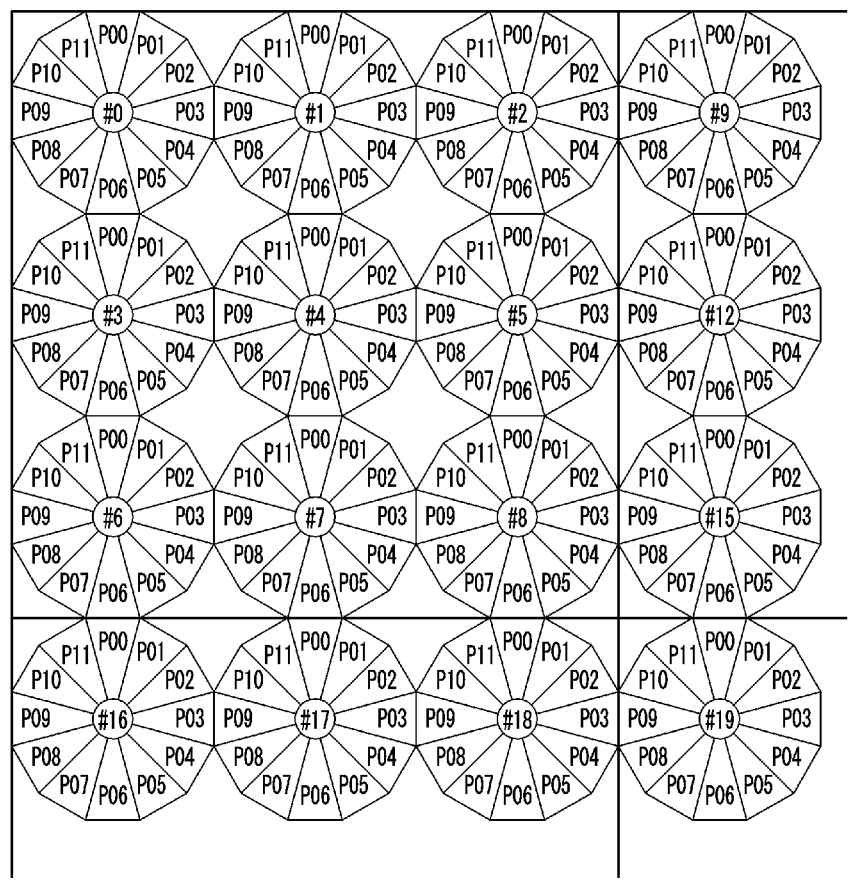
FIG. 23 is a conceptual diagram illustrating a first exemplary embodiment of a method for reusing beam indexes.

FIG. 23 is a conceptual diagram illustrating a first exemplary embodiment of a method for reusing beam indexes.

Referring to FIG. 23, one beam index may have, for example, a length of 8 bits. Among 8 bits, the first four bits may be used to indicate a transceiver, and the last four bits may be used to indicate a port. For example, a beam index of a beam transmitted by the port P00 of the first transceiver TRP #0 may be set to 00000000 by concatenating an identifier 0000 of the first transceiver and an identifier 0000 of the first port P00. In this manner, the beam indexes may be allocated to beams generated by the ports of the first transceiver TRP #0 to the ninth transceiver TRP #8.

In addition, the beam indexes assigned to the beams generated by the ports of the first transceiver TRP #0 to the ninth transceiver TRP #8 may be reused for beams generated by the ports of the tenth transceiver TRP #9 to the eighteenth transceiver TRP #17. For example, the beam indexes of the beams generated by the ports of the first transceiver TRP #0 may be reused as the beam indexes of the beams generated by the ports of the ninth transceiver TRP #8. Specifically, the beam index 00000000 of the beam generated by the port P00 of the first transceiver TRP #0 may be reused as the beam index of the beam generated by the port P00 of the ninth transceiver TRP #8.

Figure 24:
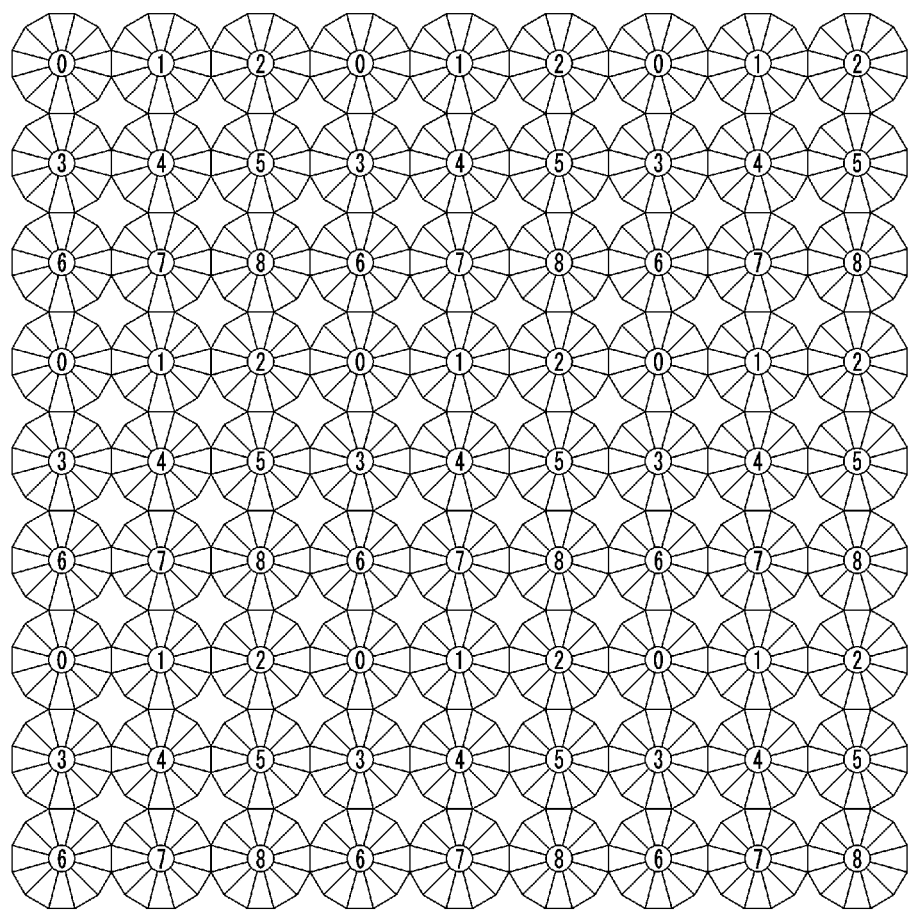
FIG. 24 is a conceptual diagram illustrating a first exemplary embodiment of a method for reusing transceiver identifiers.

FIG. 24 is a conceptual diagram illustrating a first exemplary embodiment of a method for reusing transceiver identifiers.

Referring to FIG. 24, an identifier of a transceiver may be reused for transceiver(s) having different position(s). For example, the identifier TRP #0 of the first transceiver may be reused at an interval of three grid points formed by imaginary rectangles while moving to the right. Also, the identifier TRP #0 of the first transceiver may be reused at an interval of three grid points formed by imaginary rectangles while moving downward.

Figure 25:
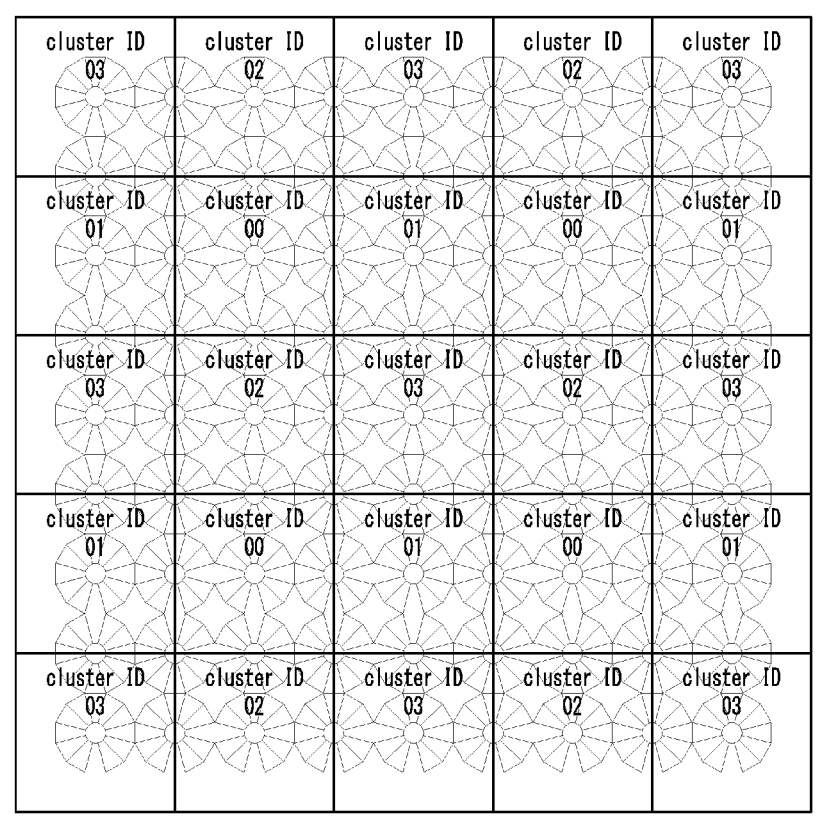

FIG. 25 is a conceptual diagram illustrating a first exemplary embodiment of a method for reusing unit cluster identifiers.

Referring to FIG. 25, a unit cluster identifier may be reused for unit cluster(s) having different position(s). For example, the identifier 00 of the first unit cluster may be reused at an interval of locating one unit cluster therebetween while moving to the right. Also, the identifier 00 of the first unit cluster may be reused at an interval of locating one unit cluster therebetween while moving downward.

Meanwhile, in FIGS. 20A to 25, when each port of the transceivers generates a beam and transmits signals, the central control apparatus transmits the subframe including the unit cluster ID, transceiver ID, and beam index for each beam on a data channel (e.g., PDSCH). However, unlike this, such the information may be transmitted to the terminal through a reference signal (e.g., channel state information reference signal (CSI-RS)). Accordingly, the terminal may receive the reference signal, and may obtain the unit cluster ID, transceiver ID, and beam index from the received reference signal. Also, the terminal may measure a received signal strength of the reference signal.

The terminal may feed the unit cluster ID, transceiver ID, and beam index, which are identified from the reference signal, to at least one transceiver constituting the unit cluster. In this case, the terminal may transmit the terminal ID and the received signal strength together to the transceiver. Accordingly, the transceiver may receive the unit cluster ID, transceiver ID, beam index, terminal ID, and received signal strength from the terminal. Also, the transceiver may transmit, to the central control apparatus, the unit cluster ID, transceiver ID, beam index, terminal ID, and received signal strength, which are received from the terminal. Through the above process, the central control apparatus may receive, from the transceiver(s) belonging to the unit cluster, the feedback information including the unit cluster ID, transceiver ID, beam index, terminal ID, and received signal strength, which are received from the terminal. Also, the central control apparatus may estimate the position of the terminal based on the received feedback information.

Figure 26:
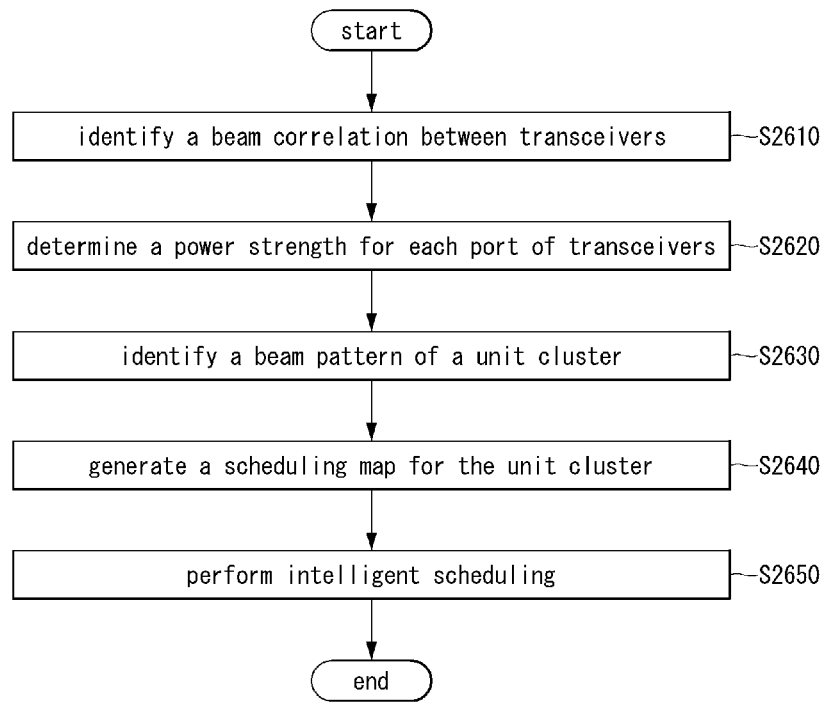
FIG. 26 is a flowchart illustrating a first exemplary embodiment of a method for scheduling in a communication system supporting an ultra-high frequency and ultra-wide band.

FIG. 26 is a flowchart illustrating a first exemplary embodiment of a method for scheduling in a communication system supporting an ultra-high frequency and ultra-wide band.

Referring to FIG. 26, the central control apparatus may determine a beam correlation between transceivers (S2610). To this end, the central control apparatus may allow a plurality of transceivers to measure a power strength for each beam index as shown in FIG. 27.

Figure 27:
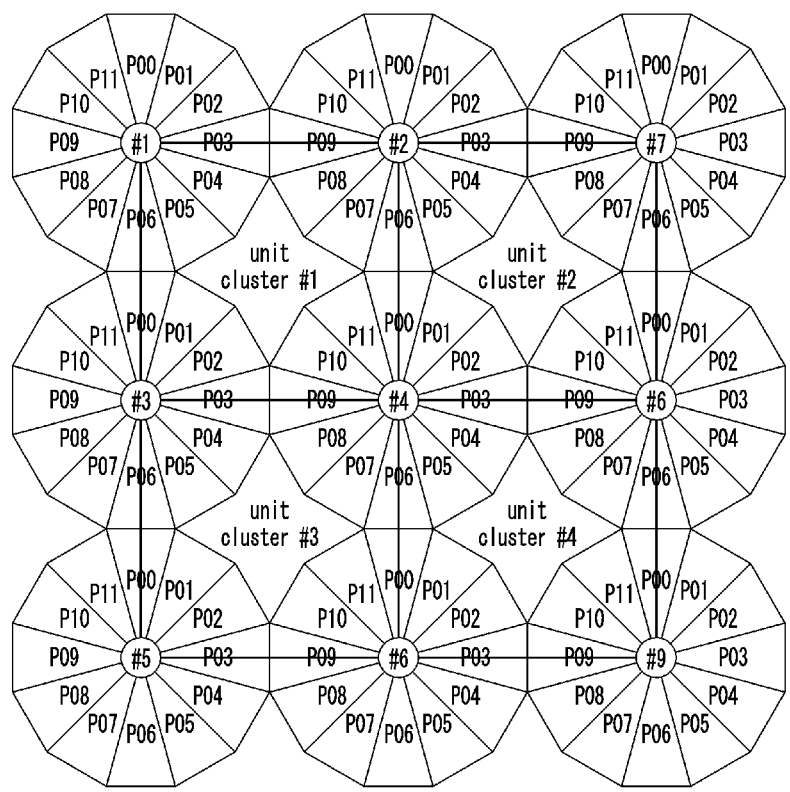
FIG. 27 is a conceptual diagram illustrating a first exemplary embodiment of a method for a transceiver to measure a power strength for each beam index in an extended unit cluster.

FIG. 27 is a conceptual diagram illustrating a first exemplary embodiment of a method for a transceiver to measure a power strength for each beam index in an extended unit cluster.

Referring to FIG. 27, an extended unit cluster may include unit clusters #1 to #4. In addition, the unit cluster #1 may be formed by four transceivers TRP #1 to TRP #4, and the unit cluster #2 may be formed by four transceivers TRP #2, TRP #4, TRP #7 and TRP #8. In addition, the unit cluster #3 may be formed by four transceivers TRP #3 to TRP #6, and the unit cluster #4 may be formed by four transceivers TRP #4, TRP #6, TRP #8 and TRP #9.

In such the extended unit cluster, the transceiver TRP #4 may be located in the center. The central control apparatus may instruct the transceiver TRP #4 to sequentially generate beams and transmit signals with maximum, medium, and minimum power strengths through the generated beams by using all ports. Then, the transceiver TRP4 may sequentially generate beams and transmit signals with the maximum, medium, and minimum power strengths through the generated beams by using all ports, according to the instruction received from the central control apparatus.

On the other hand, the central control apparatus may instruct transceivers (e.g., TRP #1 to TRP #3, TRP #5 to TRP #9) adjacent to the transceiver TRP #4 to receive the signals sequentially transmitted with the maximum, medium, and minimum power strengths from the transceiver TRP #4, and to measure and report received power strengths of the signals. Then, the adjacent transceivers (e.g., TRP #1 to TRP #3, TRP #5 to TRP #9) may receive the signals transmitted using the beams from the transceiver TRP #4 as shown in Table 1 according to the instruction. Also, the adjacent transceivers (e.g., TRP #1 to TRP #3, TRP #5 to TRP #9) may measure the power strengths of the signals transmitted through the beams from the transceiver TRP #4 by using their ports, and report the measured power strengths to the central control apparatus. In this case, each of the transceivers (e.g., TRP #1 to TRP #3, TRP #5 to TRP #9) may report IDs of ports through which the power strengths are measured together with the measured power strengths to the central control apparatus.

TABLE 1

| TRP#4 | TRP#1 | TRP#2 | TRP#3 | TRP#5 | TRP#6 | TRP#7 | TRP#8 | TRP#9 |
|---|---|---|---|---|---|---|---|---|
| TX mode | RX mode | | | | | | | |
| TX mode | | RX mode | | | | | | |
| TX mode | | | RX mode | | | | | |
| TX mode | | | | RX mode | | | | |
| TX mode | | | | | RX mode | | | |
| TX mode | | | | | | RX mode | | |

TABLE 1-continued

| TRP#4 | TRP#1 | TRP#2 | TRP#3 | TRP#5 | TRP#6 | TRP#7 | TRP#8 | TRP#9 |
|---|---|---|---|---|---|---|---|---|
| TX mode | | | | | | | RX mode | |
| TX mode | | | | | | | | RX mode |

On the other hand, the central control apparatus may instruct the adjacent transceivers (e.g., TRP #1 to TRP #3, TRP #5 to TRP #9) to sequentially generate beams and transmit signals with maximum, medium, and minimum power strengths through the generated beams by using all their ports. Then, the adjacent transceivers (e.g. TRP #1 to TRP #3, TRP #5 to TRP #9) may sequentially generate beams and transmit signals with the maximum, medium, and minimum power strengths through the generated beams by using all their ports, according to the instruction received from the central control apparatus.

On the other hand, the central control apparatus may instruct the transceiver TRP #4 to receive the signals sequentially transmitted with the maximum, medium, and minimum power strengths from the adjacent transceivers (e.g., TRP #1 to TRP #3, TRP #5 to TRP #9), and to measure and report received power strengths of the signals. Then, the transceiver TRP #4 may receive the signals transmitted using the beams from the adjacent transceivers (e.g., TRP #1 to TRP #3, TRP #5 to TRP #9) as shown in Table 2 according to the instruction. Also, the transceiver TRP #4 may measure the power strengths of the signals transmitted through the beams from the adjacent transceivers (e.g., TRP #1 to TRP #3, TRP #5 to TRP #9) by using their ports, and report the measured power strengths to the central control apparatus. In this case, the transceiver TRP #4 may report IDs of ports through which the power strengths are measured together with the measured power strengths to the central control apparatus.

multiplying the number of ports, the number of power levels, and the number of the adjacent transceivers (i.e., 4×3×3) by receiving the signals transmitted using beams from the adjacent transceivers. Accordingly, there may be 36 measurement sets of the transceiver measuring the power strengths and the adjacent transceivers that are measurement targets.

Figure 28:
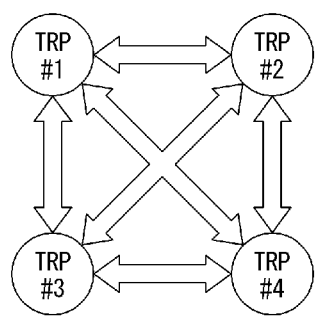
FIG. 28 is a conceptual diagram illustrating a first exemplary embodiment of a method for a transceiver of a unit cluster to measure a power strength for each beam index.
Figure 29:
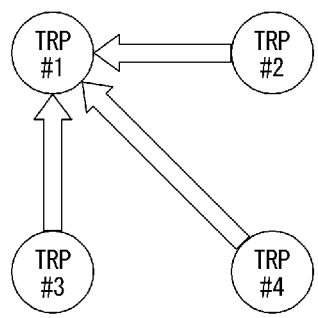
FIG. 29 is a conceptual diagram illustrating a first exemplary embodiment of a method in which one transceiver of the unit cluster of FIG. 28 measures a power strength for each beam index.

FIG. 29 is a conceptual diagram illustrating a first exemplary embodiment of a method in which one transceiver of the unit cluster of FIG. 28 measures a power strength for each beam index.

Referring to FIG. 29, the central control apparatus may instruct the adjacent transceivers TRP #2 to TRP #4 to sequentially transmit signals with the maximum, medium, and minimum power strengths by using all their ports. Then, the adjacent transceivers TRP #2 to TRP #4 may sequentially transmit signals with the maximum, medium, and minimum power strengths through beams by using all their ports, according to the instruction of the central control apparatus.

On the other hand, the central control apparatus may instruct the transceiver TRP #1 to receive the signals sequentially transmitted with the maximum, medium, and minimum power strengths from the adjacent transceivers TRP #2 to TRP #4, and to measure and report received power strengths of the signals. Then, the transceiver TRP #1 may receive the signals sequentially transmitted with the maximum, medium, and minimum power strengths using the beams from the adjacent transceivers TRP #2 to TRP #4, and

TABLE 2

| TRP#4 | TRP#1 | TRP#2 | TRP#3 | TRP#5 | TRP#6 | TRP#7 | TRP#8 | TRP#9 |
|---|---|---|---|---|---|---|---|---|
| RX mode | TX mode | | | | | | | |
| RX mode | | TX mode | | | | | | |
| RX mode | | | TX mode | | | | | |
| RX mode | | | | TX mode | | | | |
| RX mode | | | | | TX mode | | | |
| RX mode | | | | | | TX mode | | |
| RX mode | | | | | | | TX mode | |
| RX mode | | | | | | | | TX mode |

FIG. 28 is a conceptual diagram illustrating a first exemplary embodiment of a method for a transceiver of a unit cluster to measure a power strength for each beam index.

Referring to FIG. 28, four transceivers TRP #1 to TRP #4 may configure a unit cluster #1. Each transceiver may receive signals transmitted using beams from three adjacent transceivers, and measure a power strength for each beam index. In this case, one transceiver may transition to a reception mode (RX mode), and may receive signals transmitted using beams from three adjacent transceivers, and measure power strengths for the respective beam indexes. Here, each of the transceivers may use four ports to provide communication services to the service coverage of the unit cluster #1. In addition, the strengths of the beams transmitted by the transceiver may be classified into three types: the maximum power strength, medium power strength, and minimum power strength. Accordingly, each transceiver may measure 36 values the number of which is obtained by measure and report the power strengths for the respective beam indexes to the central control apparatus.

Looking at this in more detail, the transceiver TRP #2 may transmit signals through beams by using the ports P07, P08, P09 and P10, and the transceiver TRP #1 may receive the signals transmitted from the transceiver TRP #2 through the ports P03 and P04, and measure a power strength for each beam index and each transmission power strength level. In addition, the transceiver TRP #1 may report information on the measured power strength for each beam index and each transmission power strength level to the central control apparatus.

The transceiver TRP #3 may transmit signals through beams by using the ports P00, P01, P02 and P11, and the transceiver TRP #1 may receive the signals transmitted from the transceiver TRP #2 through the ports P05 and P06, and measure a power strength for each beam index and each transmission power strength level. In addition, the transceiver TRP #1 may report information on the measured power strength for each beam index and each transmission power strength level to the central control apparatus.

The transceiver TRP #4 may transmit signals through beams by using the ports P00, P09, P10 and P11, and the transceiver TRP #1 may receive the signals transmitted from the transceiver TRP #2 through the ports P04 and P05, and measure a power strength for each beam index and each transmission power strength level. In addition, the transceiver TRP #1 may report information on the measured power strength for each beam index and each transmission power strength level to the central control apparatus. Such the relationship may be shown in Table 3.

TABLE 3

| Case where TRP#2 transmits to TRP#1 | | Case where TRP#3 transmits to TRP#1 | | Case where TRP#4 transmits to TRP#1 | |
|---|---|---|---|---|---|
| Beam indexes of TRP#2 | Beam indexes of TRP#1 | Beam indexes of TRP#3 | Beam indexes of TRP#1 | Beam indexes of TRP#4 | Beam indexes of TRP#1 |
| 08 | 03 | — | 03 | — | 03 |
| 09 | | — | | — | |
| 10 | | — | | — | |
| 07 | 04 | — | 04 | 10 | 04 |
| 08 | | — | | 11 | |
| 09 | | — | | 00 | |
| — | 05 | 00 | 05 | 09 | 05 |
| — | | 01 | | 10 | |
| — | | 02 | | 11 | |
| — | 06 | 11 | 06 | — | 06 |
| — | | 00 | | — | |
| — | | 01 | | — | |

Figure 30:
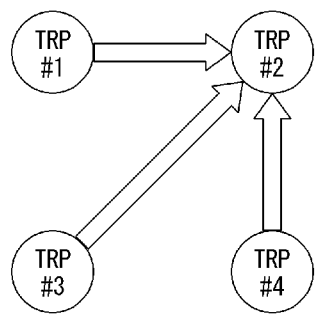
FIG. 30 is a conceptual diagram illustrating a second exemplary embodiment of a method in which one transceiver of the unit cluster of FIG. 28 measures a power strength for each beam index.

FIG. 30 is a conceptual diagram illustrating a second exemplary embodiment of a method in which one transceiver of the unit cluster of FIG. 28 measures a power strength for each beam index.

Referring to FIG. 30, the central control apparatus may instruct the adjacent transceivers TRP #1, TRP #3, and TRP #4 to sequentially transmit signals with the maximum, medium, and minimum power strengths by using all their ports. Then, the adjacent transceivers TRP #1, TRP #3, and TRP #4 may sequentially transmit signals with the maximum, medium, and minimum power strengths through beams by using all their ports, according to the instruction of the central control apparatus.

On the other hand, the central control apparatus may instruct the transceiver TRP #2 to receive the signals sequentially transmitted with the maximum, medium, and minimum power strengths from the adjacent transceivers TRP #1, TRP #3, and TRP #4, and to measure and report received power strengths of the signals. Then, the transceiver TRP #2 may receive the signals sequentially transmitted with the maximum, medium, and minimum power strengths using the beams from the adjacent transceivers TRP #1, TRP #3, and TRP #4, and measure and report the power strengths for the respective beam indexes to the central control apparatus.

Looking at this in more detail, the transceiver TRP #1 may transmit signals through beams by using the ports P02, P03, P04 and P05, and the transceiver TRP #2 may receive the signals transmitted from the transceiver TRP #1 through the ports P08 and P09, and measure a power strength for each beam index and each transmission power strength level. In addition, the transceiver TRP #2 may report information on the measured power strength for each beam index and each transmission power strength level to the central control apparatus.

The transceiver TRP #3 may transmit signals through beams by using the ports P00, P01, P02 and P03, and the transceiver TRP #2 may receive the signals transmitted from the transceiver TRP #3 through the ports P07 and P08, and measure a power strength for each beam index and each transmission power strength level. In addition, the transceiver TRP #2 may report information on the measured power strength for each beam index and each transmission power strength level to the central control apparatus.

The transceiver TRP #4 may transmit signals through beams by using the ports P00, P01, P10 and P11, the transceiver TRP #2 may receive the signals transmitted from the transceiver TRP #4 through the ports P06 and P07, and measure a power strength for each beam index and each transmission power strength level. In addition, the transceiver TRP #2 may report information on the measured power strength for each beam index and each transmission power strength level to the central control apparatus. Such the relationship may be shown in Table 4.

TABLE 4

| Case where TRP#1 transmits to TRP#2 | | Case where TRP#3 transmits to TRP#2 | | Case where TRP#4 transmits to TRP#2 | |
|---|---|---|---|---|---|
| Beam indexes of TRP#1 | Beam indexes of TRP#2 | Beam indexes of TRP#3 | Beam indexes of TRP#2 | Beam indexes of TRP#4 | Beam indexes of TRP#2 |
| — | 06 | — | 06 | 11 | 06 |
| — | | — | | 00 | |
| — | | — | | 01 | |
| — | 07 | 01 | 07 | 10 | 07 |
| — | | 02 | | 11 | |
| — | | 03 | | 00 | |
| 03 | 08 | 00 | 08 | — | 08 |
| 04 | | 01 | | — | |
| 05 | | 02 | | — | |
| 02 | 09 | — | 09 | — | 09 |
| 03 | | — | | — | |
| 04 | | — | | — | |

Accordingly, the central control apparatus may determine whether the positions of TRP #1 to TRP #4 match as shown in FIG. 27 from the reported information on the power strengths. As a result of the determination, if the positions of TRP #1 to TRP #4 do not match as shown in FIG. 27, the central control apparatus may reassign the port IDs to match as shown in FIG. 27.

Figure 31:
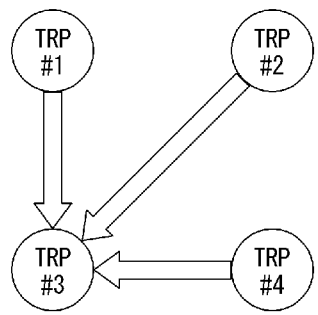
FIG. 31 is a conceptual diagram illustrating a third exemplary embodiment of a method in which one transceiver of the unit cluster of FIG. 28 measures a power strength for each beam index.

FIG. 31 is a conceptual diagram illustrating a third exemplary embodiment of a method in which one transceiver of the unit cluster of FIG. 28 measures a power strength for each beam index.

Referring to FIG. 31, the central control apparatus may instruct the adjacent transceivers TRP #1, TRP #2, and TRP #4 to sequentially transmit signals with the maximum, medium, and minimum power strengths by using all their ports. Then, the adjacent transceivers TRP #1, TRP #2, and TRP #4 may sequentially transmit signals with the maximum, medium, and minimum power strengths through beams by using all their ports, according to the instruction of the central control apparatus.

On the other hand, the central control apparatus may instruct the transceiver TRP #3 to receive the signals sequentially transmitted with the maximum, medium, and minimum power strengths from the adjacent transceivers TRP #1, TRP #2, and TRP #4, and to measure and report received power strengths of the signals. Then, the transceiver TRP #3 may receive the signals sequentially transmitted with the maximum, medium, and minimum power strengths using the beams from the adjacent transceivers TRP #1, TRP #2, and TRP #4, and measure and report the power strengths for the respective beam indexes to the central control apparatus.

Looking at this in more detail, the transceiver TRP #1 may transmit signals through beams by using the ports P04, P05, P06 and P07, and the transceiver TRP #3 may receive the signals transmitted from the transceiver TRP #1 through the ports P00 and P01, and measure a power strength for each beam index and each transmission power strength level. In addition, the transceiver TRP #3 may report information on the measured power strength for each beam index and each transmission power strength level to the central control apparatus.

The transceiver TRP #2 may transmit signals through beams by using the ports P06, P07, P08 and P09, and the transceiver TRP #3 may receive the signals transmitted from the transceiver TRP #2 through the ports P01 and P02, and measure a power strength for each beam index and each transmission power strength level. In addition, the transceiver TRP #3 may report information on the measured power strength for each beam index and each transmission power strength level to the central control apparatus.

The transceiver TRP #4 may transmit signals through beams by using the ports P08, P09, P10 and P11, and the transceiver TRP #3 may receive the signals transmitted from the transceiver TRP #4 through the ports P02 and P03, and measure a power strength for each beam index and each transmission power strength level. In addition, the transceiver TRP #3 may report information on the measured power strength for each beam index and each transmission power strength level to the central control apparatus. Such the relationship may be shown in Table 5.

TABLE 5

| Case where TRP#1 transmits to TRP#3 | | Case where TRP#2 transmits to TRP#3 | | Case where TRP#4 transmits to TRP#3 | |
|---|---|---|---|---|---|
| Beam indexes of TRP#1 | Beam indexes of TRP#3 | Beam indexes of TRP#2 | Beam indexes of TRP#3 | Beam indexes of TRP#4 | Beam indexes of TRP#3 |
| 05 | 00 | — | 00 | — | 00 |
| 06 | — | — | — | — | — |
| 07 | — | — | — | — | — |
| 04 | 01 | 07 | 01 | — | 01 |
| 05 | — | 08 | — | — | — |
| 06 | — | 09 | — | — | — |
| — | 02 | 06 | 02 | 09 | 02 |
| — | — | 07 | — | 10 | — |
| — | — | 08 | — | 11 | — |
| — | 03 | — | 03 | 08 | 03 |
| — | — | — | — | 09 | — |
| — | — | — | — | 10 | — |

Figure 32:
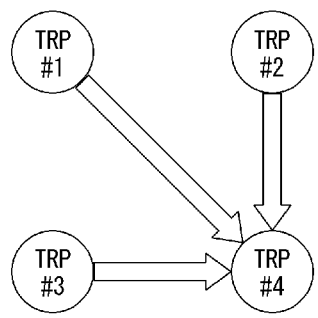
FIG. 32 is a conceptual diagram illustrating a fourth exemplary embodiment of a method in which one transceiver of the unit cluster of FIG. 28 measures a power strength for each beam index.

FIG. 32 is a conceptual diagram illustrating a fourth exemplary embodiment of a method in which one transceiver of the unit cluster of FIG. 28 measures a power strength for each beam index.

Referring to FIG. 32, the central control apparatus may instruct the adjacent transceivers TRP #1 to TRP #3 to sequentially transmit signals with the maximum, medium, and minimum power strengths by using all their ports. Then, the adjacent transceivers TRP #1 to TRP #3 may sequentially transmit signals with the maximum, medium, and minimum power strengths through beams by using all their ports, according to the instruction of the central control apparatus.

On the other hand, the central control apparatus may instruct the transceiver TRP #4 to receive the signals sequentially transmitted with the maximum, medium, and minimum power strengths from the adjacent transceivers TRP #1 to TRP #3, and to measure and report received power strengths of the signals. Then, the transceiver TRP #4 may receive the signals sequentially transmitted with the maximum, medium, and minimum power strengths using the beams from the adjacent transceivers TRP #1 to TRP #3, and measure and report the power strengths for the respective beam indexes to the central control apparatus.

Looking at this in more detail, the transceiver TRP #1 may transmit signals through beams by using the ports P03, P04, P05 and P06, and the transceiver TRP #4 may receive the signals transmitted from the transceiver TRP #1 through the ports P10 and P11, and measure a power strength for each beam index and each transmission power strength level. In addition, the transceiver TRP #4 may report information on the measured power strength for each beam index and each transmission power strength level to the central control apparatus.

The transceiver TRP #2 may transmit signals through beams by using the ports P05, P06, P07 and P08, and the transceiver TRP #4 may receive the signals transmitted from the transceiver TRP #2 through the ports P00 and P11, and measure a power strength for each beam index and each transmission power strength level. In addition, the transceiver TRP #4 may report information on the measured power strength for each beam index and each transmission power strength level to the central control apparatus.

The transceiver TRP #3 may transmit signals through beams by using the ports P01, P02, P03 and P04, and the transceiver TRP #4 may receive the signals transmitted from the transceiver TRP #3 through the ports P09 and P10, and measure a power strength for each beam index and each transmission power strength level. In addition, the transceiver TRP #4 may report information on the measured power strength for each beam index and each transmission power strength level to the central control apparatus. Such the relationship may be shown in Table 6.

TABLE 6

| Case where TRP#1 transmits to TRP#4 | | Case where TRP#2 transmits to TRP#4 | | Case where TRP#3 transmits to TRP#4 | |
|---|---|---|---|---|---|
| Beam indexes of TRP#1 | Beam indexes of TRP#4 | Beam indexes of TRP#2 | Beam indexes of TRP#4 | Beam indexes of TRP#3 | Beam indexes of TRP#4 |
| — | 00 | 05 | 00 | — | 00 |
| — | — | 06 | — | — | — |
| — | — | 07 | — | — | — |
| 03 | 11 | 06 | 11 | — | 11 |
| 04 | — | 07 | — | — | — |
| 05 | — | 08 | — | — | — |
| 04 | 10 | — | 10 | 01 | 10 |
| 05 | — | — | — | 02 | — |
| 06 | — | — | — | 03 | — |
| — | 09 | — | 09 | 02 | 09 |
| — | — | — | — | 03 | — |
| — | — | — | — | 04 | — |

FIGS. 33A to 33D are conceptual diagrams illustrating a first exemplary embodiment of a transmission power strength and a received power strength.

Referring to FIGS. 33A to 33D, a TRP #Y may be operated in a transmission mode (TX mode), and a TRP #X may be operated in a reception mode (RX mode). At a time T1 or T3, the TRP #Y may sequentially generate beams, and transmit signals with the maximum, medium, and minimum power strengths to the TRP #X by using the generated beams. Here, the medium power strength and the minimum power strength may be defined based on the maximum power strength allowed by the TRP #Y For example, when assuming that the maximum power strength of the TRP #Y is 24 dBm and is divided into three sections, the maximum power strength may be 24 dBm, the medium power strength may be 16 dBm, and the minimum power strength may be 8 dBm.

Figure 33A:
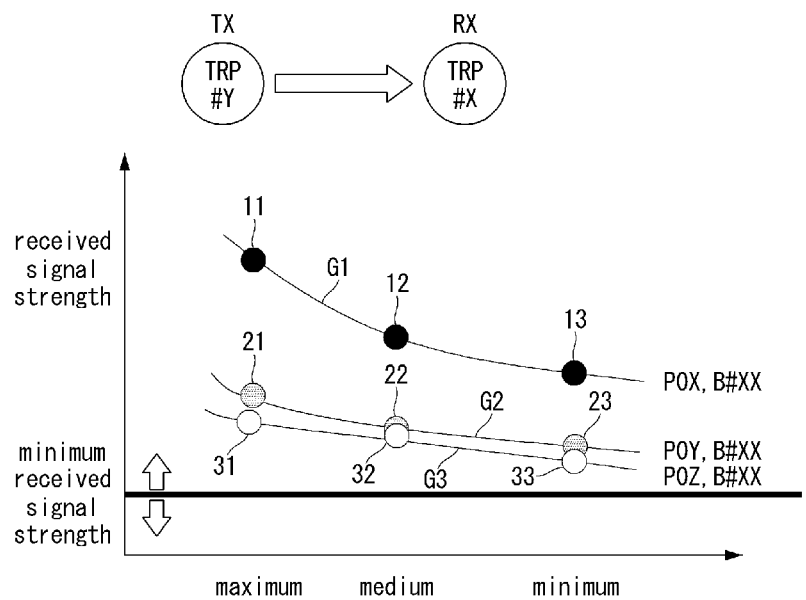
FIGS. 33A to 33D are conceptual diagrams illustrating a first exemplary embodiment of a transmission power strength and a received power strength.

Referring to FIG. 33A, the TRP #Y may activate ports P0X, P0Y, and P0Z by using a sub-frequency band B #XX, sequentially generate beams with the maximum, medium, and minimum power strengths, and transmit the beams to the TRP #X. Then, the TRP #X may receive the signals from the TRP #Y by using a port PYY and measure signal strengths (SSs) of the received signals. G1 in FIG. 33A may represent the measured signal strengths of the signals transmitted by the TRP #Y through the port P0X using the sub-frequency band B #XX, which are received by the TRP #X through the port PYY In G1, '11' may indicate a maximum received power strength, '12' may indicate a medium received power strength, and '13' may indicate a minimum received power strength.

Further, G2 of FIG. 33A may represent the measured signal strengths of the signals transmitted by the TRP #Y through the port P0Y using the sub-frequency band B #XX, which are received by the TRP #X through the port PYY In G2, '21' may indicate a maximum received power strength, '22' may indicate a medium received power strength, and '23' may indicate a minimum received power strength. Further, G3 in FIG. 33A may represent the measured signal strengths of the signals transmitted by the TRP #Y through the port P0Z using the sub-frequency band B #XX, which are received by the TRP #X through the port PYY In the graph G3, '31' may indicate a maximum received power strength, '32' may indicate a medium received power strength, and '33' may indicate a minimum received power strength. G1 of FIG. 33A may have a value greater than the minimum received signal strength. Also, G1, G2, and G3 may be spaced apart. Accordingly, the port P0X of TRP #Y and the port PYY of TRP #X may have the highest correlation, and the port P0X of TRP #Y and the port PYY of TRP #X may be in positions facing each other.

Figure 33B:
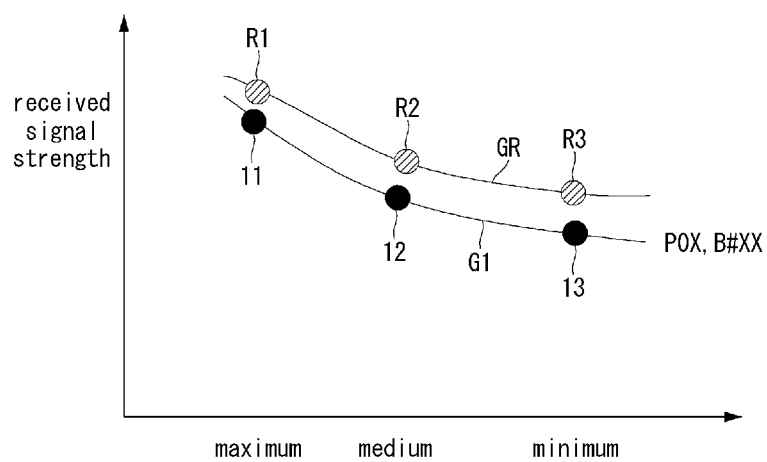

On the other hand, GR in FIG. 33B may represent the measured signal strengths of the signals transmitted by the TRP #Y through the port P0X using the sub-frequency band B #XX, which are received by the TRP #X, when the TRP #Y and the TRP #Y are separated by a reference distance. In GR, 'R1' may indicate a maximum received power strength, 'R2' may indicate a medium received power strength, and 'R3' may indicate a minimum received power strength. In FIG. 33B, G1 may approximate GR, and thus the TRP #Y and the TRP #X may be separated by a reference distance.

Figure 33C:
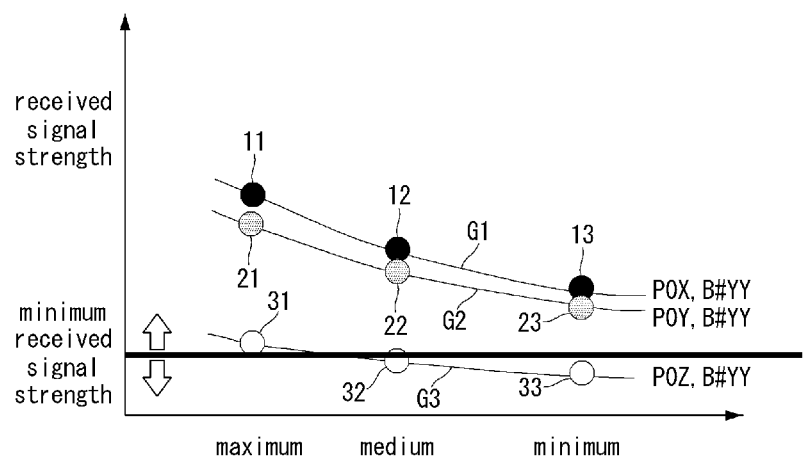

On the other hand, referring to FIG. 33C, the TRP #Y may activate ports P0X, P0Y, and P0Z by using a sub-frequency band B #YY, sequentially generate beams with the maximum, medium, and minimum power strengths, and transmit the beams to the TRP #X. Then, the TRP #X may receive the signals from the TRP #Y by using the port PYY and measure signal strengths of the received signals. G1 in FIG. 33C may represent the measured signal strengths of the signals transmitted by the TRP #Y through the port P0X using the sub-frequency band B #YY, which are received by the TRP #Y through the port PYY In G1, '11' may indicate a maximum received power strength, '12' may indicate a medium received power strength, and '13' may indicate a minimum received power strength.

Further, G2 of FIG. 33C may represent the measured signal strengths of the signals transmitted by the TRP #Y through the port P0Y using the sub-frequency band B #YY, which are received by the TRP #X through the port PYY In G2, '21' may indicate a maximum received power strength, '22' may indicate a medium received power strength, and '23' may indicate a minimum received power strength. Further, G3 in FIG. 33C may represent the measured signal strengths of the signals transmitted by the TRP #Y through the port P0Z using the sub-frequency band B #YY, which are received by the TRP #X through the port PYY In G3, '31' may indicate a maximum received power strength, '32' may indicate a medium received power strength, and '33' may indicate a minimum received power strength. In FIG. 33C, G1 and G2 may have a value greater than the minimum received signal strength, but may correspond to a case in which there is no dominant beam index because they are close to each other.

Figure 33D:
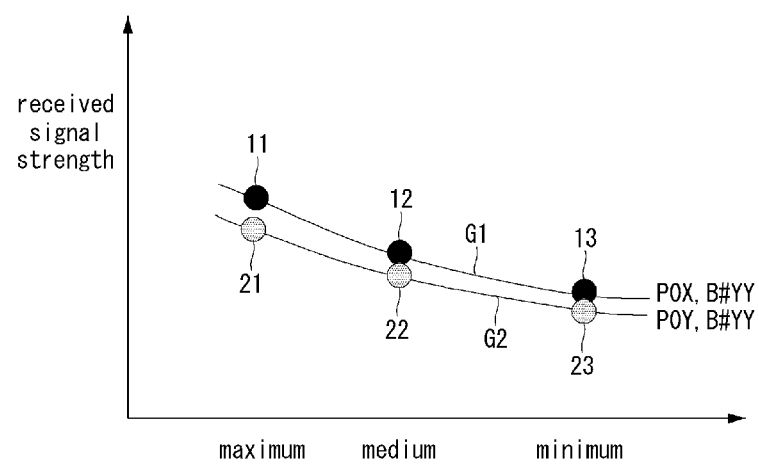

On the other hand, GR in FIG. 33D may represent the measured signal strengths of the signals transmitted by the TRP #Y with the maximum, medium, and minimum power strengths, which are received by the TRP #X when the TRP #Y and the TRP #Y are separated by a reference distance. In GR, 'R1' may indicate a maximum received power strength, 'R2' may indicate a medium received power strength, and 'R3' may indicate a minimum received power strength. In FIG. 33D, G1 and G2 may approximate GR, and thus the TRP #Y and the TRP #X may be separated by a reference distance.

Accordingly, the central control apparatus may determine whether the positions of TRP #1 to TRP #4 match as shown in FIG. 27 according to the correlations based on FIGS. 33A to 33D from the reported information on the power strengths. As a result of the determination, if the positions of TRP #1 to TRP #4 do not match as shown in FIG. 27, the central control apparatus may reassign port IDs to match as shown in FIG. 27. Alternatively, the central control apparatus may notify an administrator of such the mismatch to reinstall the TRP #1 to TRP #4.

Referring again to FIG. 26, the central control apparatus may identify beam patterns of the unit cluster (S2630).

FIGS. 34A to 34D are conceptual diagrams illustrating a first exemplary embodiment of beam patterns in different sub-frequency bands of a unit cluster.

Figure 34A:
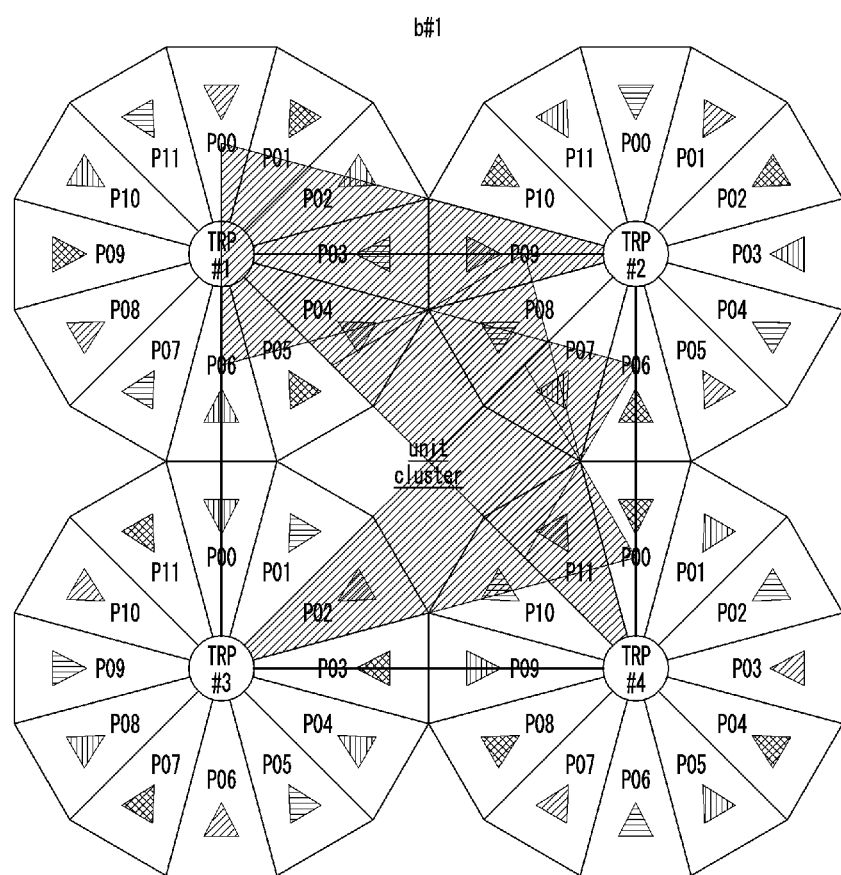
FIGS. 34A to 34D are conceptual diagrams illustrating a first exemplary embodiment of beam patterns in different sub-frequency bands of a unit cluster.

Referring to FIG. 34A, a transceiver TRP #1 constituting a unit cluster may transmit signals in a scheduling time t1 by forming a beam through a port P04 by using a sub-frequency band B #1. Also, a transceiver TRP #2 constituting the unit cluster may transmit signals by forming a beam through a port P09 by using the sub-frequency band B #1. Also, a transceiver TRP #3 constituting the unit cluster may transmit signals by forming a beam through a port P02 by using the sub-frequency band B #1. Also, a transceiver TRP #4 constituting the unit cluster may transmit signals by forming a beam through a port P11 by using the sub-frequency band B #1. Since three beams overlap near the center of the unit cluster, such the beam pattern of the unit cluster may be called a 'three-merged type 1', or may be called an 'A pattern'.

Figure 34B:
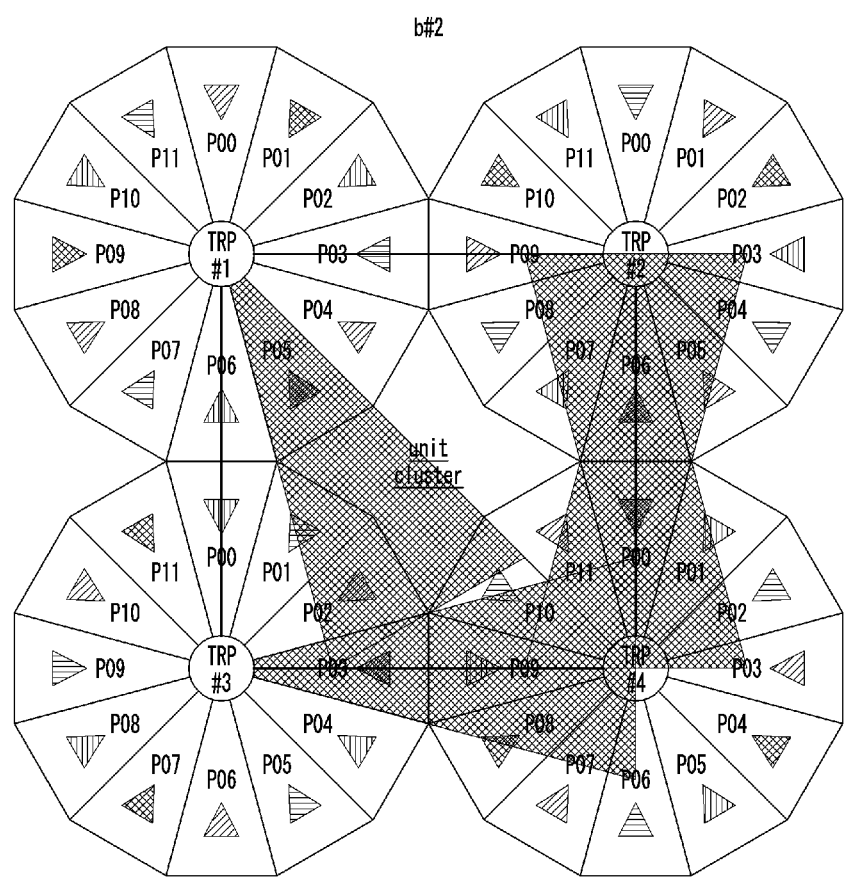

Referring to FIG. 34B, the transceiver TRP #1 constituting the unit cluster may transmit signals in the scheduling time t1 by forming a beam through a port P05 by using a sub-frequency band B #2. Also, the transceiver TRP #2 constituting the unit cluster may transmit signals by forming a beam through a port P06 by using the sub-frequency band B #2. Also, the transceiver TRP #3 constituting the unit cluster may transmit signals by forming a beam through a port P03 by using the sub-frequency band B #2. Also, the transceiver TRP #4 constituting the unit cluster may transmit signals by forming a beam through a port P00 by using the sub-frequency band B #2. Since the beams transmitted by the TRP #1 and TRP #3 may overlap near the center of the unit cluster and the beams transmitted by the TRP #2 and TRP #4 may face each other, such the beam pattern of the unit cluster may be called a 'two-merged face-to-face type 1', or may be called a 'B pattern'.

Figure 34C:
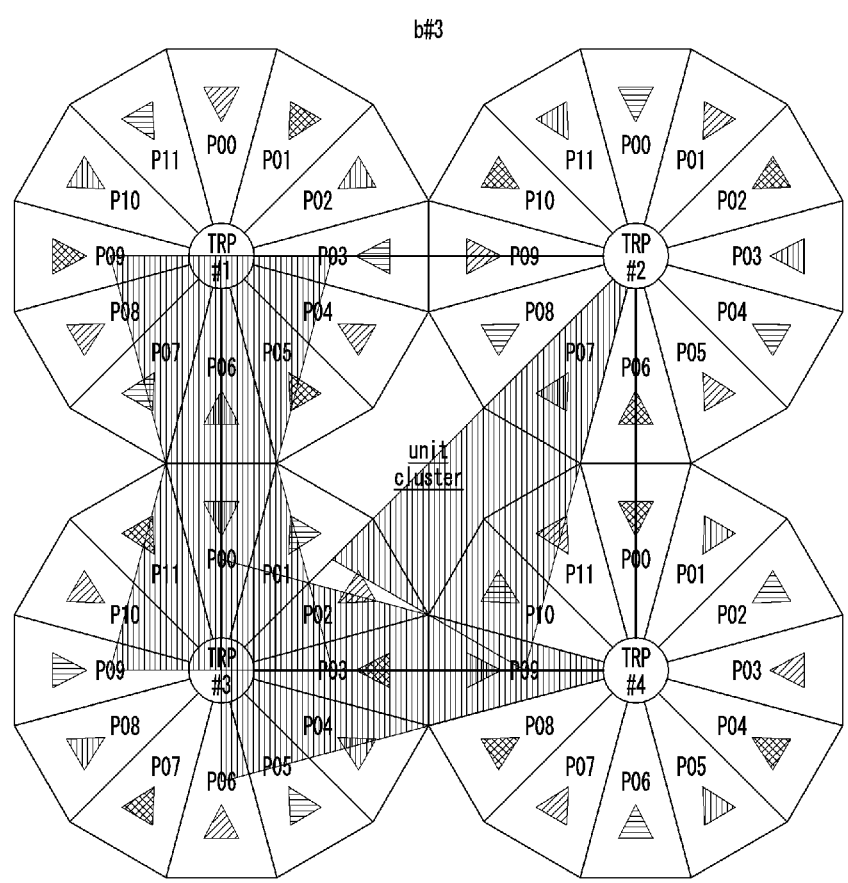

Referring to FIG. 34C, the transceiver TRP #1 constituting the unit cluster may transmit signals in the scheduling time t1 by forming a beam through a port P06 by using a sub-frequency band B #3. Also, the transceiver TRP #2 constituting the unit cluster may transmit signals by forming a beam through a port P07 by using the sub-frequency band B #3. Also, the transceiver TRP #3 constituting the unit cluster may transmit signals by forming a beam through a port P00 by using the sub-frequency band B #3. Also, the transceiver TRP #4 constituting the unit cluster may transmit signals by forming a beam through a port P09 by using the sub-frequency band B #3. Since the beams transmitted by the TRP #2 and TRP #4 may overlap near the center of the unit cluster and the beams transmitted by the TRP #1 and TRP #3 may face each other, such the beam pattern of the unit cluster may be called a 'two-merged face-to-face type 2', or may be called a 'C pattern'.

Figure 34D:
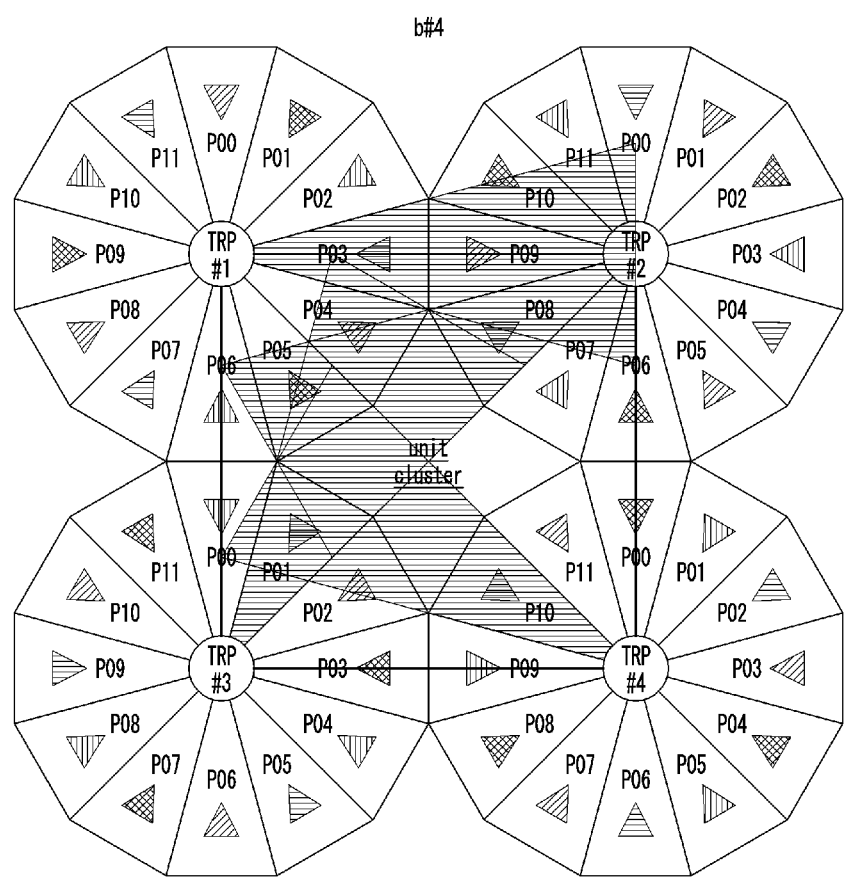

Referring to FIG. 34D, the transceiver TRP #1 constituting the unit cluster may transmit signals in the a scheduling time t1 by forming a beam through a port P03 by using a sub-frequency band B #4. Also, the transceiver TRP #2 constituting the unit cluster may transmit signals by forming a beam through a port P08 by using the sub-frequency band B #4. Also, the transceiver TRP #3 constituting the unit cluster may transmit signals by forming a beam through a port P01 by using the sub-frequency band B #4. Also, the transceiver TRP #4 constituting the unit cluster may transmit signals by forming a beam through a port P10 by using the sub-frequency band B #4. Since the beams transmitted by the TRP #2, TRP #3, and TRP #4 may overlap near the center of the unit cluster, such the beam pattern of the unit cluster may be called a 'three-merged type 2', or may be called a 'D pattern'.

As described above, the central control apparatus may identify a beam pattern for each sub-frequency band in the same scheduling time t1 based on the measurement values measured by the plurality of transceivers. For the unit cluster #1, in the scheduling time t1, the sub-frequency band B #1 may have the A pattern, the sub-frequency band B #2 may have the B pattern, the sub-frequency band B #3 may have the C pattern, and the sub-frequency band B #4 may have the D pattern.

FIGS. 35A to 35D are conceptual diagrams illustrating a first exemplary embodiment of beam patterns of a unit cluster at different scheduling times.

Figure 35A:
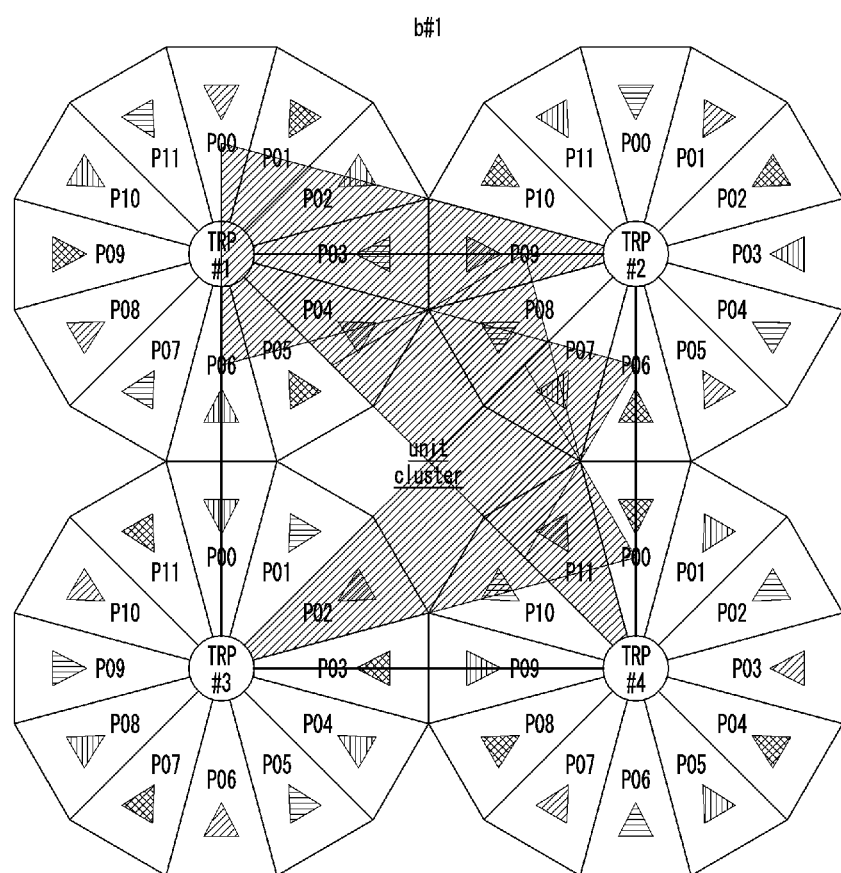
FIGS. 35A to 35D are conceptual diagrams illustrating a first exemplary embodiment of beam patterns of a unit cluster at different scheduling times.

Referring to FIG. 35A, a transceiver TRP #1 constituting a unit cluster may transmit signals in a scheduling time t1 by forming a beam through a port P04 by using a sub-frequency band B #1. Also, a transceiver TRP #2 constituting the unit cluster may transmit signals by forming a beam through a port P09 by using the sub-frequency band B #1. Also, a transceiver TRP #3 constituting the unit cluster may transmit signals by forming a beam through a port P02 by using the sub-frequency band B #1. Also, a transceiver TRP #4 constituting the unit cluster may transmit signals by forming a beam through a port P11 by using the sub-frequency band B #1. Since three beams overlap near the center of the unit cluster, such the beam pattern of the unit cluster may be called a 'three-merged type 1', or may be called an 'A pattern'.

Figure 35B:
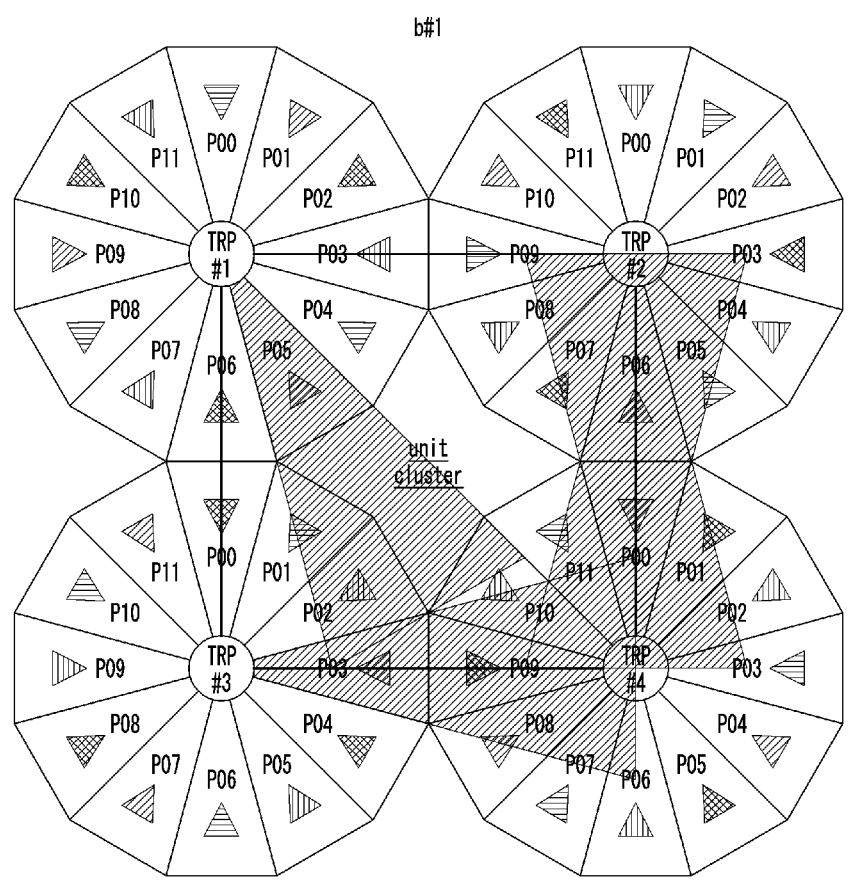

Referring to FIG. 35B, the transceiver TRP #1 constituting the unit cluster may transmit signals in a scheduling time t2 by forming a beam through a port P05 by using the sub-frequency band B #1. Also, the transceiver TRP #2 constituting the unit cluster may transmit signals by forming a beam through a port P06 by using the sub-frequency band B #1. Also, the transceiver TRP #3 constituting the unit cluster may transmit signals by forming a beam through a port P03 by using the sub-frequency band B #1. Also, the transceiver TRP #4 constituting the unit cluster may transmit signals by forming a beam through a port P00 by using the sub-frequency band B #1. Since the beams transmitted by the TRP #1 and TRP #3 may overlap near the center of the unit cluster and the beams transmitted by the TRP #2 and TRP #4 may face each other, such the beam pattern of the unit cluster may be called a 'two-merged face-to-face type 1', or may be called a 'B pattern'.

Figure 35C:
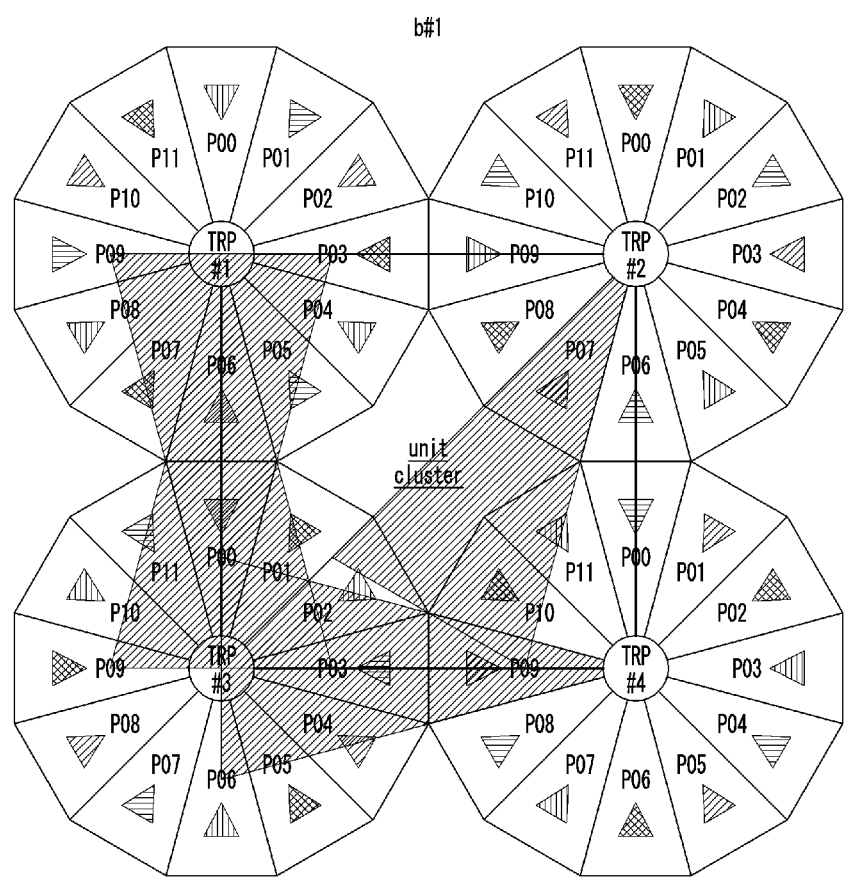

Referring to FIG. 35C, the transceiver TRP #1 constituting a unit cluster may transmit signals in a scheduling time t3 by forming a beam through a port P06 by using the sub-frequency band B #1. Also, the transceiver TRP #2 constituting the unit cluster may transmit signals by forming a beam through a port P07 by using the sub-frequency band B #1. Also, the transceiver TRP #3 constituting the unit cluster may transmit signals by forming a beam through a port P00 by using the sub-frequency band B #1. Also, the transceiver TRP #4 constituting the unit cluster may transmit signals by forming a beam through a port P09 by using the sub-frequency band B #1. Since the beams transmitted by the TRP #2 and TRP #4 may overlap near the center of the unit cluster and the beams transmitted by the TRP #1 and TRP #3 may face each other, such the beam pattern of the unit cluster may be called a 'two-merged face-to-face type 2', or may be called a 'C pattern'.

Figure 35D:
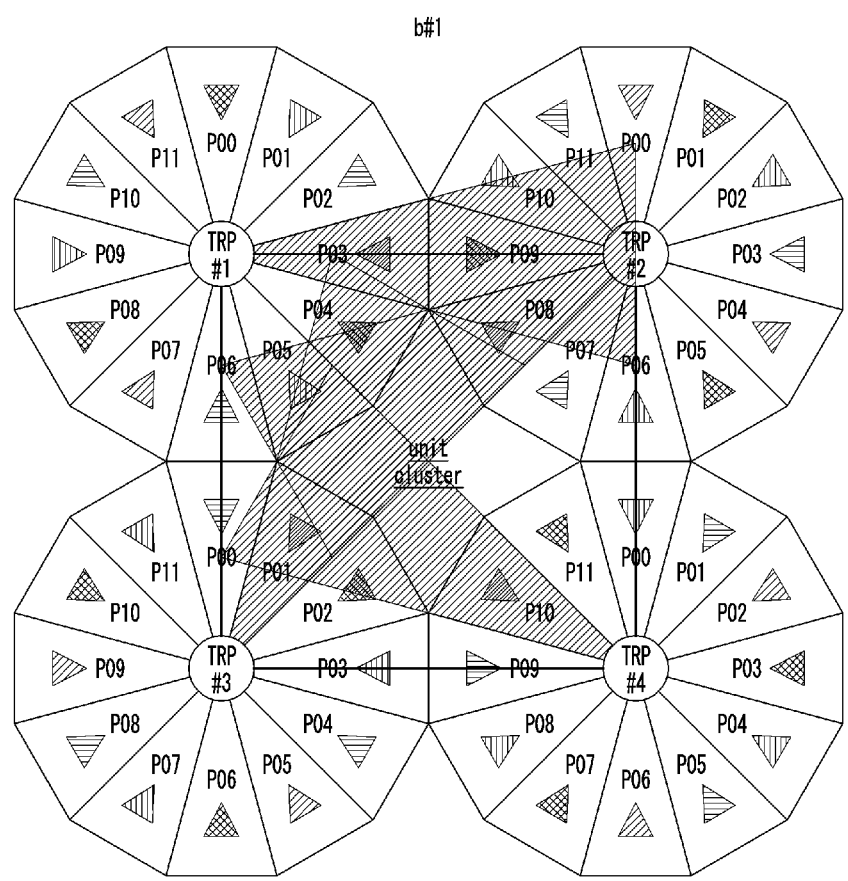

Referring to FIG. 35D, the transceiver TRP #1 constituting the unit cluster may transmit signals in a scheduling time t4 by forming a beam through a port P03 by using a sub-frequency band B #1. Also, the transceiver TRP #2 constituting the unit cluster may transmit signals by forming a beam through a port P08 by using the sub-frequency band B #1. Also, the transceiver TRP #3 constituting the unit cluster may transmit signals by forming a beam through a port P01 by using the sub-frequency band B #1. Also, the transceiver TRP #4 constituting the unit cluster may transmit signals by forming a beam through a port P10 by using the sub-frequency band B #1. Since the beams transmitted by the TRP #2, TRP #3, and TRP #4 may overlap near the center of the unit cluster, such the beam pattern of the unit cluster may be called a 'three-merged type 2', or may be called a 'D pattern'.

As described above, the central control apparatus may identify a beam pattern for each sub-frequency band in the scheduling times t1 to t4 based on the measurement values measured by the plurality of transceivers. For the unit cluster #1, the sub-frequency band B #1 may have the A pattern in the scheduling time t1, the sub-frequency band B #2 may have the B pattern in the scheduling time t2, the sub-frequency band B #3 may have the C pattern in the scheduling time t3, and the sub-frequency band B #4 may have the D pattern in the scheduling time t4.

Figure 36A:
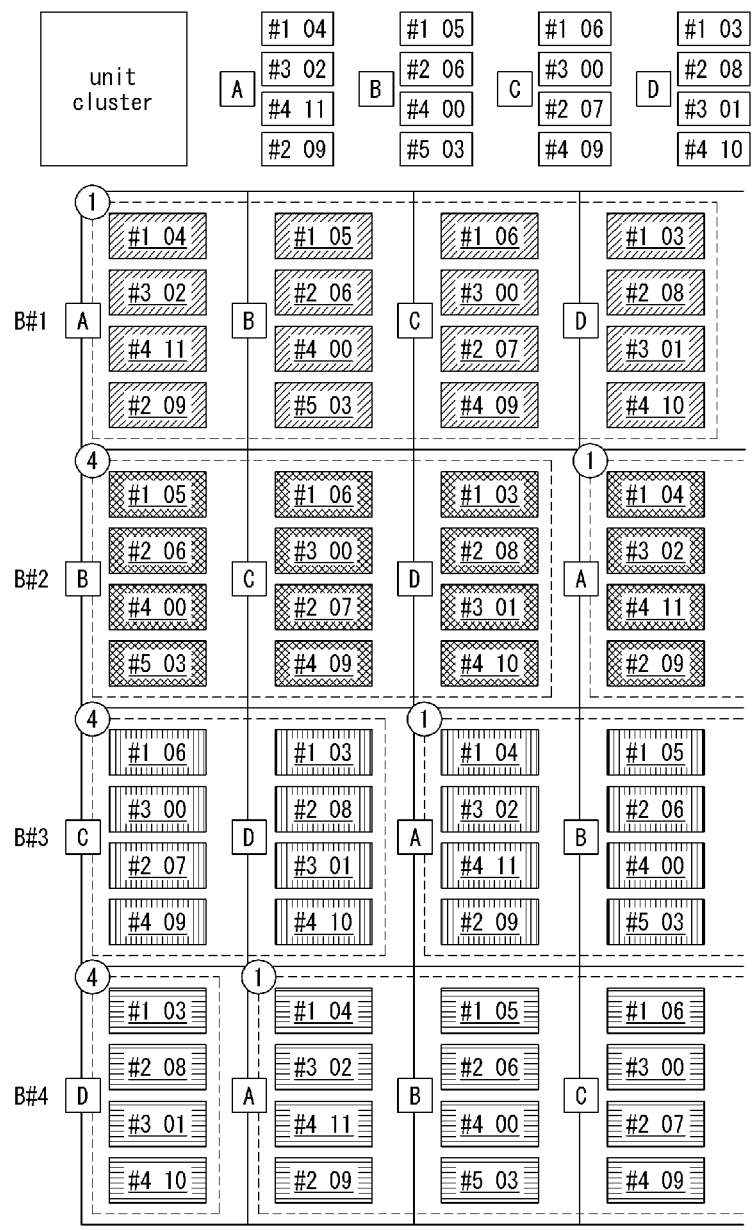
FIGS. 36A to 36C are conceptual diagrams illustrating a first exemplary embodiment of beam patterns of a unit cluster in different frequency bands and different scheduling times.
Figure 36B:
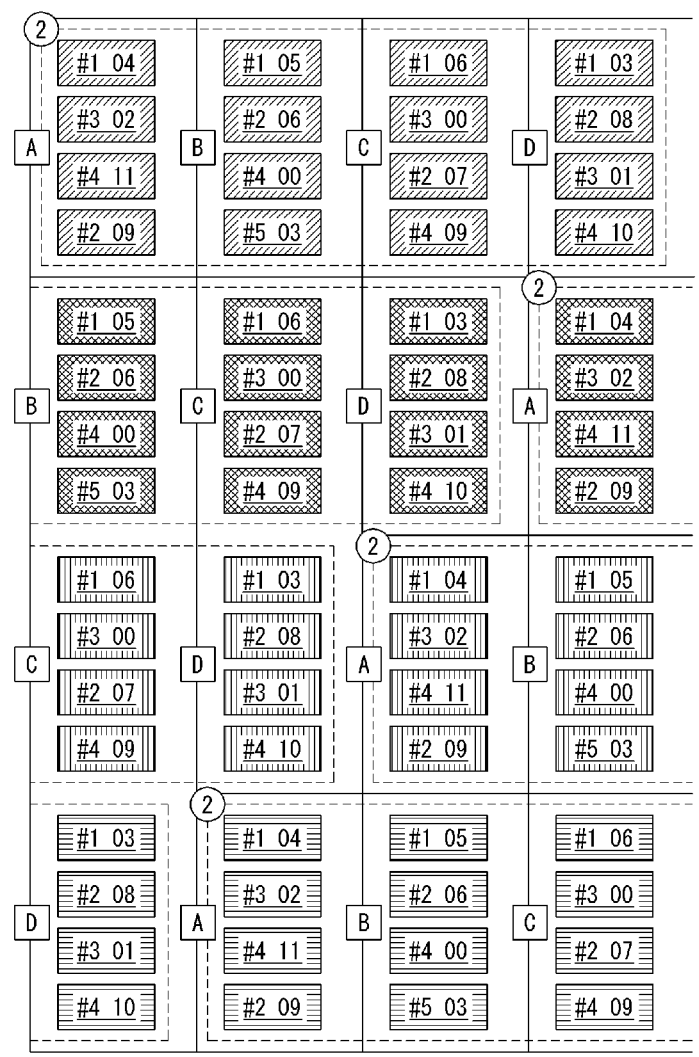
Figure 36C:
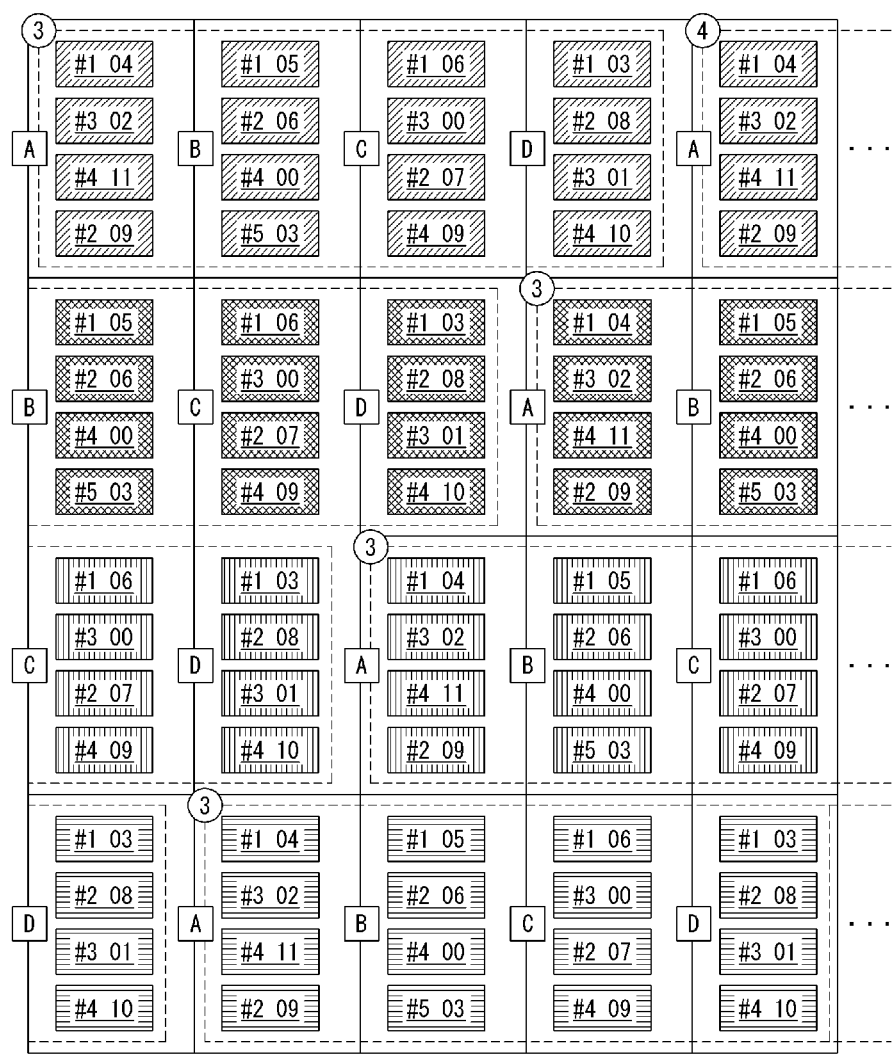

FIGS. 36A to 36C are conceptual diagrams illustrating a first exemplary embodiment of beam patterns of a unit cluster in different frequency bands and different scheduling times.

Referring to FIGS. 36A to 36C, beam patterns A, B, C, and D may be repeated for the respective sub-frequency bands and the respective scheduling times with respect to the unit cluster #1. In the scheduling time t1, the unit cluster #1 may form the A pattern when the sub-frequency band B #1 is used, may form the B pattern when the sub-frequency band B #2 is used, may form the C pattern when the sub-frequency band B #3 is used, and may form the D pattern when the sub-frequency band B #4 is used. Also, in the scheduling time t2, the unit cluster #1 may form the B pattern when the sub-frequency band B #1 is used, may form the C pattern when the sub-frequency band B #2 is used, and may form the D pattern when the sub-frequency band B #3 is used, and may form the A pattern when the sub-frequency band #4 is used. Also, in the scheduling time t3, the unit cluster #1 may form the C pattern when the sub-frequency band B #1 is used, may form the D pattern when the sub-frequency band B #2 is used, may form the A pattern when the sub-frequency band B #3 is used, and may form the B pattern when the sub-frequency band #4 is used. Also, in the scheduling time t4, the unit cluster #1 may form the D pattern when the sub-frequency band B #1 is used, may form the A pattern when the sub-frequency band B #2 is used, may form the B pattern when the sub-frequency band B #3 is used, and may form the C pattern when the sub-frequency band #4 is used. As described above, in the unit cluster #1, as the scheduling time goes, the A, B, C, and D patterns may be continuously repeated when viewed from one sub-frequency band. If the A, B, C, and D patterns repeated according to the scheduling times are bundled, they may be expressed as 1, 2, 3, 4.

As a result, the same beam pattern may be repeated based on the measurement values of the transceivers. The beam patterns may be repeated according to sub-frequency bands over time. In one scheduling time, the beam patterns may be repeatedly continuous according to the sub-frequency band. Such the beam patterns may not necessarily be used in a transmission mode. In a certain scheduling time, the beam patterns may be used as a transmission mode, and in a certain scheduling time, the beam patterns may be used as a reception mode. When the beam pattern is used in a reception mode, the terminal may know in which scheduling time and in which sub-band to perform transmission.

Meanwhile, the central control apparatus may roughly predict a beam index and a received power strength of a beam that can be detected by the terminal according to a position of the terminal in a specific scheduling time (e.g., t1) based on the beam patterns. Accordingly, when each port of the transceivers generates a beam and transmits signals through the beam, the central control apparatus may configure a subframe including a unit cluster ID, transceiver ID, and beam index for each beam to be transmitted to the terminal on a data channel (e.g., PDSCH), or configure a reference signal (e.g., CSI-RS) including the same information to be transmitted to the terminal. Accordingly, the terminal may receive the subframe or reference signal, and may obtain the unit cluster ID, transceiver ID, and beam index from the received subframe or reference signal. In addition, when the terminal receives the reference signal, the terminal may measure a received signal strength of the reference signal. Accordingly, the terminal may feed the unit cluster ID, transceiver ID, and beam index, which are identified from the subframe or reference signal, back to at least one transceiver constituting the unit cluster. In this case, the terminal may transmit, to the transceiver, a terminal ID and the received signal strength together with the unit cluster ID, transceiver ID, and beam index (when the reference signal is received). Accordingly, the transceiver may receive the unit cluster ID, transceiver ID, beam index, terminal ID, and received signal strength from the terminal (when the reference signal is received). In addition, when the reference signal is transmitted, the transceiver may transmit, to the central control apparatus, the unit cluster ID, transceiver ID, beam index, terminal ID, and received signal strength, which are received from the terminal. Through this process, when the reference signal is transmitted, the central control apparatus may receive, from the transceiver(s) belonging to the unit cluster, feedback information including the unit cluster ID, transceiver ID, beam index, terminal ID, and received signal strength, which are received from the terminal. Also, the central control apparatus may estimate a position of the terminal based on the received feedback information. Since the central control apparatus can obtain information on a sub-frequency band and a beam index of the signal received from the terminal, the central control apparatus can identify the position of the terminal.

FIGS. 37A to 37I are conceptual diagrams illustrating a first exemplary embodiment of beams that a terminal receives according to a position.

Figure 37A:
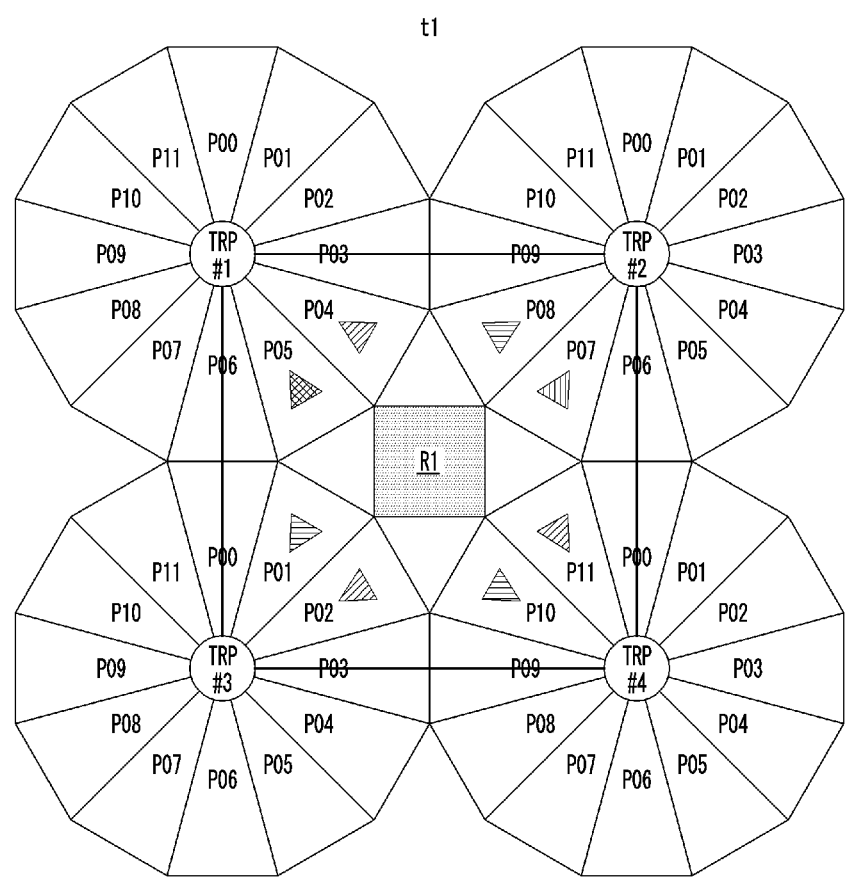
FIGS. 37A to 37I are conceptual diagrams illustrating a first exemplary embodiment of beams that a terminal receives according to a position.

Referring to FIG. 37A, beams, which a terminal receives when located in a region R1 near the center of the unit cluster, may include a beam transmitted by TRP #1 through a port P04 using a sub-frequency band B #1, a beam transmitted by TRP #1 through a port P05 using a sub-frequency band B #2, a beam transmitted by TRP #2 through a port P07 using a sub-frequency band B #3, a beam transmitted by TRP #2 through a port P08 using a sub-frequency band B #4, a beam transmitted by TRP #3 through a port P02 using the sub-frequency band B #1, a beam transmitted by TRP #3 through a port P01 using the sub-frequency band B #4, a beam transmitted by TRP #4 through a port P11 using the sub-frequency band B #1, and a beam transmitted by TRP #4 through a port P10 using the sub-frequency band B #4. As such, when the terminal is located in the center of the cluster, the number of beams that the terminal located in the region R1 receives may be 8.

Figure 37B:
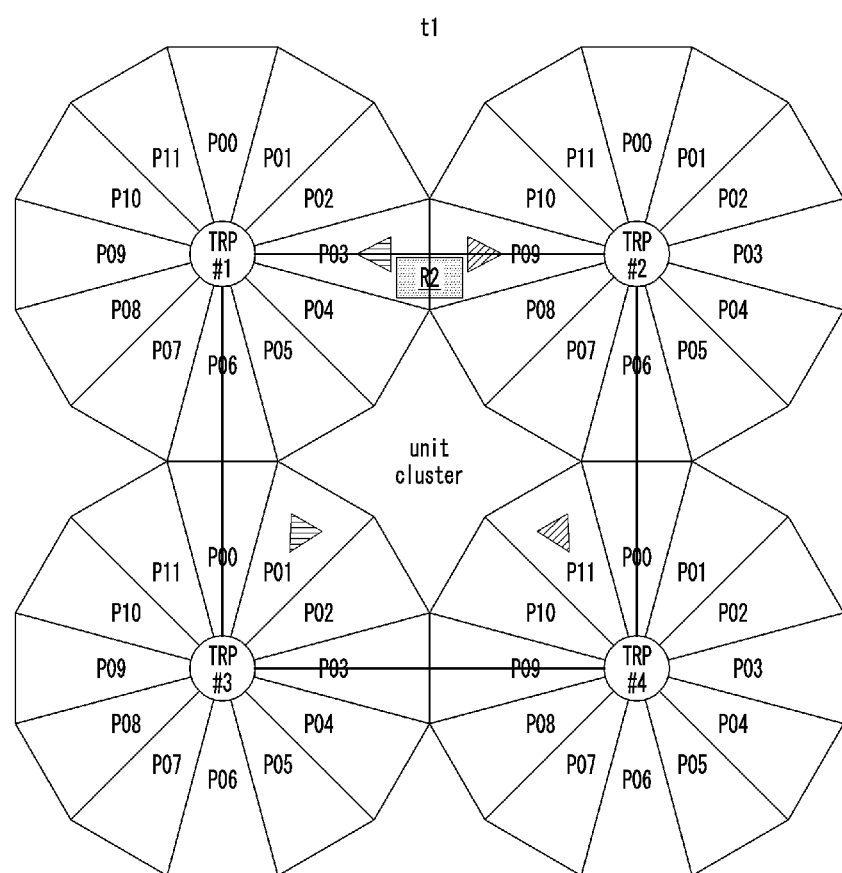

Referring to FIG. 37B, beams, which a terminal receives when located in a region R2 between TRP #1 and TRP #2, may include a beam transmitted by TRP #1 through a port P03 using the sub-frequency band B #4, a beam transmitted by TRP #2 through a port P09 using the sub-frequency band B #1, a beam transmitted by TRP #3 through a port P01 using the sub-frequency band B #4, and a beam transmitted by TRP #4 through a port P11 using the sub-frequency band B #1. As such, the number of beams that the terminal located in the region R2 receives may be 4.

Figure 37C:
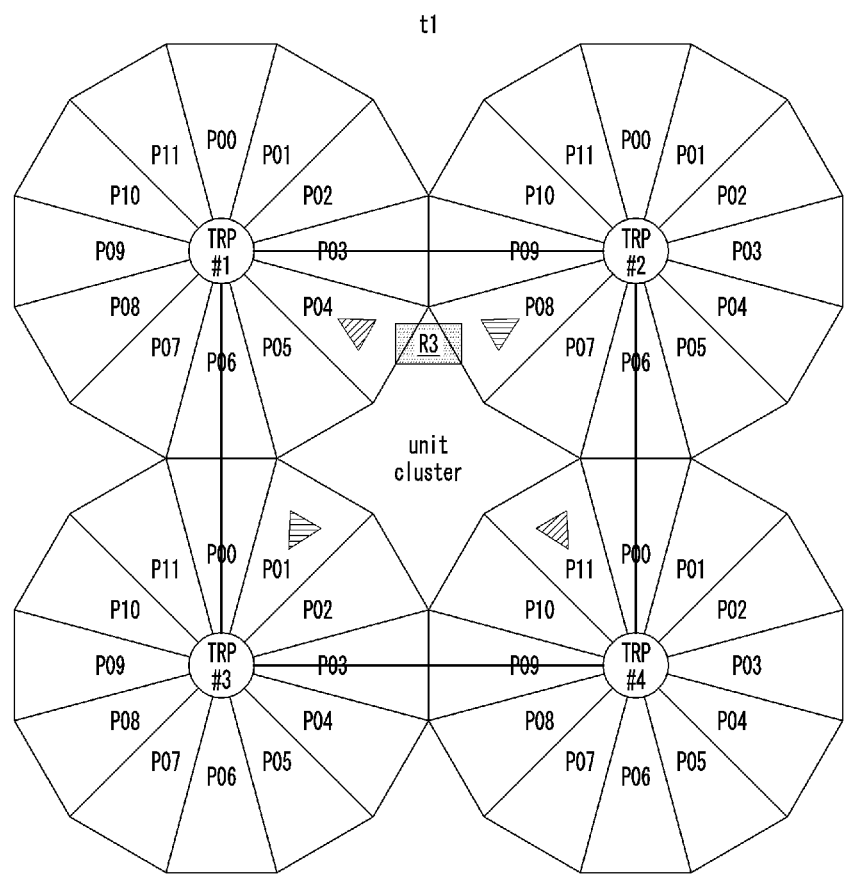

Referring to FIG. 37C, beams, which a terminal receives when located in a region R3 located close to the center of the cluster and between TRP #1 and TRP #2, may include a beam transmitted by TRP #1 through a port P04 using the sub-frequency band B #1, a beam transmitted by TRP #2 through a port P08 using the sub-frequency band B #4, a beam transmitted by TRP #3 through a port P01 using the sub-frequency band B #4, and a beam transmitted by TRP #4 through a port P11 using the sub-frequency band B #1. As such, the number of beams that the terminal located in the region R3 receives may be 4.

Figure 37D:
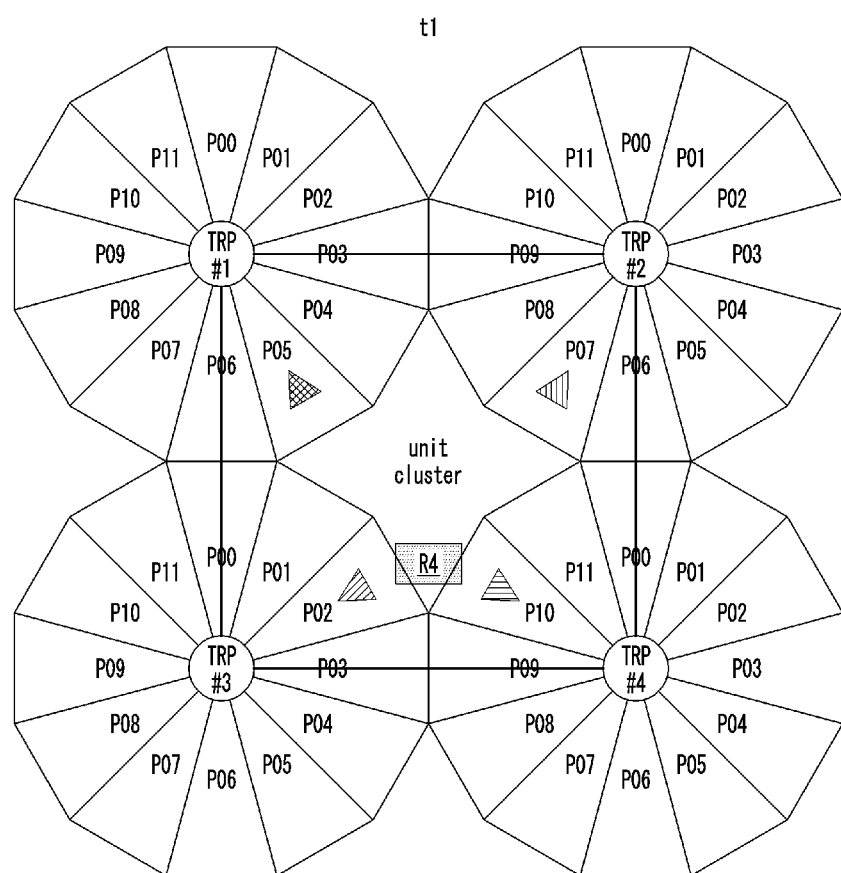

Referring to FIG. 37D, beams, which a terminal receives when located in a region R4 close to the center of the cluster and between TRP #3 and TRP #4, may include a beam transmitted by TRP #1 through a port P05 using the sub-frequency band B #2, a beam transmitted by TRP #2 through a port P07 using the sub-frequency band B #3, a beam transmitted by TRP #3 through a port P02 using the sub-frequency band B #1, and a beam transmitted by TRP #4 through a port P10 using the sub-frequency band B #3. As such, the number of beams that the terminal located in the region R4 receives may be 4.

Figure 37E:
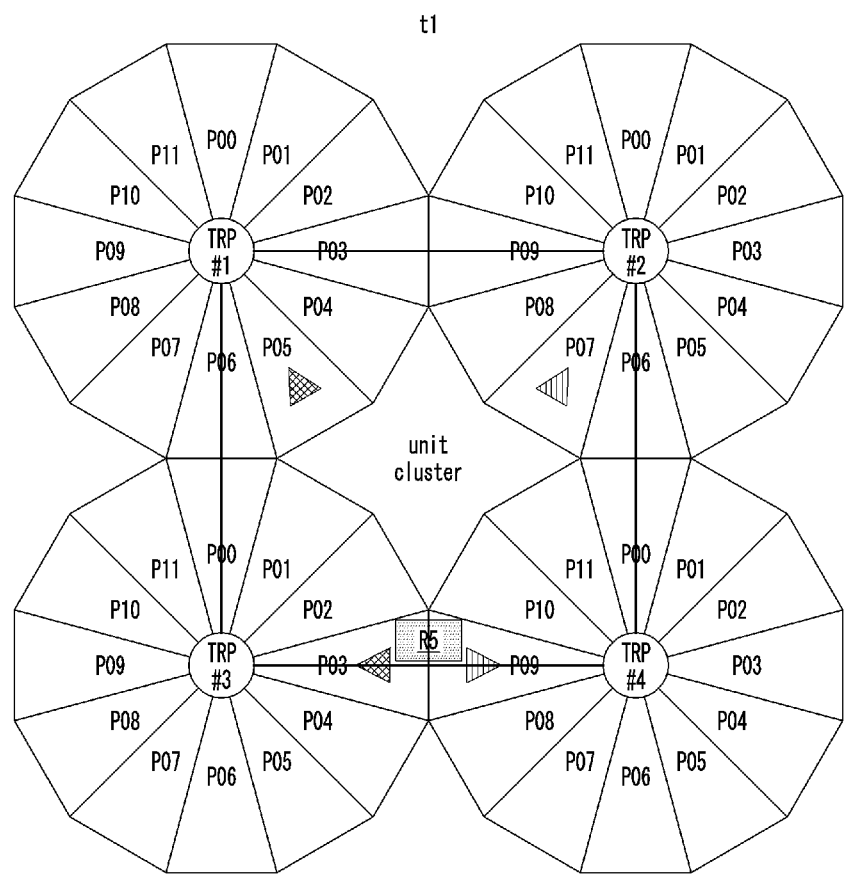

Referring to FIG. 37E, beams, which a terminal receives when located in a region R5 between TRP #3 and TRP #4, may include a beam transmitted by TRP #1 through a port P05 using the sub-frequency band B #2, a beam transmitted by TRP #2 through a port P07 using the sub-frequency band B #3, a beam transmitted by TRP #3 through a port P03 using the sub-frequency band B #2, and a beam transmitted by TRP #4 through a port P09 using the sub-frequency band B #3. As such, the number of beams that the terminal located in the region R5 receives may be 4.

Figure 37F:
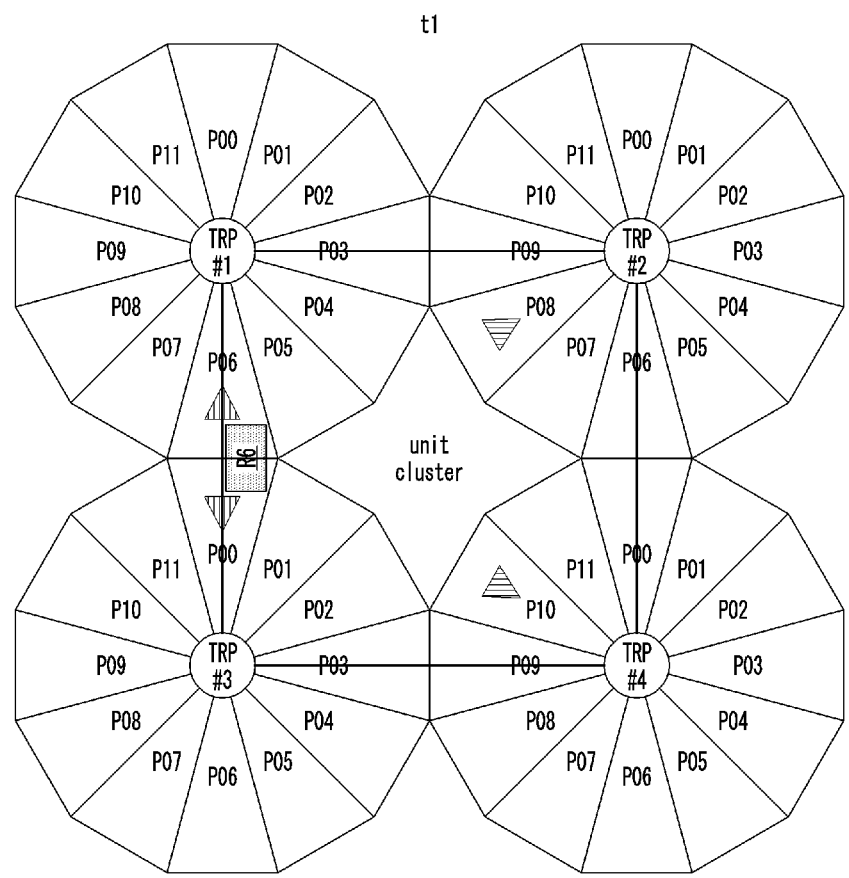

Referring to FIG. 37F, beams, which a terminal receives when located in a region R6 between TRP #1 and TRP #3, may include a beam transmitted by TRP #1 through a port P06 using the sub-frequency band B #3, a beam transmitted by TRP #2 through a port P08 using the sub-frequency band B #4, a beam transmitted by TRP #3 through a port P00 using the sub-frequency band B #3, and a beam transmitted by TRP #4 through a port P10 using the sub-frequency band B #4. As such, the number of beams that the terminal located in the region R6 receives may be 4.

Figure 37G:
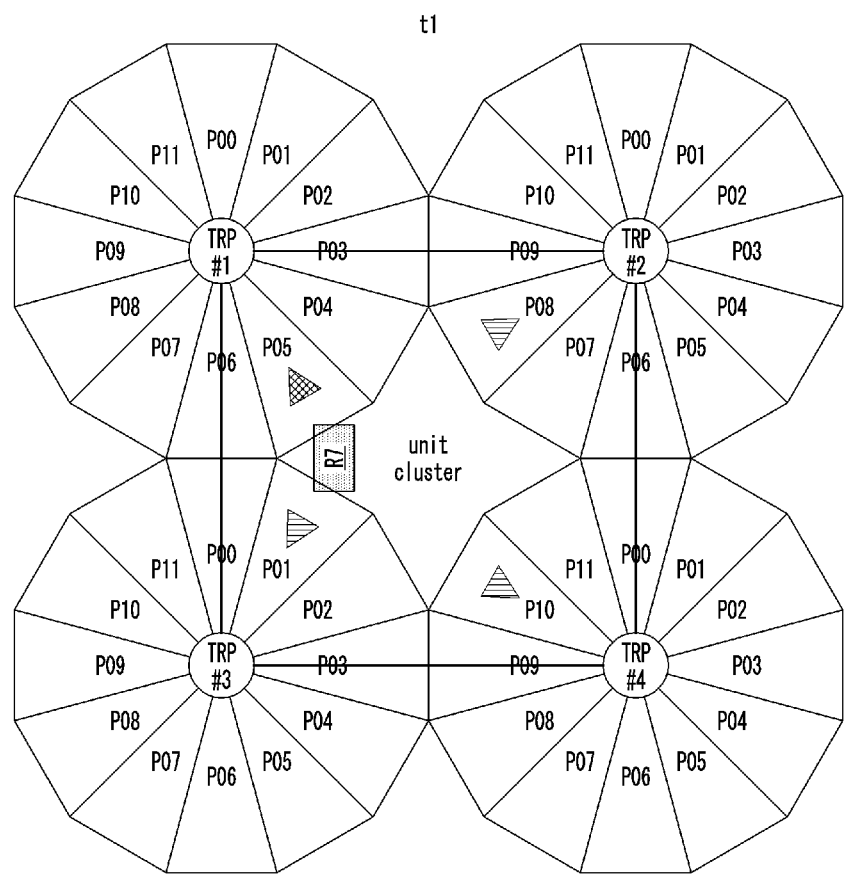

Referring to FIG. 37G, beams, which a terminal receives when located in a region R7 close to the center of the cluster and between TRP #1 and TRP #3, may include a beam transmitted by TRP #1 through a port P05 using the sub-frequency band B #2, a beam transmitted by TRP #2 through a port P08 using the sub-frequency band B #4, a beam transmitted by TRP #3 through a port P01 using the sub-frequency band B #4, and a beam transmitted by TRP #4 through a port P10 using the sub-frequency band B #4. As such, the number of beams that the terminal located in the region R7 receives may be 4.

Figure 37H:
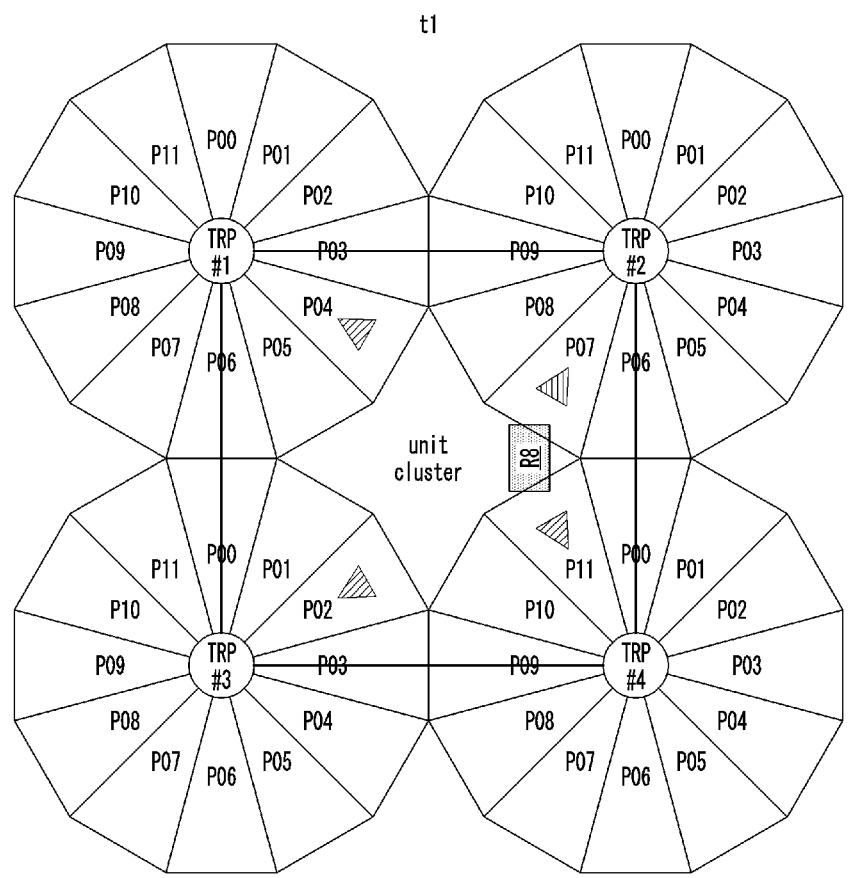

Referring to FIG. 37H, beams, which a terminal receives when located in a region R8 between TRP #1 and TRP #3, may include a beam transmitted by TRP #1 through a port P04 using the sub-frequency band B #1, a beam transmitted by TRP #2 through a port P07 using the sub-frequency band B #3, a beam transmitted by TRP #3 through a port P02 using the sub-frequency band B #1, and a beam transmitted by TRP #4 through a port P11 using the sub-frequency band B #3. As such, the number of beams that the terminal located in the region R8 receives may be 4.

Figure 37I:
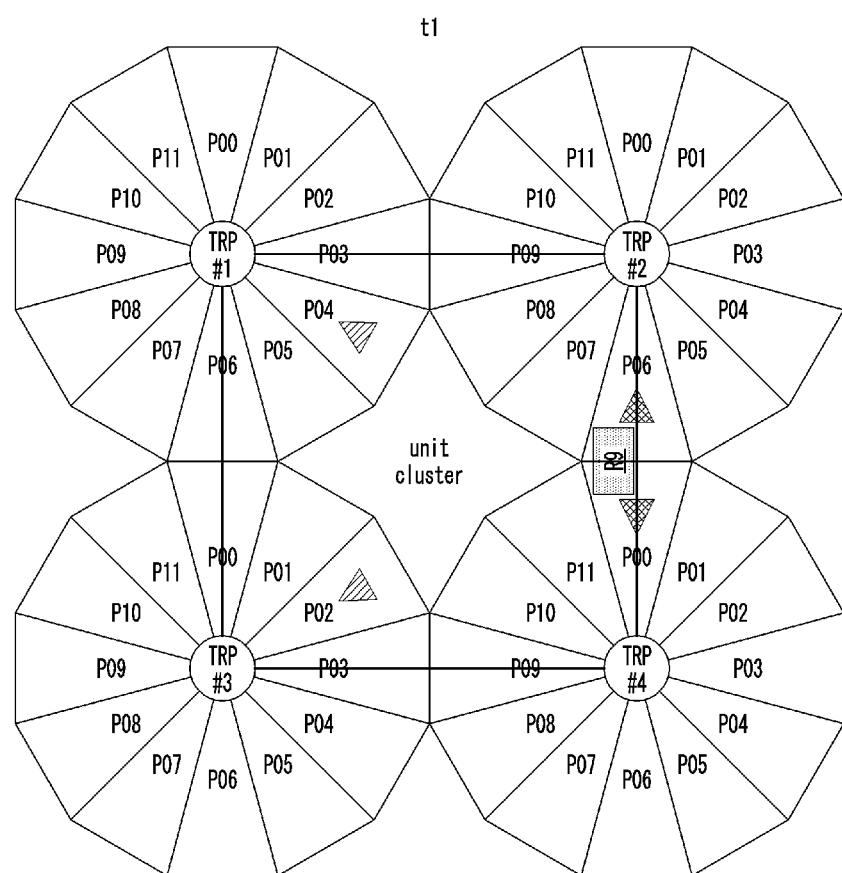

Referring to FIG. 37I, beams, which a terminal receives when located in a region R9 between TRP #2 and TRP #4, may include a beam transmitted by TRP #1 through a port P04 using the sub-frequency band B #1, a beam transmitted by TRP #2 through a port P06 using the sub-frequency band B #2, a beam transmitted by TRP #3 through a port P02 using the sub-frequency band B #1, and a beam transmitted by TRP #4 through a port P00 using the sub-frequency band B #2. As such, the number of beams that the terminal located in the region R9 receives may be 4.

FIGS. 38A to 38D are conceptual diagrams illustrating a first exemplary embodiment of beams received by a terminal over time.

Figure 38A:
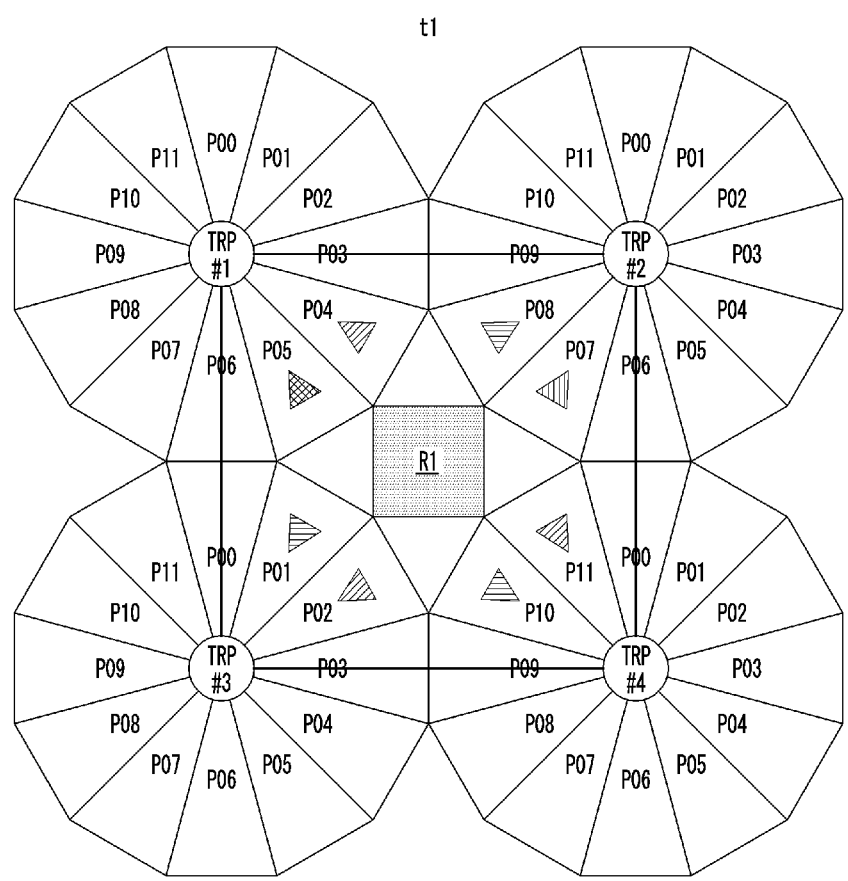
FIGS. 38A to 38D are conceptual diagrams illustrating a first exemplary embodiment of beams received by a terminal over time.

Referring to FIG. 38A, beams, which a terminal receives when located in a region R1 near the center of the unit cluster in a scheduling time t1, may include a beam transmitted by TRP #1 through a port P04 using a sub-frequency band B #1, a beam transmitted by TRP #1 through a port P05 using a sub-frequency band B #2, a beam transmitted by TRP #2 through a port P07 using a sub-frequency band B #3, a beam transmitted by TRP #2 through a port P08 using a sub-frequency band B #4, a beam transmitted by TRP #3 through a port P02 using the sub-frequency band B #1, a beam transmitted by TRP #3 through a port P01 using the sub-frequency band B #4, a beam transmitted by TRP #4 through a port P11 using the sub-frequency band B #1, and a beam transmitted by TRP #4 through a port P10 using the sub-frequency band B #4. As such, when the terminal is located in the center of the cluster, the number of beams that the terminal receives in the scheduling time t1 may be 8.

Figure 38B:
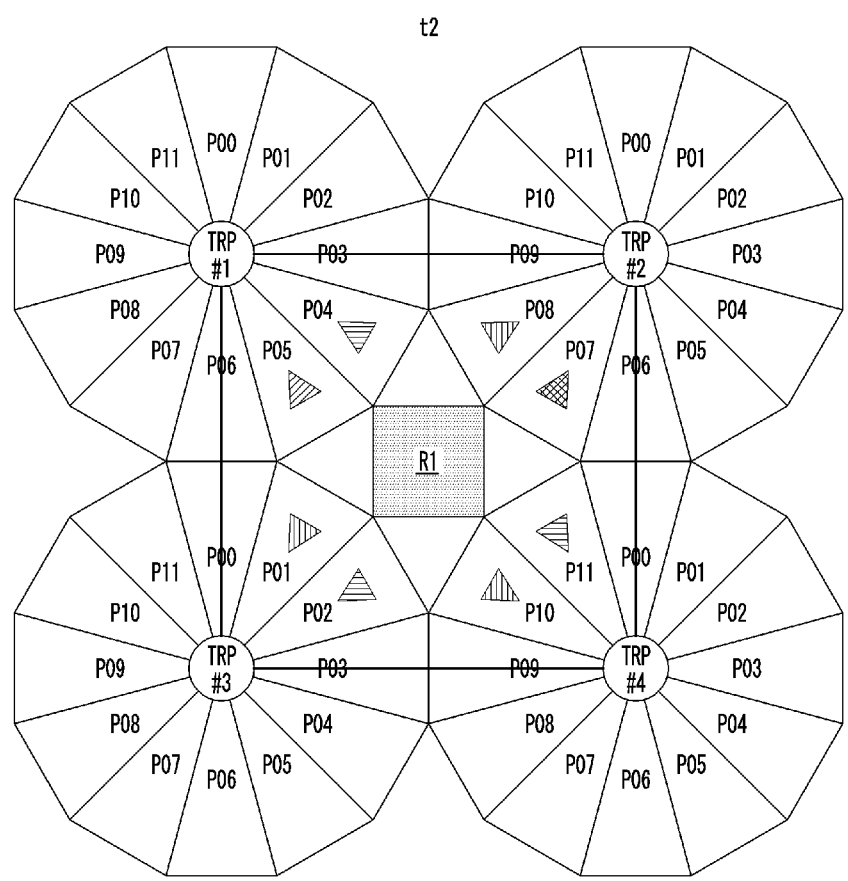

Referring to FIG. 38B, beams, which a terminal receives when located in the region R1 near the center of the unit cluster in a scheduling time t2, may include a beam transmitted by TRP #1 through a port P05 using the sub-frequency band B #1, a beam transmitted by TRP #1 through a port P04 using the sub-frequency band B #4, a beam transmitted by TRP #2 through a port P07 using the sub-frequency band B #2, a beam transmitted by TRP #2 through a port P08 using the sub-frequency band B #3, a beam transmitted by TRP #3 through a port P01 using the sub-frequency band B #3, a beam transmitted by TRP #3 through a port P02 using the sub-frequency band B #4, a beam transmitted by TRP #4 through a port P10 using the sub-frequency band B #3, and a beam transmitted by TRP #4 through a port P11 using the sub-frequency band B #4. As such, when the terminal is located in the center of the cluster, the number of beams that the terminal receives in the scheduling time t2 may be 8.

Figure 38C:
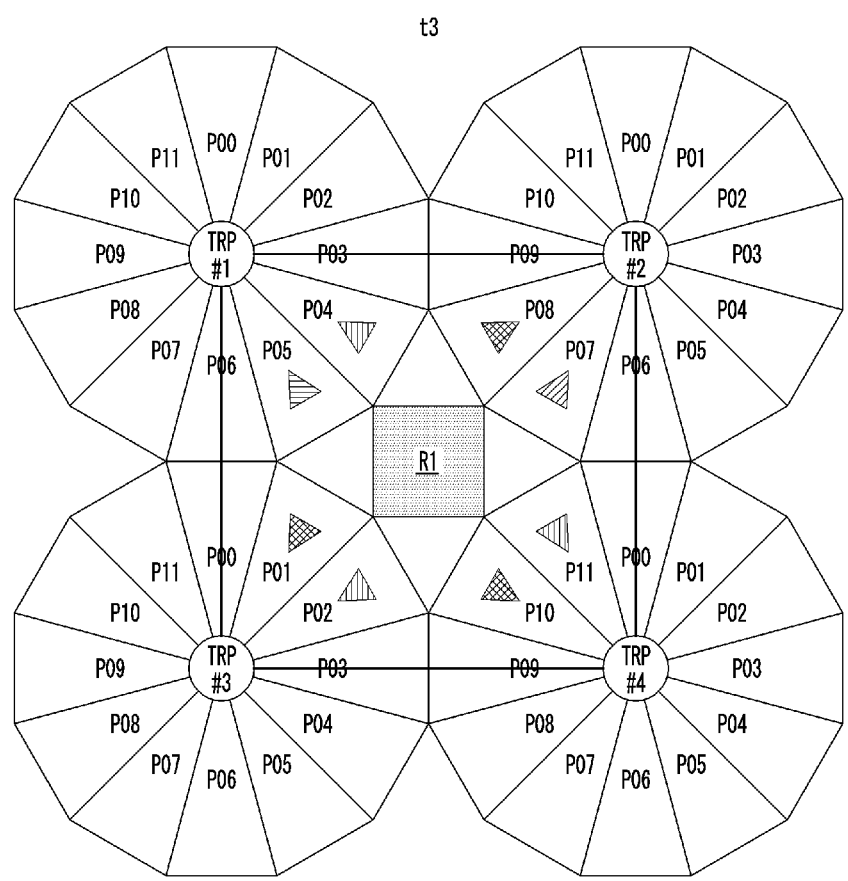

Referring to FIG. 38C, beams, which a terminal receives when located in the region R1 near the center of the unit cluster in a scheduling time t3, may include a beam transmitted by TRP #1 through a port P04 using the sub-frequency band B #3, a beam transmitted by TRP #1 through a port P05 using the sub-frequency band B #4, a beam transmitted by TRP #2 through a port P07 using the sub-frequency band B #1, a beam transmitted by TRP #2 through a port P08 using the sub-frequency band B #2, a beam transmitted by TRP #3 through a port P01 using the sub-frequency band B #2, a beam transmitted by TRP #3 through a port P02 using the sub-frequency band B #3, a beam transmitted by TRP #4 through a port P10 using the sub-frequency band B #2, and a beam transmitted by TRP #4 through a port P11 using the sub-frequency band B #3. As such, when the terminal is located in the center of the cluster, the number of beams that the terminal receives in the scheduling time t3 may be 8.

Figure 38D:
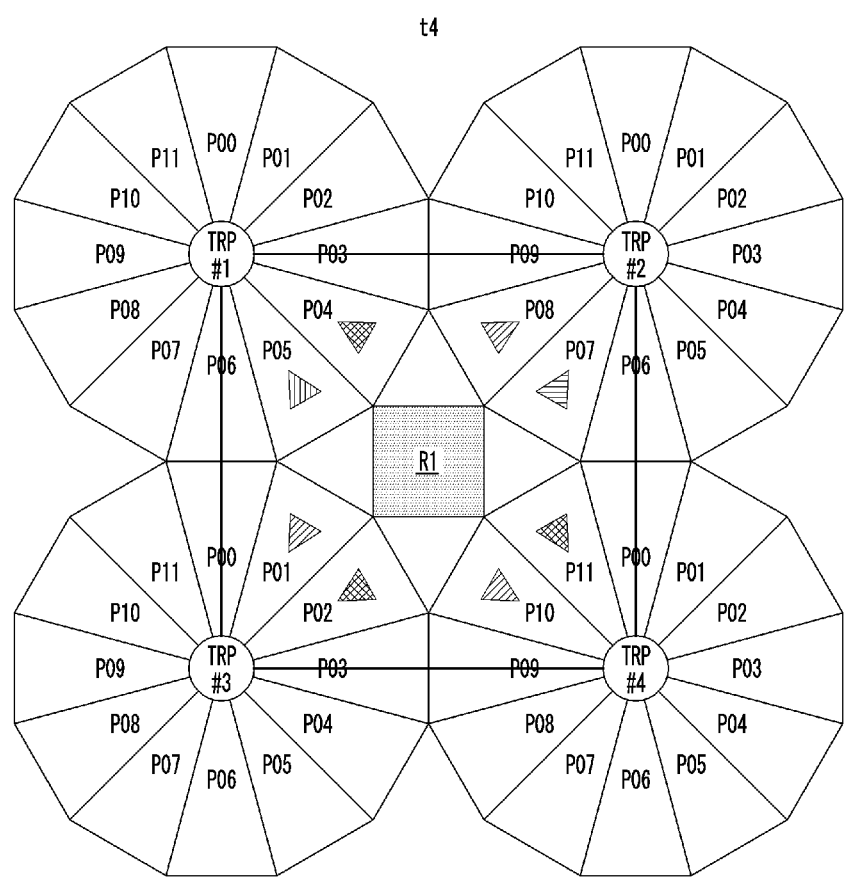

Referring to FIG. 38D, beams, which a terminal receives when located in the region R1 near the center of the unit cluster in a scheduling time t4, may include a beam transmitted by TRP #1 through a port P04 using the sub-frequency band B #2, a beam transmitted by TRP #1 through a port P05 using the sub-frequency band B #3, a beam transmitted by TRP #2 through a port P08 using the sub-frequency band B #1, a beam transmitted by TRP #2 through a port P07 using the sub-frequency band B #4, a beam transmitted by TRP #3 through a port P01 using the sub-frequency band B #1, a beam transmitted by TRP #3 through a port P02 using the sub-frequency band B #2, a beam transmitted by TRP #4 through a port P02 using the sub-frequency band B #1, and a beam transmitted by TRP #4 through a port P11 using the sub-frequency band B #2. As such, when the terminal is located in the center of the cluster, the number of beams that the terminal receives in the scheduling time t4 may be 8.

Referring again to FIG. 26, the central control apparatus may generate a scheduling map based on the beams received by the terminal over time (S2640).

Figure 39:
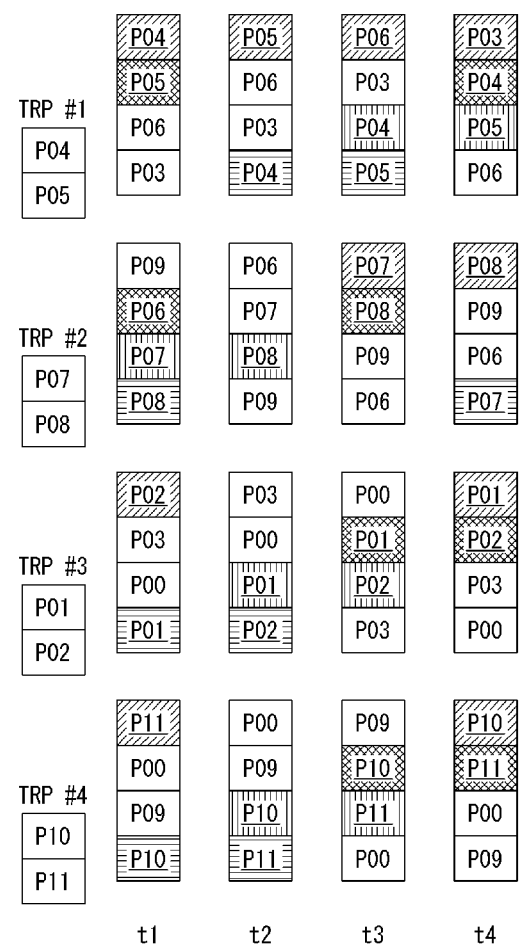
FIG. 39 is a conceptual diagram illustrating a scheduling map based on beams received by a terminal over time in FIGS. 38A to 38D.

FIG. 39 is a conceptual diagram illustrating a scheduling map based on beams received by a terminal over time in FIGS. 38A to 38D.

Referring to FIG. 39, according to a scheduling map based on beams received by the terminal over time, when a terminal is located in a region R1 near the center of the unit cluster, the terminal may receive communication services from transceivers always through a total of 8 beams in each scheduling time. In this case, the total of 8 beams may be served in the unit cluster, including three beams in one sub-frequency band, three beams in another sub-frequency band, and one beam each in different sub-frequency bands in order in each scheduling time.

For example, the port P04 of TRP #1, the port P02 of TRP #3, and the port P11 of TRP #4 may provide communication services to the terminal by transmitting and receiving beams in the sub-frequency band B #1. Also, the port P05 of TRP #1 may provide communication services to the terminal by transmitting and receiving a beam in the sub-frequency band B #2. Also, the port P07 of TRP #2 may provide communication services to the terminal by transmitting and receiving a beam in the sub-frequency band B #3. Also, the port P08 of TRP #2, the port P01 of TRP #3, and the port P10 of TRP #4 may provide communication services to the terminal by transmitting and receiving beams in the sub-frequency band B #4.

FIGS. 40A to 40D are conceptual diagrams illustrating a second exemplary embodiment of beams received by a terminal over time.

Figure 40A:
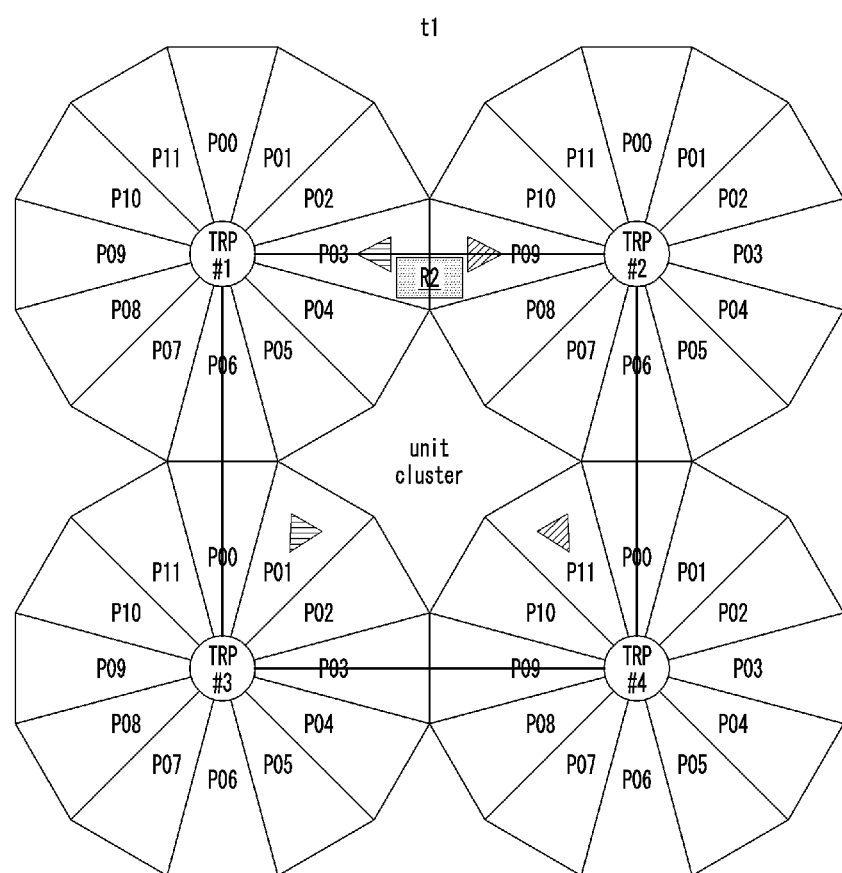
FIGS. 40A to 40D are conceptual diagrams illustrating a second exemplary embodiment of beams received by a terminal over time.

Referring to FIG. 40A, beams, which a terminal receives when located in a region R2 between TRP #1 and TRP #2 in the scheduling time t1, may include a beam transmitted by TRP #1 through a port P03 using the sub-frequency band B #4, a beam transmitted by TRP #2 through a port P09 using the sub-frequency band B #1, a beam transmitted by TRP #3 through a port P01 using the sub-frequency band B #4, and a beam transmitted by TRP #4 through a port P11 using the sub-frequency band B #1. As such, the number of beams that the terminal located in the region R2 receives may be 4.

Figure 40B:
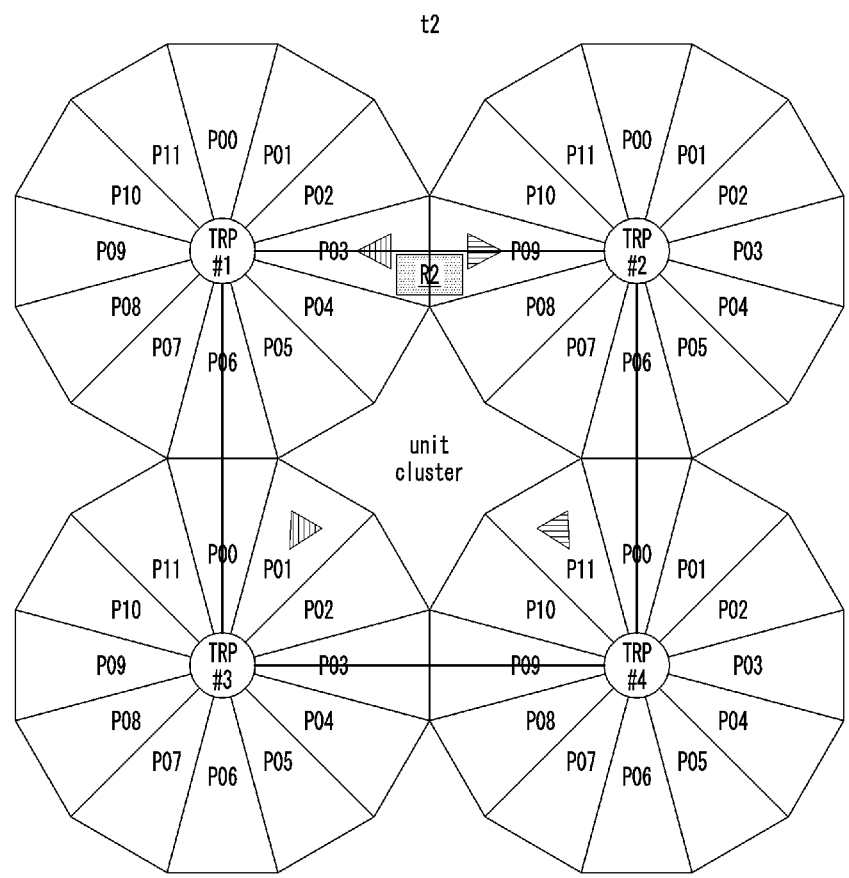

Referring to FIG. 40B, beams, which the terminal receives when located in the region R2 between TRP #1 and TRP #2 in the scheduling time t2, may include a beam transmitted by TRP #1 through a port P03 using the sub-frequency band B #3, a beam transmitted by TRP #2 through a port P09 using the sub-frequency band B #4, a beam transmitted by TRP #3 through a port P01 using the sub-frequency band B #3, and a beam transmitted by TRP #4 through a port P11 using the sub-frequency band B #1. As such, the number of beams that the terminal located in the region R2 receives may be 4.

Figure 40C:
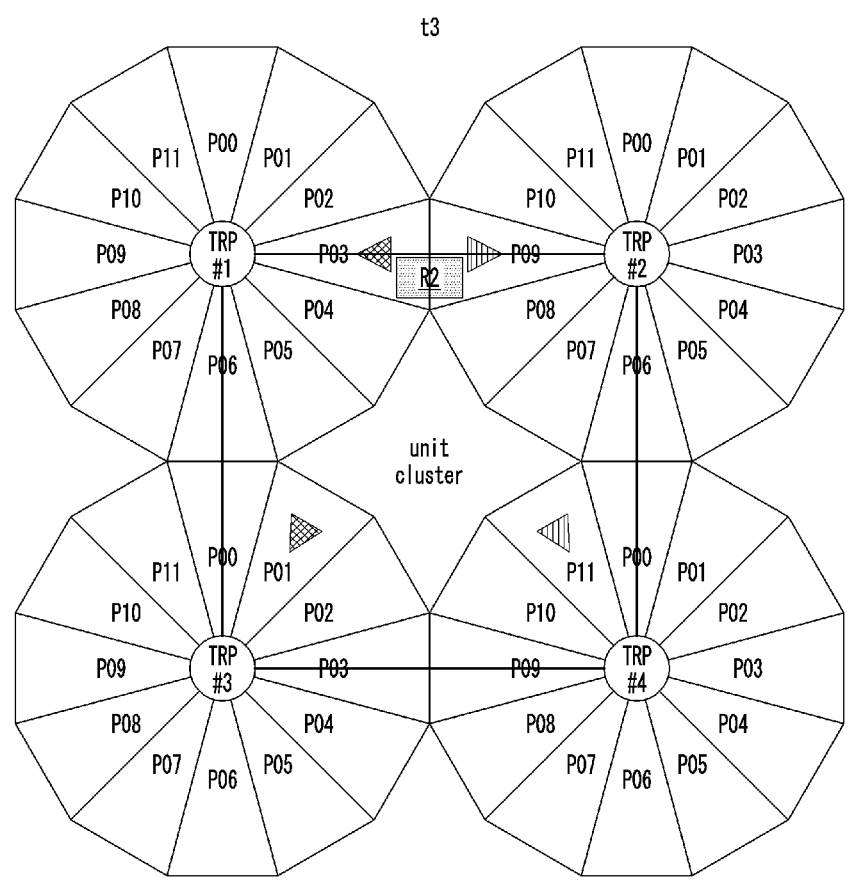

Referring to FIG. 40C, beams, which the terminal receives when located in the region R2 between TRP #1 and TRP #2 in the scheduling time t3, may include a beam transmitted by TRP #1 through a port P03 using the sub-frequency band B #2, a beam transmitted by TRP #2 through a port P09 using the sub-frequency band B #3, a beam transmitted by TRP #3 through a port P01 using the sub-frequency band B #2, and a beam transmitted by TRP #4 through a port P11 using the sub-frequency band B #3. As such, the number of beams that the terminal located in the region R2 receives may be 4.

Figure 40D:
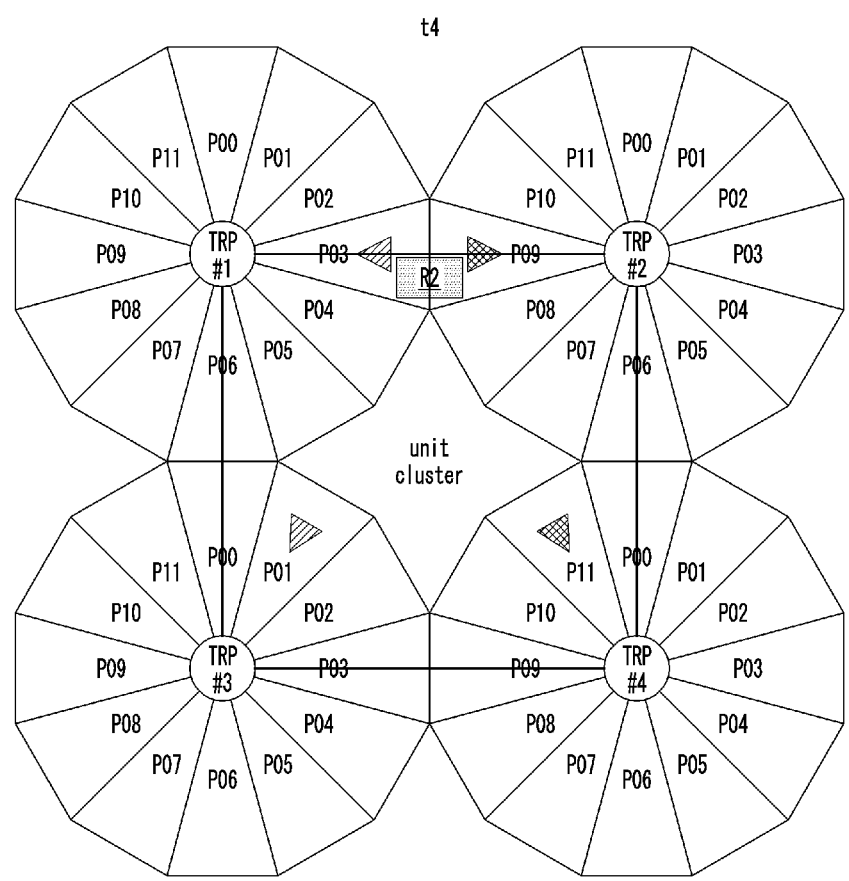

Referring to FIG. 40D, beams, which the terminal receives when located in the region R2 between TRP #1 and TRP #2 in the scheduling time t4, may include a beam transmitted by TRP #1 through a port P03 using the sub-frequency band B #1, a beam transmitted by TRP #2 through a port P09 using the sub-frequency band B #2, a beam transmitted by TRP #3 through a port P01 using the sub-frequency band B #1, and a beam transmitted by TRP #4 through a port P11 using the sub-frequency band B #2. As such, the number of beams that the terminal located in the region R2 receives may be 4.

Figure 41:
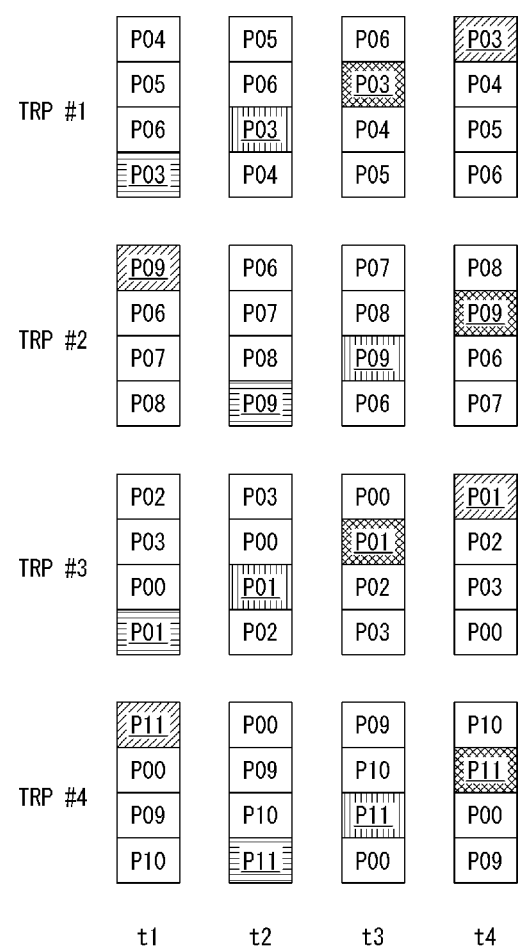
FIG. 41 is a conceptual diagram illustrating a scheduling map based on beams received by a terminal over time in FIGS. 39A to 39D.

FIG. 41 is a conceptual diagram illustrating a scheduling map based on beams received by a terminal over time in FIGS. 39A to 39D.

Referring to FIG. 41, according to a scheduling map based on beams received by the terminal over time, when the terminal is located in the region R2 between TRP #1 and TRP #2, the terminal may receive communication services from transceivers always through a total of 4 beams in each scheduling time. In this case, the total of 4 beams may be served in the unit cluster, including two beams in one sub-frequency band and two beams in another sub-frequency band in order in each scheduling time.

For example, the port P09 of TRP #2 and the port P11 of TRP #3 may provide communication services to the terminal by transmitting and receiving beams in the sub-frequency band B #1 in the scheduling time t1. Also, the port P03 of TRP #1 and the port P01 of TRP #3 may provide a communication service to the terminal by transmitting and receiving beams in the sub-frequency band B #4.

FIGS. 42A to 42D are conceptual diagrams illustrating a third exemplary embodiment of beams received by a terminal over time.

Figure 42A:
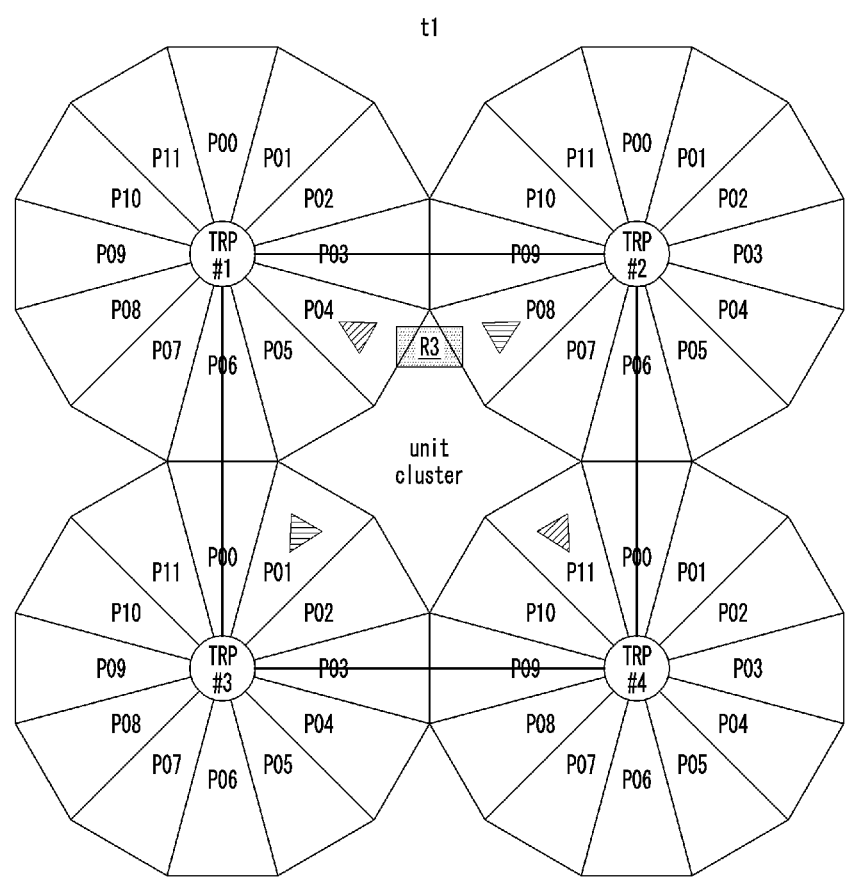
FIGS. 42A to 42D are conceptual diagrams illustrating a third exemplary embodiment of beams received by a terminal over time.

Referring to FIG. 42A, beams, which a terminal receives when located in a region R3 near the center of the unit cluster and between TRP #1 and TRP #2 in the scheduling time t1, may include a beam transmitted by TRP #1 through a port P04 using the sub-frequency band B #1, a beam transmitted by TRP #2 through a port P08 using the sub-frequency band B #4, a beam transmitted by TRP #3 through a port P01 using the sub-frequency band B #4, and a beam transmitted by TRP #4 through a port P11 using the sub-frequency band B #1. As such, the number of beams that the terminal located in the region R3 receives may be 4.

Figure 42B:
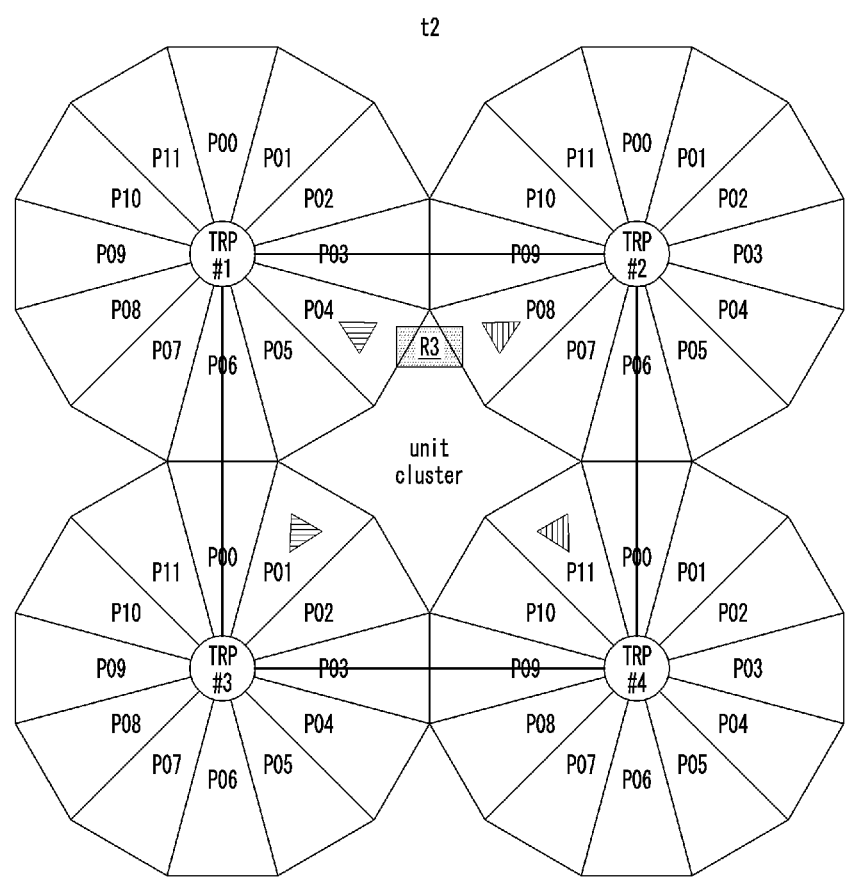

Referring to FIG. 42B, beams, which a terminal receives when located in the region R3 near the center of the unit cluster and between TRP #1 and TRP #2 in the scheduling time t2, may include a beam transmitted by TRP #1 through a port P04 using the sub-frequency band B #4, a beam transmitted by TRP #2 through a port P08 using the sub-frequency band B #3, a beam transmitted by TRP #3 through a port P01 using the sub-frequency band B #3, and a beam transmitted by TRP #4 through a port P11 using the sub-frequency band B #4. As such, the number of beams that the terminal located in the region R3 receives may be 4.

Figure 42C:
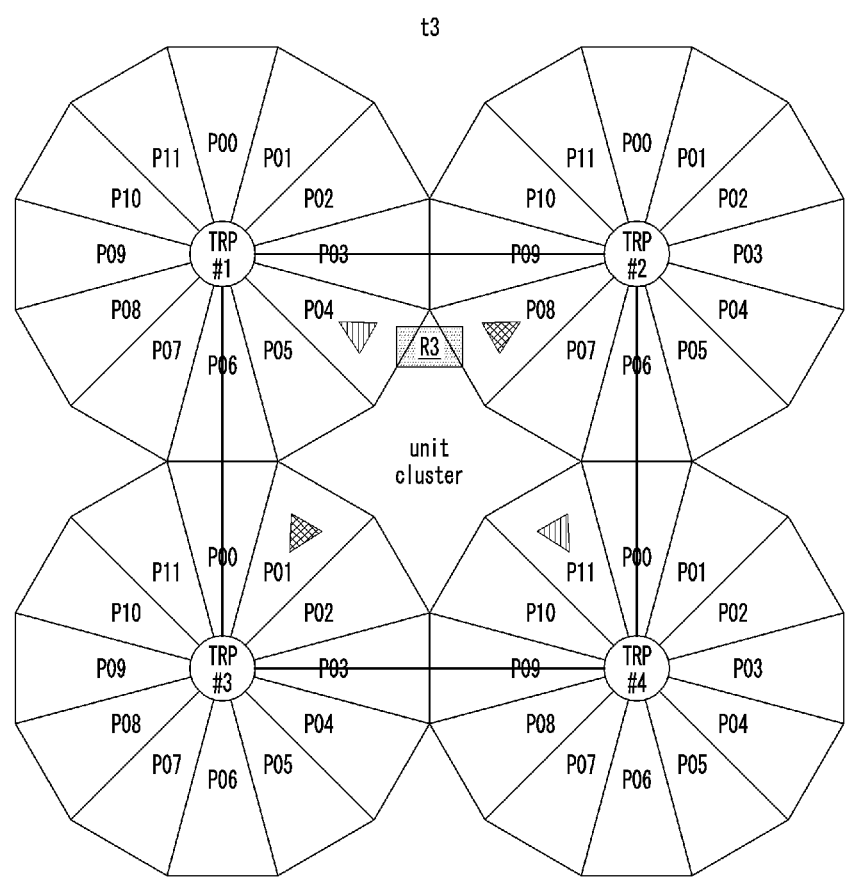

Referring to FIG. 42C, beams, which a terminal receives when located in the region R3 near the center of the unit cluster and between TRP #1 and TRP #2 in the scheduling time t3, may include a beam transmitted by TRP #1 through a port P04 using the sub-frequency band B #3, a beam transmitted by TRP #2 through a port P08 using the sub-frequency band B #2, a beam transmitted by TRP #3 through a port P01 using the sub-frequency band B #2, and a beam transmitted by TRP #4 through a port P11 using the sub-frequency band B #3. As such, the number of beams that the terminal located in the region R3 receives may be 4.

Figure 42D:
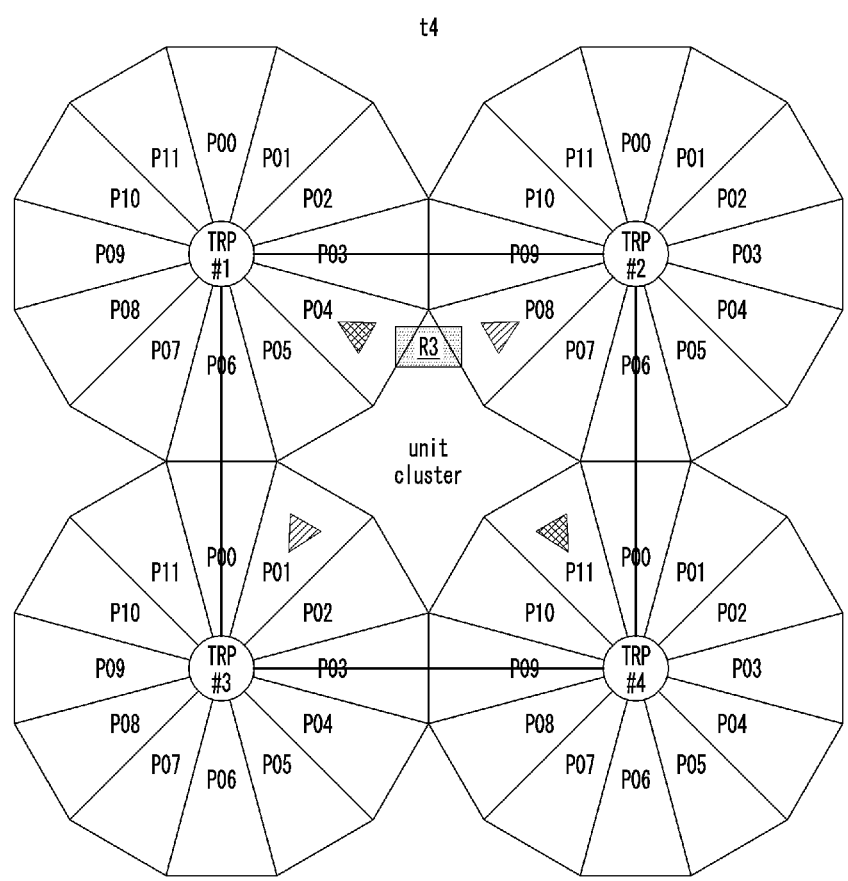

Referring to FIG. 42D, beams, which a terminal receives when located in the region R3 near the center of the unit cluster and between TRP #1 and TRP #2 in the scheduling time t4, may include a beam transmitted by TRP #1 through a port P04 using the sub-frequency band B #2, a beam transmitted by TRP #2 through a port P08 using the sub-frequency band B #1, a beam transmitted by TRP #3 through a port P01 using the sub-frequency band B #1, and a beam transmitted by TRP #4 through a port P11 using the sub-frequency band B #2. As such, the number of beams that the terminal located in the region R3 receives may be 4.

Figure 43:
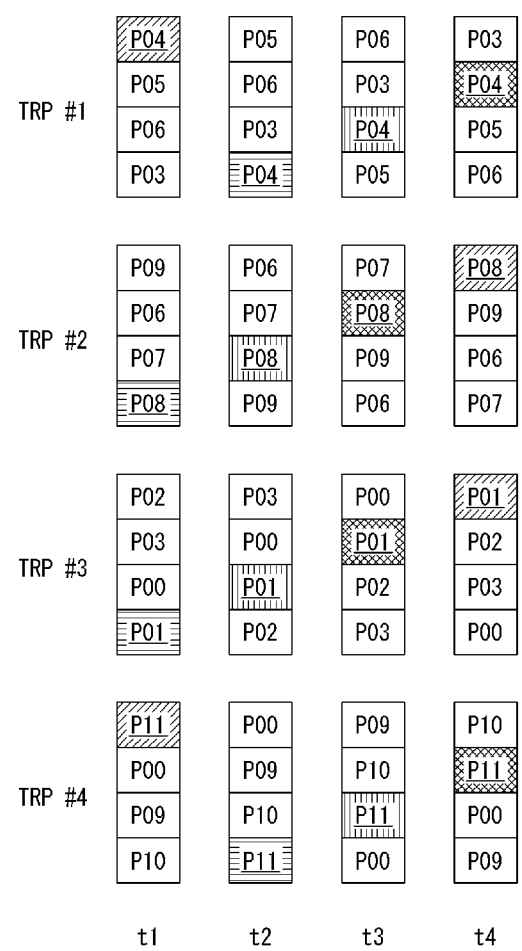
FIG. 43 is a conceptual diagram illustrating a scheduling map based on beams received by a terminal over time in FIGS. 42A to 42D.

FIG. 43 is a conceptual diagram illustrating a scheduling map based on beams received by a terminal over time in FIGS. 42A to 42D.

Referring to FIG. 43, according to a scheduling map based on beams received by the terminal over time, when the terminal is located in the region R3 near the center of the cluster and between TRP #1 and TRP #2, the terminal may receive communication services from transceivers always through a total of 4 beams in each scheduling time. In this case, the total of 4 beams may be served in the unit cluster, including two beams in one sub-frequency band and two beams in another sub-frequency band in order in each scheduling time.

For example, the port P04 of TRP #1 and the port P11 of TRP #4 may provide communication services to the terminal by transmitting and receiving beams in the sub-frequency band B #1 in the scheduling time t1. Also, the port P08 of TRP #2 and the port P01 of TRP #3 may provide communication services to the terminal by transmitting and receiving beams in the sub-frequency band B #4.

FIGS. 44A to 44D are conceptual diagrams illustrating a fourth exemplary embodiment of beams received by a terminal over time.

Figure 44A:
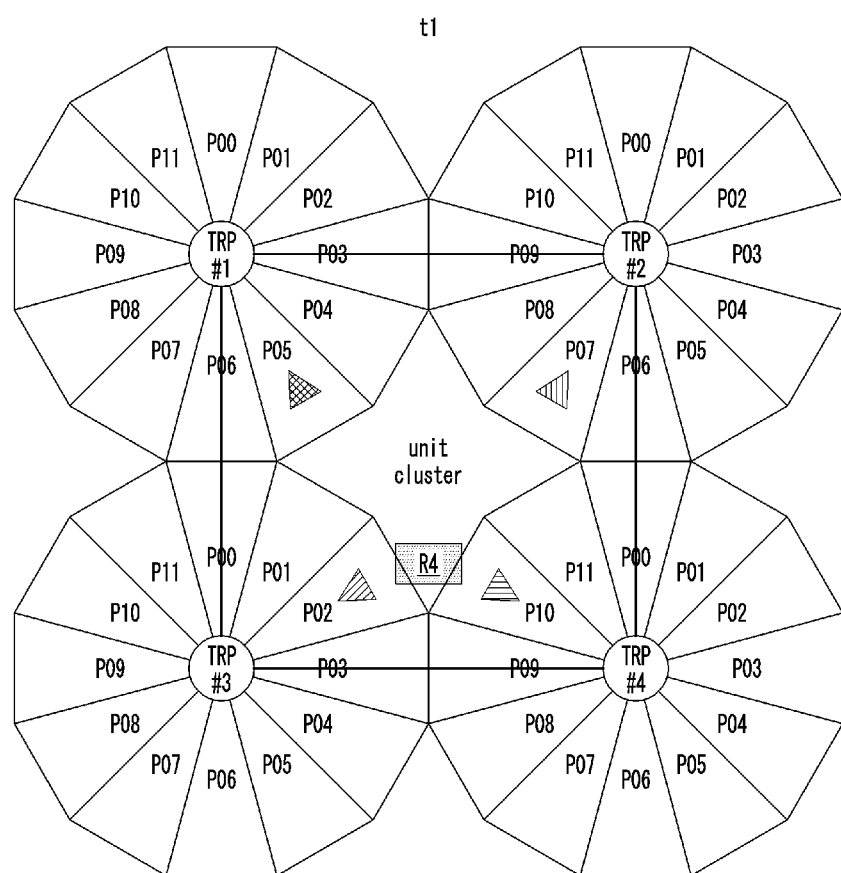
FIGS. 44A to 44D are conceptual diagrams illustrating a fourth exemplary embodiment of beams received by a terminal over time.

Referring to FIG. 44A, beams, which a terminal receives when located in a region R4 near the center and between TRP #3 and TRP #4 in the scheduling time t1, may include a beam transmitted by TRP #1 through a port P05 using the sub-frequency band B #4, a beam transmitted by TRP #2 through a port P07 using the sub-frequency band B #1, a beam transmitted by TRP #3 through a port P02 using the sub-frequency band B #3, and a beam transmitted by TRP #4 through a port P10 using the sub-frequency band B #2. As such, the number of beams that the terminal located in the region R4 receives may be 4.

Figure 44B:
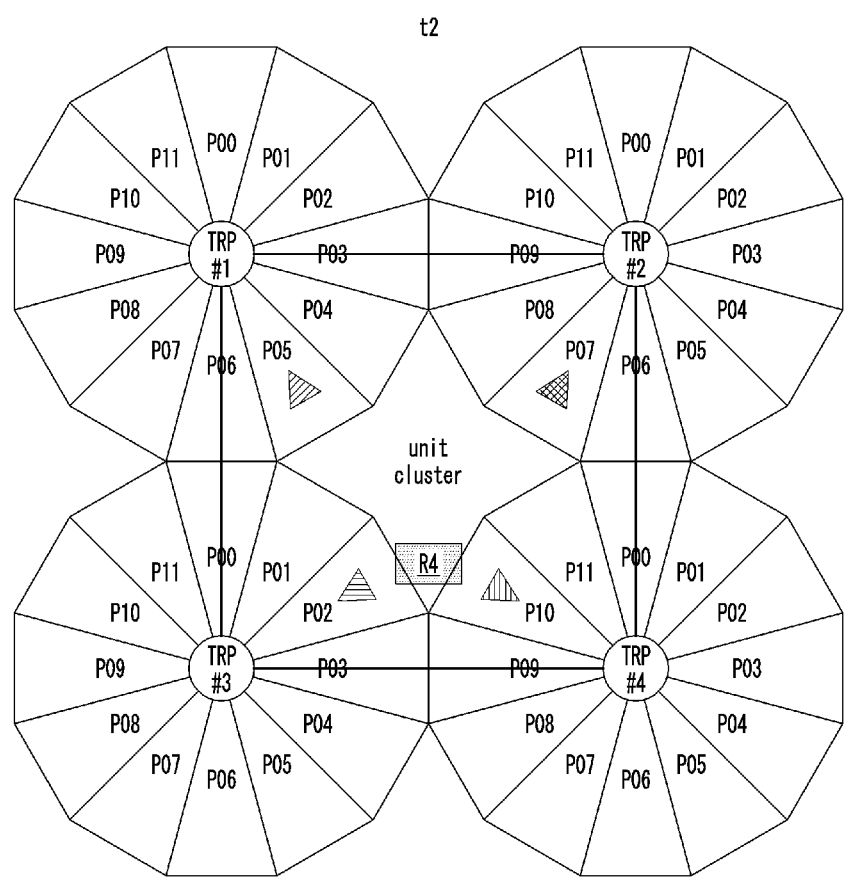

Referring to FIG. 44B, beams, which a terminal receives when located in the region R4 near the center and between TRP #3 and TRP #4 in the scheduling time t2, may include a beam transmitted by TRP #1 through a port P05 using the sub-frequency band B #3, a beam transmitted by TRP #2 through a port P07 using the sub-frequency band B #4, a beam transmitted by TRP #3 through a port P02 using the sub-frequency band B #2, and a beam transmitted by TRP #4 through a port P10 using the sub-frequency band B #1. As such, the number of beams that the terminal located in the region R4 receives may be 4.

Figure 44C:
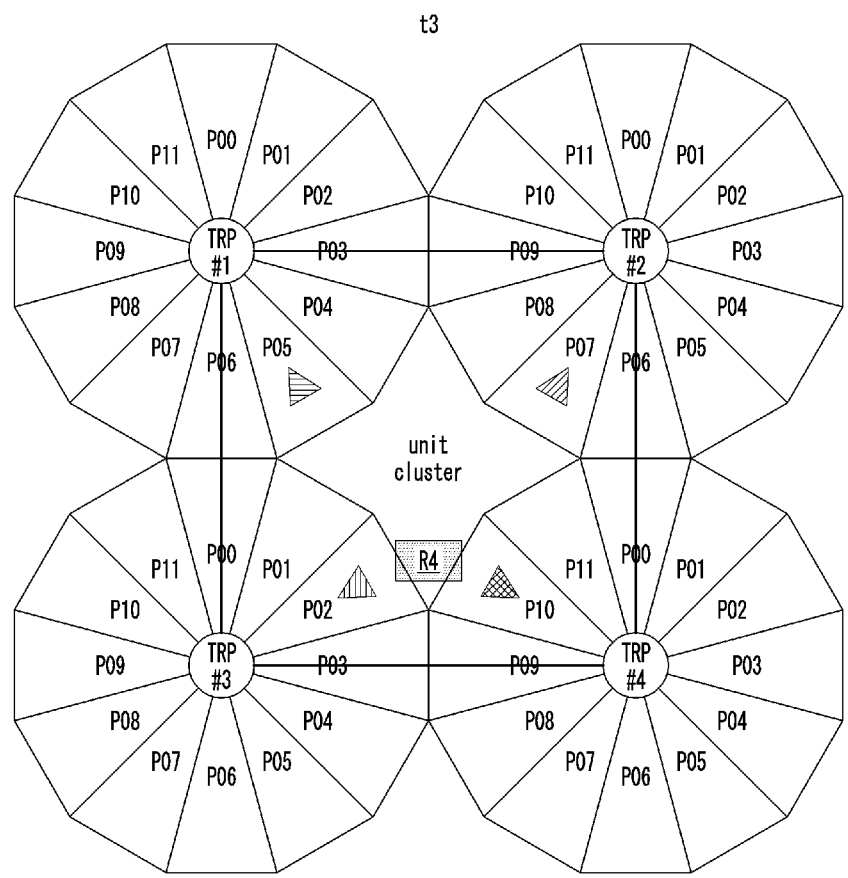

Referring to FIG. 44C, beams, which a terminal receives when located in the region R4 near the center and between TRP #3 and TRP #4 in the scheduling time t3, may include a beam transmitted by TRP #1 through a port P05 using the sub-frequency band B #4, a beam transmitted by TRP #2 through a port P07 using the sub-frequency band B #1, a beam transmitted by TRP #3 through a port P02 using the sub-frequency band B #3, and a beam transmitted by TRP #4 through a port P10 using the sub-frequency band B #2. As such, the number of beams that the terminal located in the region R4 receives may be 4.

Figure 44D:
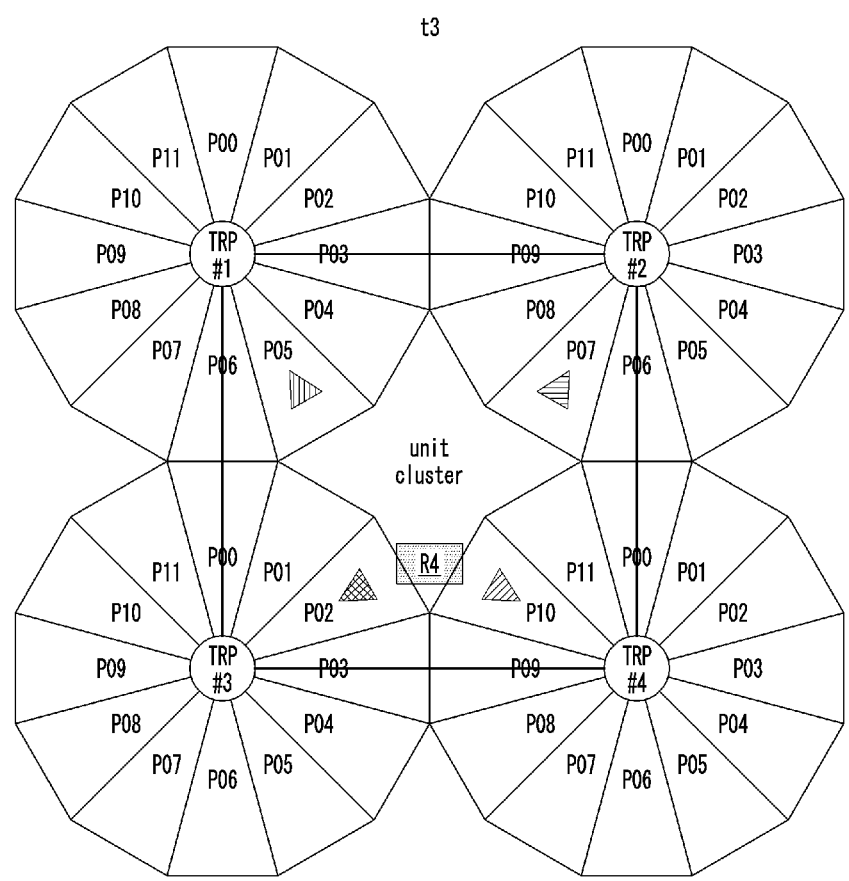

Referring to FIG. 44D, beams, which a terminal receives when located in the region R4 near the center and between TRP #3 and TRP #4 in the scheduling time t4, may include a beam transmitted by TRP #1 through a port P05 using the sub-frequency band B #3, a beam transmitted by TRP #2 through a port P07 using the sub-frequency band B #4, a beam transmitted by TRP #3 through a port P02 using the sub-frequency band B #2, and a beam transmitted by TRP #4 through a port P10 using the sub-frequency band B #1. As such, the number of beams that the terminal located in the region R4 receives may be 4.

Figure 45:
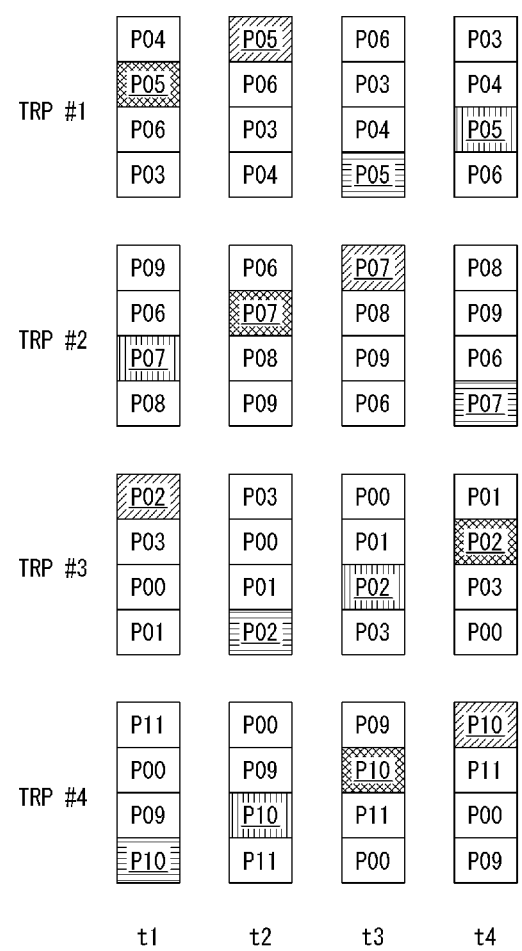
FIG. 45 is a conceptual diagram illustrating a scheduling map based on beams received by a terminal over time in FIGS. 44A to 44D.

FIG. 45 is a conceptual diagram illustrating a scheduling map based on beams received by a terminal over time in FIGS. 44A to 44D.

Referring to FIG. 45, according to a scheduling map based on beams received by the terminal over time, when the terminal is located in the region R4 near the center of the cluster and between TRP #3 and TRP #4, the terminal may receive communication services from transceivers always through a total of 4 beams in each scheduling time. In this case, the total of 4 beams may be served in the unit cluster, including one beam in each sub-frequency band in each scheduling time.

For example, the port P07 of TRP #2 may provide communication services to the terminal by transmitting and receiving beams in the sub-frequency band B #1 in the scheduling time t1. Also, the port P10 of TRP #4 may provide communication services to the terminal by transmitting and receiving beams in the sub-frequency band B #2. Also, the port P02 of TRP #3 may provide communication services to the terminal by transmitting and receiving beams in the sub-frequency band B #3. Also, the port P05 of TRP #1 may provide communication services to the terminal by transmitting and receiving beams in the sub-frequency band B #4.

FIGS. 46A to 46D are conceptual diagrams illustrating a fifth exemplary embodiment of beams received by a terminal over time.

Figure 46A:
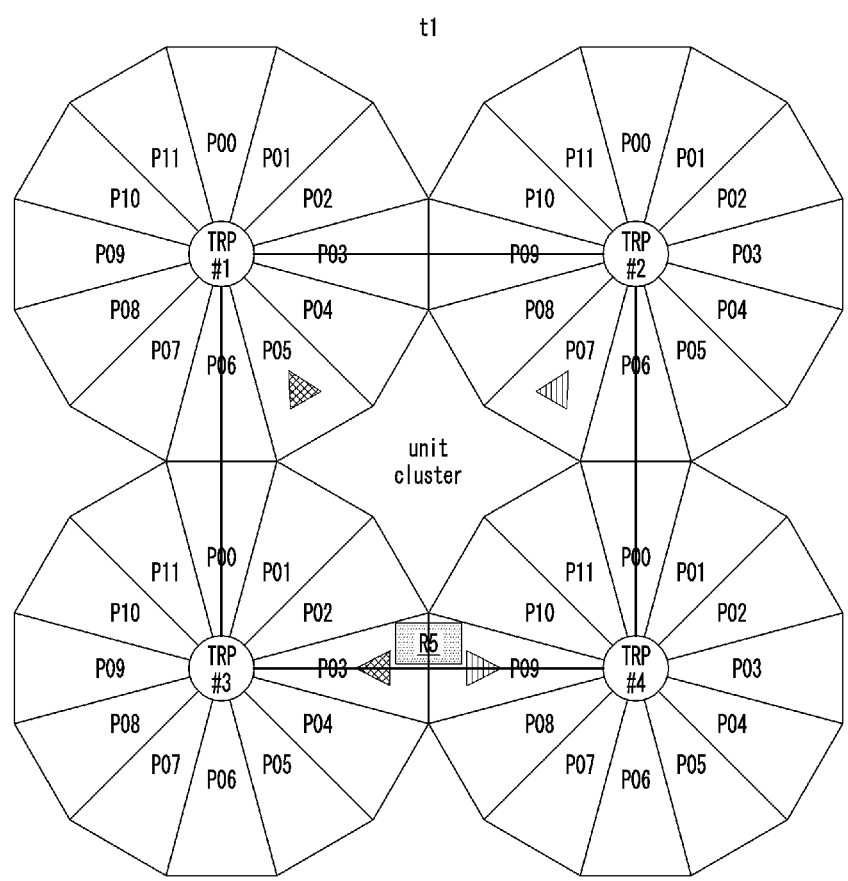
FIGS. 46A to 46D are conceptual diagrams illustrating a fifth exemplary embodiment of beams received by a terminal over time.

Referring to FIG. 46A, beams, which a terminal receives when located in a region R5 between TRP #3 and TRP #4 in the scheduling time t1, may include a beam transmitted by TRP #1 through a port P05 using the sub-frequency band B #2, a beam transmitted by TRP #2 through a port P07 using the sub-frequency band B #3, a beam transmitted by TRP #3 through a port P03 using the sub-frequency band B #2, and a beam transmitted by TRP #4 through a port P09 using the sub-frequency band B #3. As such, the number of beams that the terminal located in the region R5 receives may be 4.

Figure 46B:
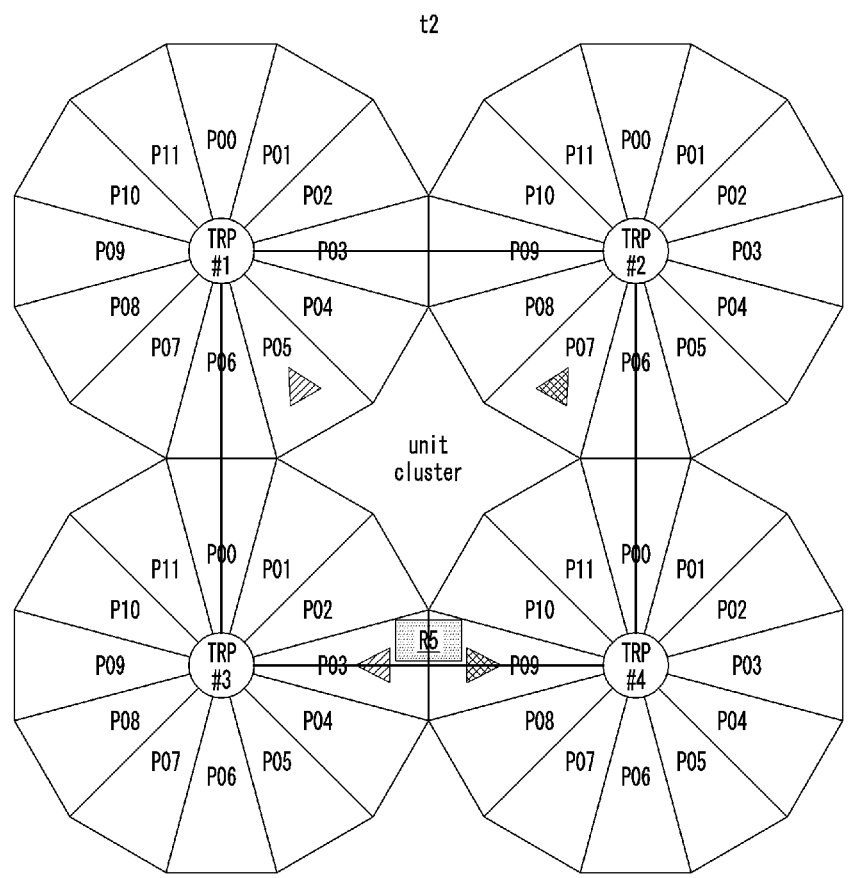

Referring to FIG. 46B, beams, which a terminal receives when located in the region R5 between TRP #3 and TRP #4 in the scheduling time t2, may include a beam transmitted by TRP #1 through a port P05 using the sub-frequency band B #1, a beam transmitted by TRP #2 through a port P07 using the sub-frequency band B #2, a beam transmitted by TRP #3 through a port P03 using the sub-frequency band B #1, and a beam transmitted by TRP #4 through a port P09 using the sub-frequency band B #2. As such, the number of beams that the terminal located in the region R5 receives may be 4.

Figure 46C:
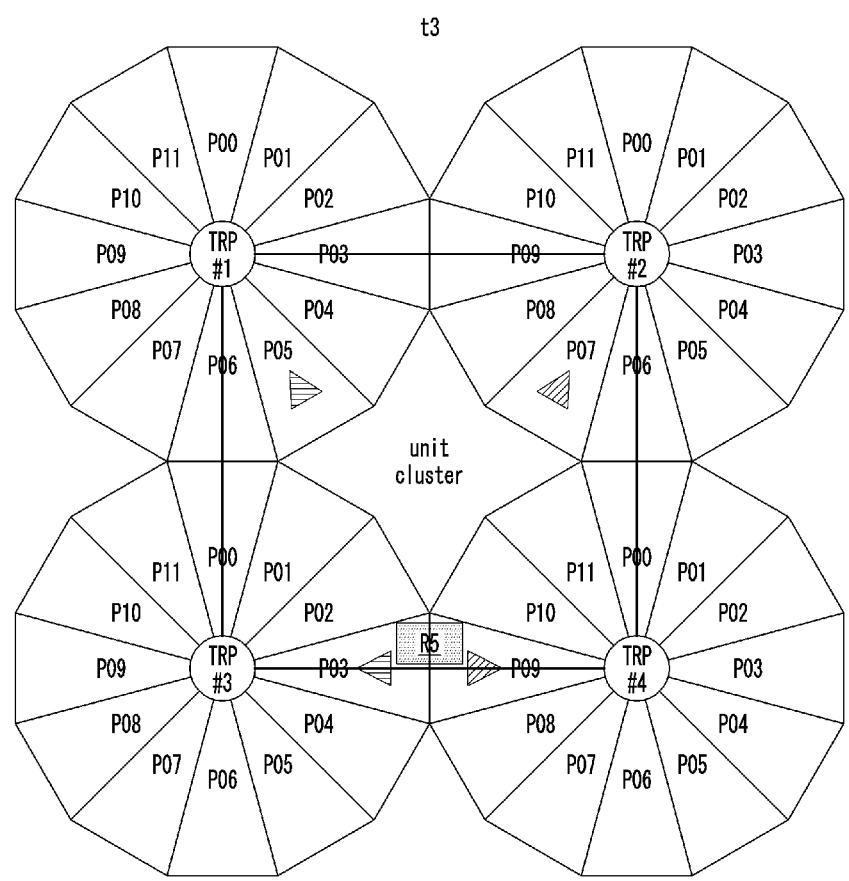

Referring to FIG. 46C, beams, which a terminal receives when located in the region R5 between TRP #3 and TRP #4 in the scheduling time t3, may include a beam transmitted by TRP #1 through a port P05 using the sub-frequency band B #4, a beam transmitted by TRP #2 through a port P07 using the sub-frequency band B #1, a beam transmitted by TRP #3 through a port P03 using the sub-frequency band B #4, and a beam transmitted by TRP #4 through a port P09 using the sub-frequency band B #1. As such, the number of beams that the terminal located in the region R5 receives may be 4.

Figure 46D:
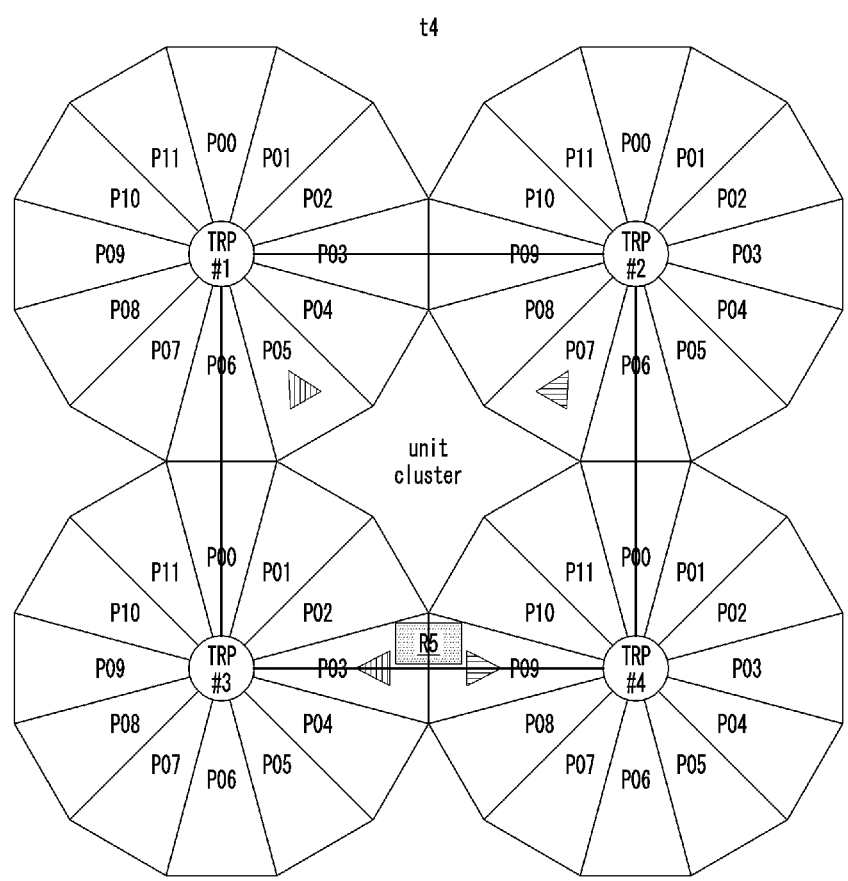

Referring to FIG. 46D, beams, which a terminal receives when located in the region R5 between TRP #3 and TRP #4 in the scheduling time t4, may include a beam transmitted by TRP #1 through a port P05 using the sub-frequency band B #3, a beam transmitted by TRP #2 through a port P07 using the sub-frequency band B #4, a beam transmitted by TRP #3 through a port P03 using the sub-frequency band B #3, and a beam transmitted by TRP #4 through a port P09 using the sub-frequency band B #4. As such, the number of beams that the terminal located in the region R5 receives may be 4.

Figure 47:
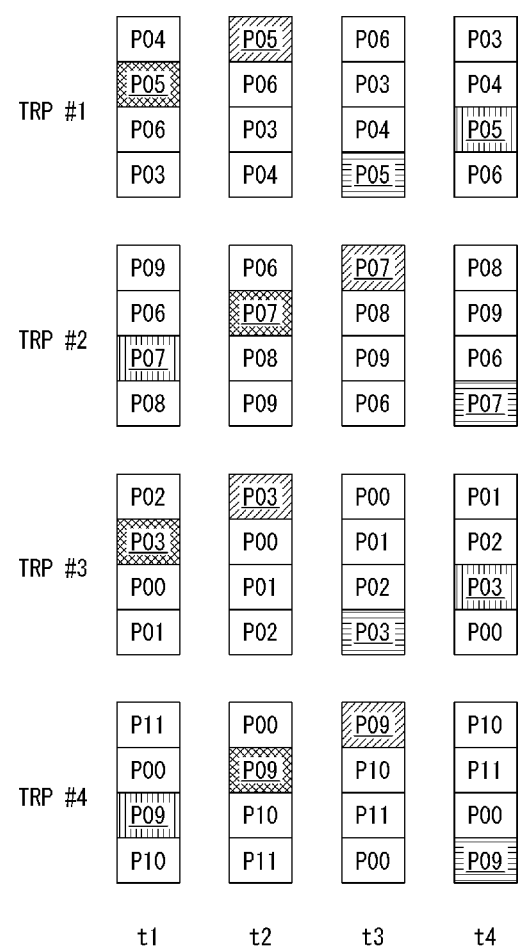
FIG. 47 is a conceptual diagram illustrating a scheduling map based on beams received by a terminal over time in FIGS. 46A to 46D.

FIG. 47 is a conceptual diagram illustrating a scheduling map based on beams received by a terminal over time in FIGS. 46A to 46D.

Referring to FIG. 47, according to a scheduling map based on beams received by the terminal over time, when the terminal is located in the region R5 between TRP #3 and TRP #4, the terminal may receive communication services from transceivers always through a total of 4 beams in each scheduling time. In this case, the total of 4 beams may be served in the unit cluster, including two beams in one sub-frequency band and two beams in another sub-frequency band in order in each scheduling time.

For example, the port P05 of TRP #1 and the port P03 of TRP #3 may provide communication services to the terminal by transmitting and receiving beams in the sub-frequency band B #2 in the scheduling time t1. Also, the port P07 of TRP #2 and the port P09 of TRP #4 may provide communication services to the terminal by transmitting and receiving beams in the sub-frequency band B #3.

FIGS. 48A to 48D are conceptual diagrams illustrating a sixth exemplary embodiment of beams received by a terminal over time.

Figure 48A:
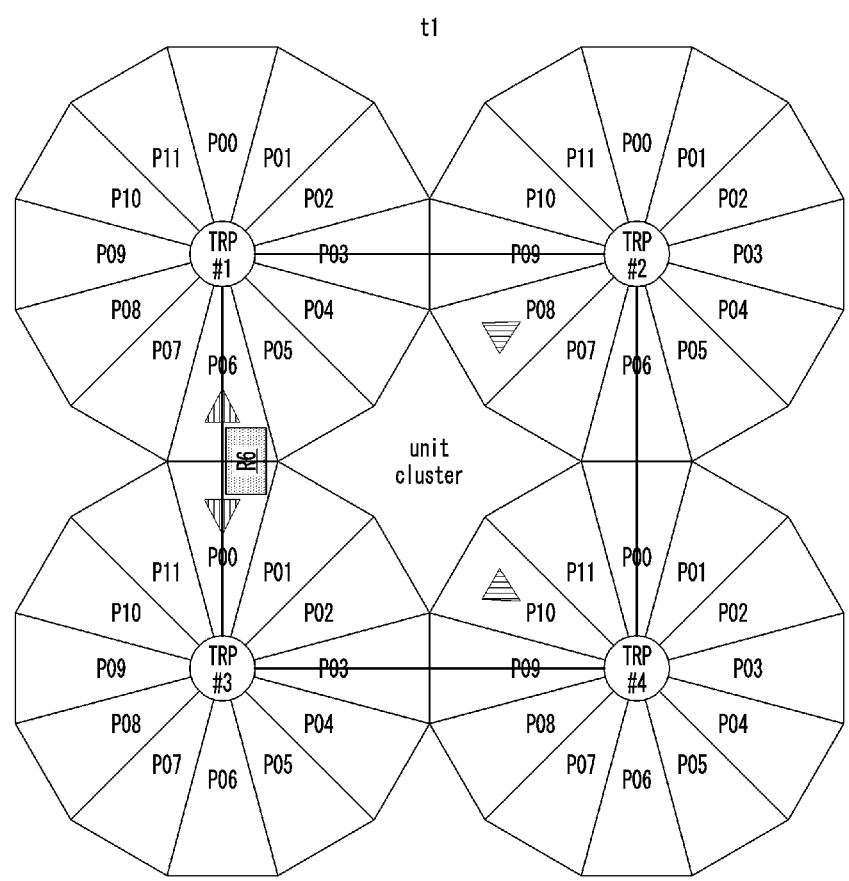
FIGS. 48A to 48D are conceptual diagrams illustrating a sixth exemplary embodiment of beams received by a terminal over time.

Referring to FIG. 48A, beams, which a terminal receives when located in a region R6 between TRP #1 and TRP #3 in the scheduling time t1, may include a beam transmitted by TRP #1 through a port P06 using the sub-frequency band B #3, a beam transmitted by TRP #2 through a port P08 using the sub-frequency band B #4, a beam transmitted by TRP #3 through a port P00 using the sub-frequency band B #3, and a beam transmitted by TRP #4 through a port P10 using the sub-frequency band B #4. As such, the number of beams that the terminal located in the region R6 receives may be 4.

Figure 48B:
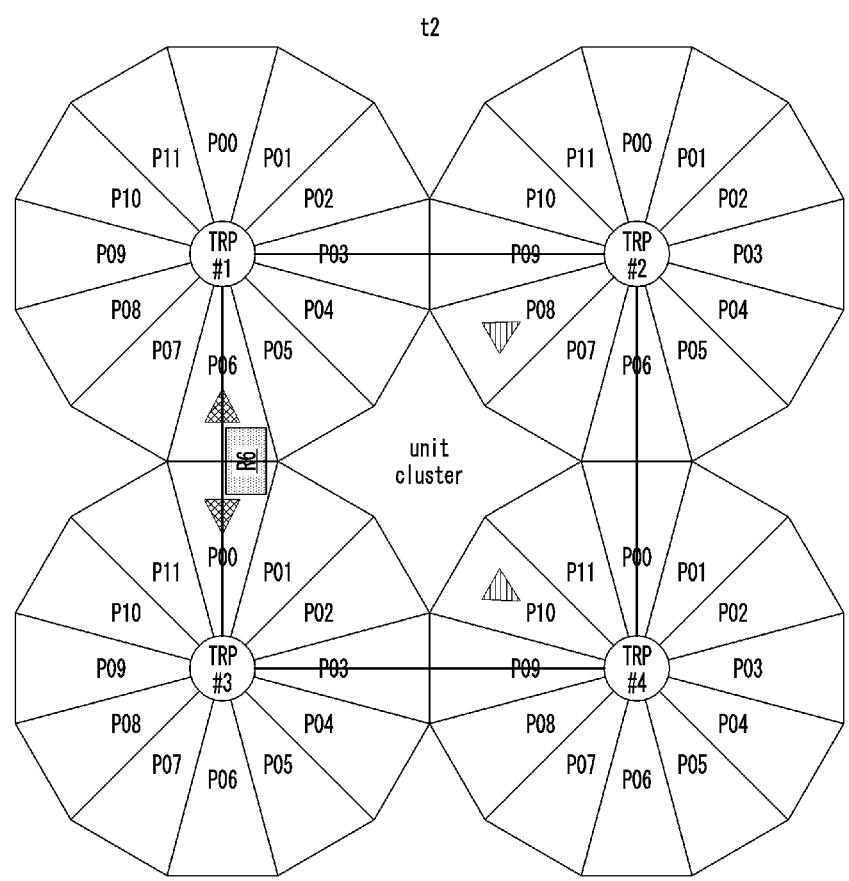

Referring to FIG. 48B, beams, which a terminal receives when located in the region R6 between TRP #1 and TRP #3 in the scheduling time t2, may include a beam transmitted by TRP #1 through a port P06 using the sub-frequency band B #2, a beam transmitted by TRP #2 through a port P08 using the sub-frequency band B #3, a beam transmitted by TRP #3 through a port P00 using the sub-frequency band B #2, and a beam transmitted by TRP #4 through a port P10 using the sub-frequency band B #3. As such, the number of beams that the terminal located in the region R6 receives may be 4.

Figure 48C:
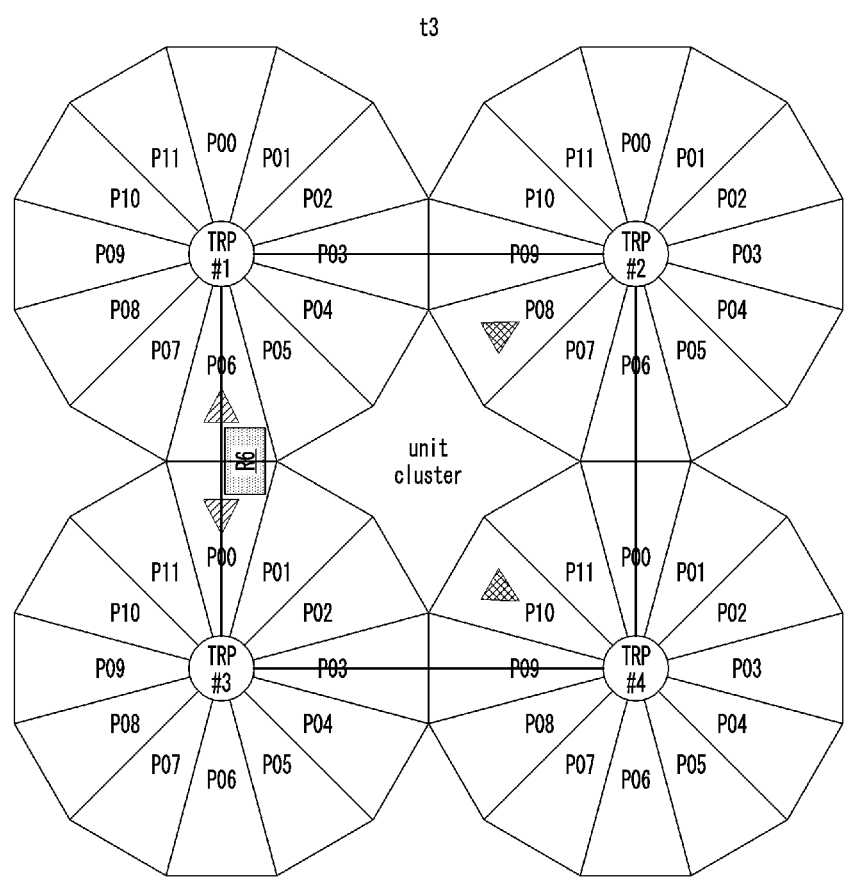

Referring to FIG. 48C, beams, which a terminal receives when located in the region R6 between TRP #1 and TRP #3 in the scheduling time t3, may include a beam transmitted by TRP #1 through a port P06 using the sub-frequency band B #1, a beam transmitted by TRP #2 through a port P08 using the sub-frequency band B #2, a beam transmitted by TRP #3 through a port P00 using the sub-frequency band B #1, and a beam transmitted by TRP #4 through a port P10 using the sub-frequency band B #2. As such, the number of beams that the terminal located in the region R6 receives may be 4.

Figure 48D:
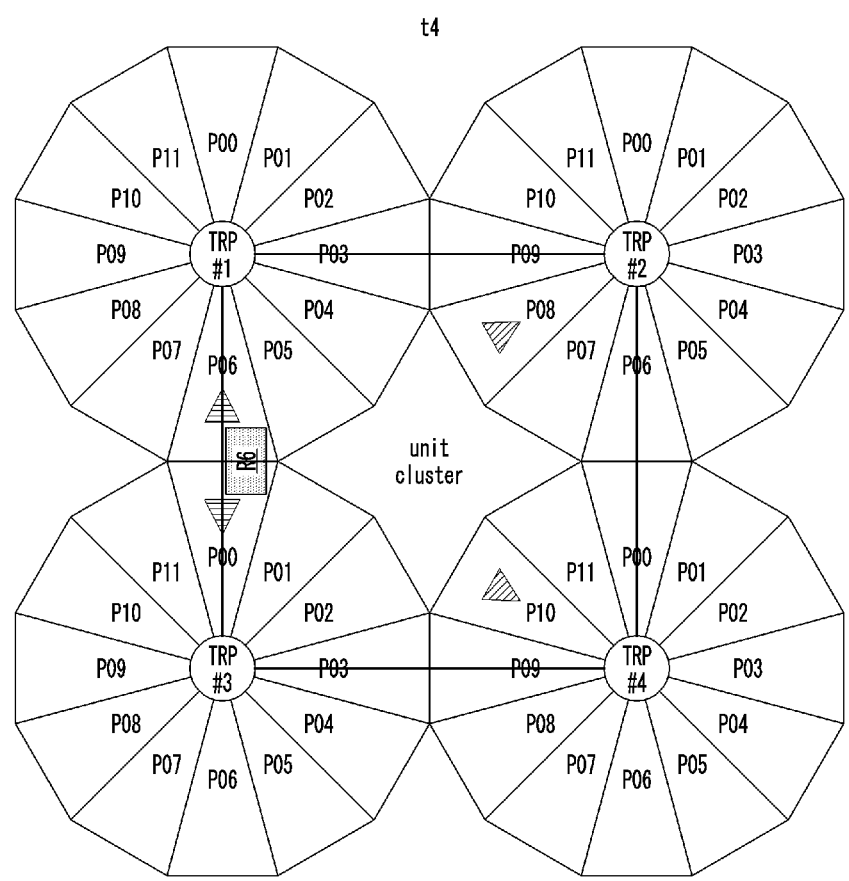

Referring to FIG. 48D, beams, which a terminal receives when located in the region R6 between TRP #1 and TRP #3 in the scheduling time t4, may include a beam transmitted by TRP #1 through a port P06 using the sub-frequency band B #4, a beam transmitted by TRP #2 through a port P08 using the sub-frequency band B #1, a beam transmitted by TRP #3 through a port P00 using the sub-frequency band B #4, and a beam transmitted by TRP #4 through a port P10 using the sub-frequency band B #1. As such, the number of beams that the terminal located in the region R6 receives may be 4.

Figure 49:
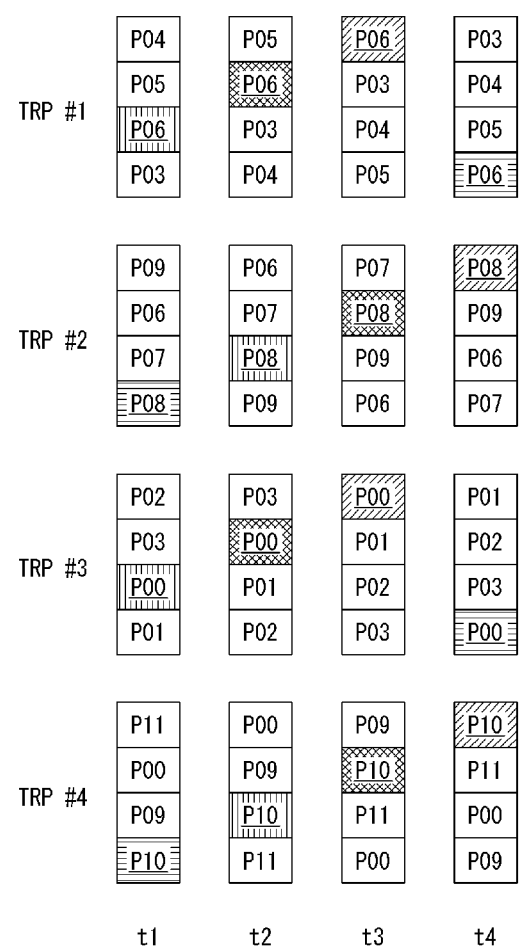
FIG. 49 is a conceptual diagram illustrating a scheduling map based on beams received by a terminal over time in FIGS. 48A to 48D.

FIG. 49 is a conceptual diagram illustrating a scheduling map based on beams received by a terminal over time in FIGS. 48A to 48D.

Referring to FIG. 49, according to a scheduling map based on beams received by the terminal over time, when the terminal is located in the region R6 between TRP #1 and TRP #3, the terminal may receive communication services from transceivers always through a total of 4 beams in each scheduling time. In this case, the total of 4 beams may be served in the unit cluster, including two beams in one sub-frequency band and two beams in another sub-frequency band in order in each scheduling time.

For example, the port P06 of TRP #1 and the port P00 of TRP #3 may provide a communication service to the terminal by transmitting and receiving beams in the sub-frequency band B #1 in the scheduling time t1. Also, the port P08 of TRP #2 and the port P10 of TRP #4 may provide a communication service to the terminal by transmitting and receiving beams in the sub-frequency band B #2.

FIGS. 50A to 50D are conceptual diagrams illustrating a seventh exemplary embodiment of beams received by a terminal over time.

Figure 50A:
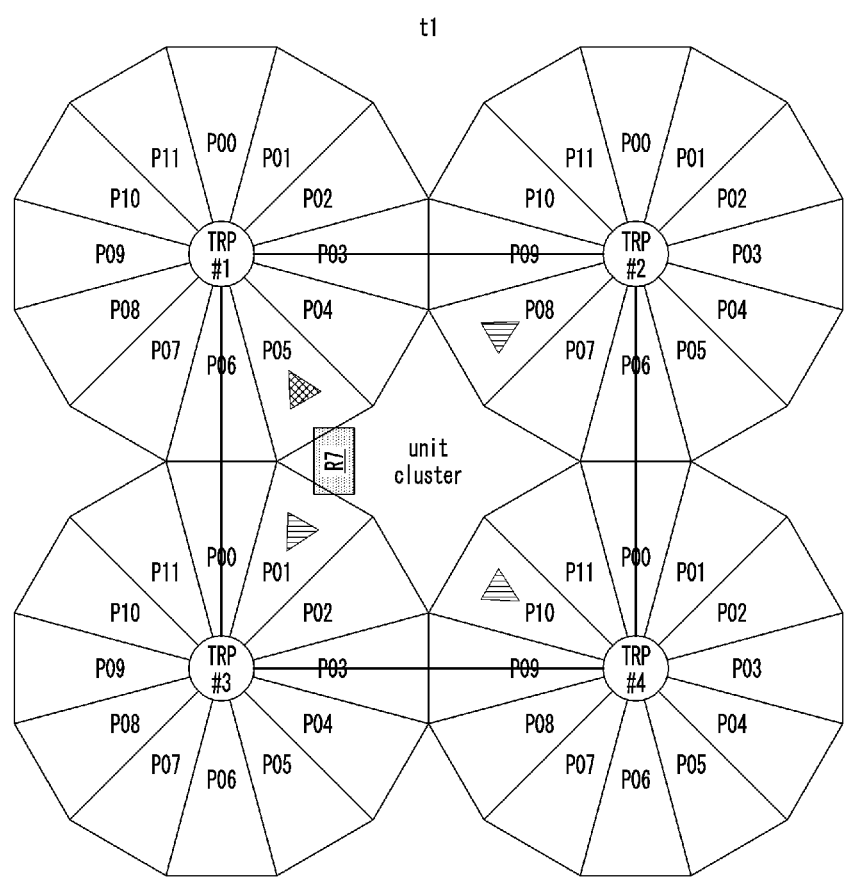
FIGS. 50A to 50D are conceptual diagrams illustrating a seventh exemplary embodiment of beams received by a terminal over time.

Referring to FIG. 50A, beams, which a terminal receives when located in a region R7 between TRP #1 and TRP #3 in the scheduling time t1, may include a beam transmitted by TRP #1 through a port P05 using the sub-frequency band B #2, a beam transmitted by TRP #2 through a port P08 using the sub-frequency band B #4, a beam transmitted by TRP #3 through a port P01 using the sub-frequency band B #4, and a beam transmitted by TRP #4 through a port P10 using the sub-frequency band B #4. As such, the number of beams that the terminal located in the region R7 receives may be 4.

Figure 50B:
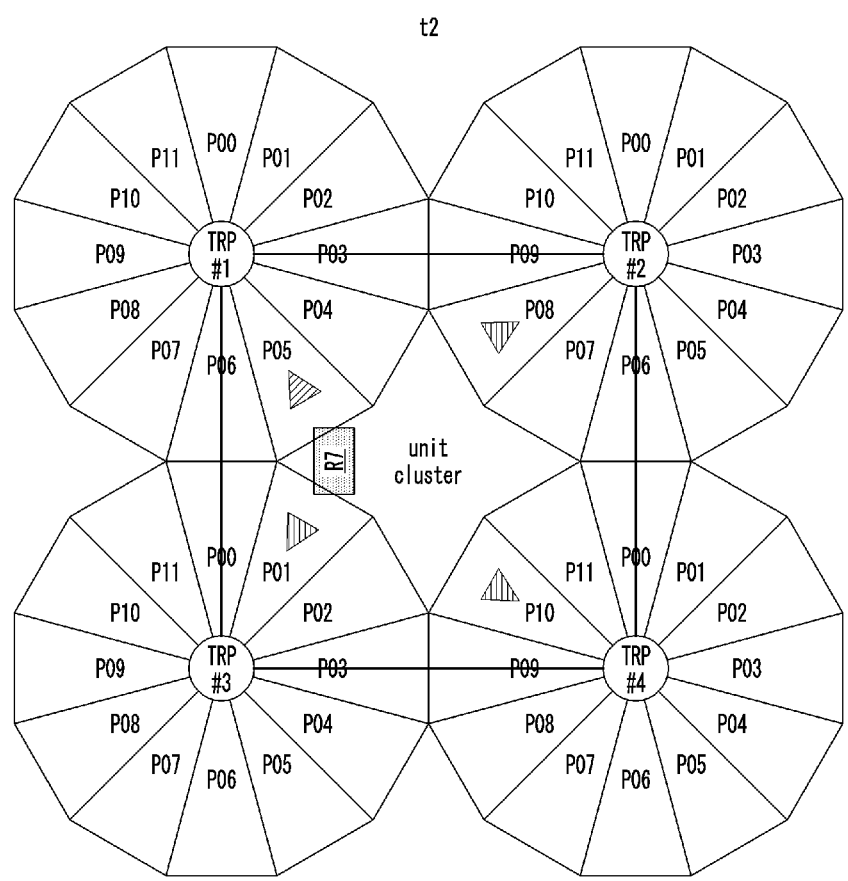

Referring to FIG. 50B, beams, which a terminal receives when located in the region R7 between TRP #1 and TRP #3 in the scheduling time t2, may include a beam transmitted by TRP #1 through a port P05 using the sub-frequency band B #1, a beam transmitted by TRP #2 through a port P08 using the sub-frequency band B #3, a beam transmitted by TRP #3 through a port P01 using the sub-frequency band B #1, and a beam transmitted by TRP #4 through a port P10 using the sub-frequency band B #3. As such, the number of beams that the terminal located in the region R7 receives may be 4.

Figure 50C:
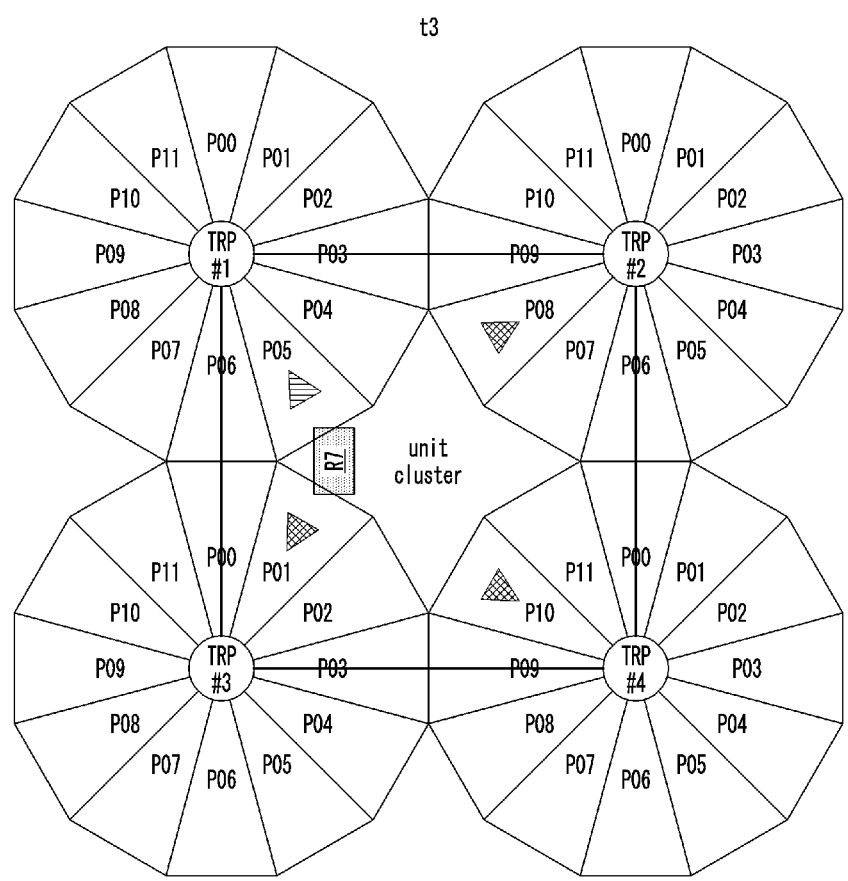

Referring to FIG. 50C, beams, which a terminal receives when located in the region R7 between TRP #1 and TRP #3 in the scheduling time t3, may include a beam transmitted by TRP #1 through a port P05 using the sub-frequency band B #4, a beam transmitted by TRP #2 through a port P08 using the sub-frequency band B #2, a beam transmitted by TRP #3 through a port P01 using the sub-frequency band B #2, and a beam transmitted by TRP #4 through a port P10 using the sub-frequency band B #2. As such, the number of beams that the terminal located in the region R7 receives may be 4.

Figure 50D:
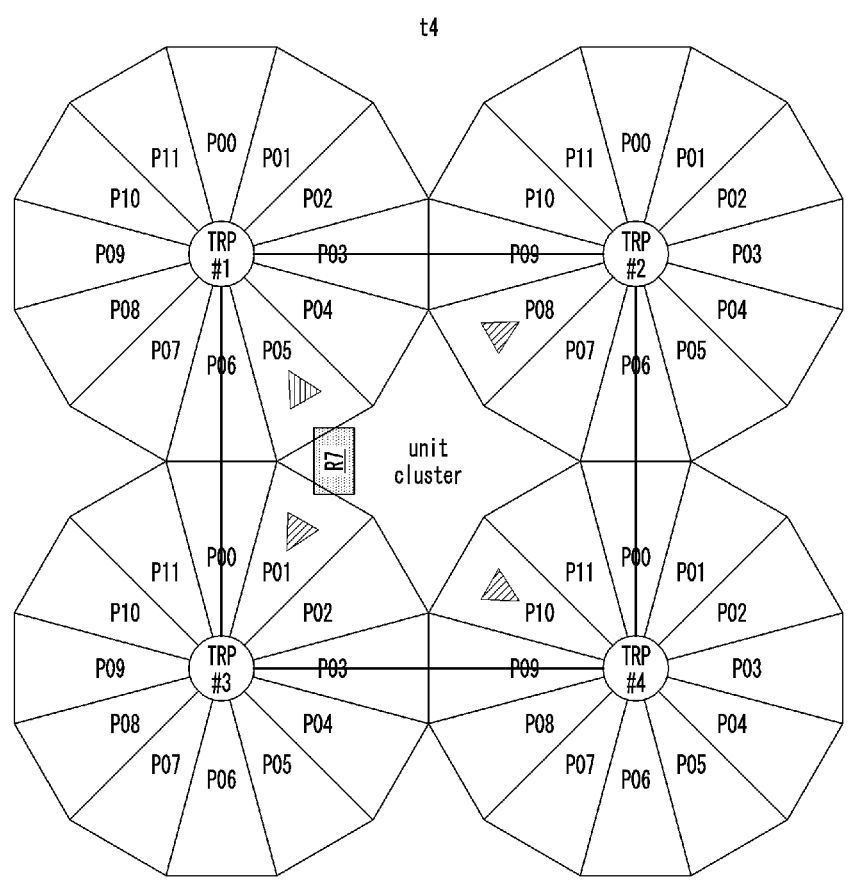

Referring to FIG. 50D, beams, which a terminal receives when located in the region R7 between TRP #1 and TRP #3 in the scheduling time t4, may include a beam transmitted by TRP #1 through a port P05 using the sub-frequency band B #3, a beam transmitted by TRP #2 through a port P08 using the sub-frequency band B #1, a beam transmitted by TRP #3 through a port P01 using the sub-frequency band B #1, and a beam transmitted by TRP #4 through a port P10 using the sub-frequency band B #1. As such, the number of beams that the terminal located in the region R7 receives may be 4.

Figure 51:
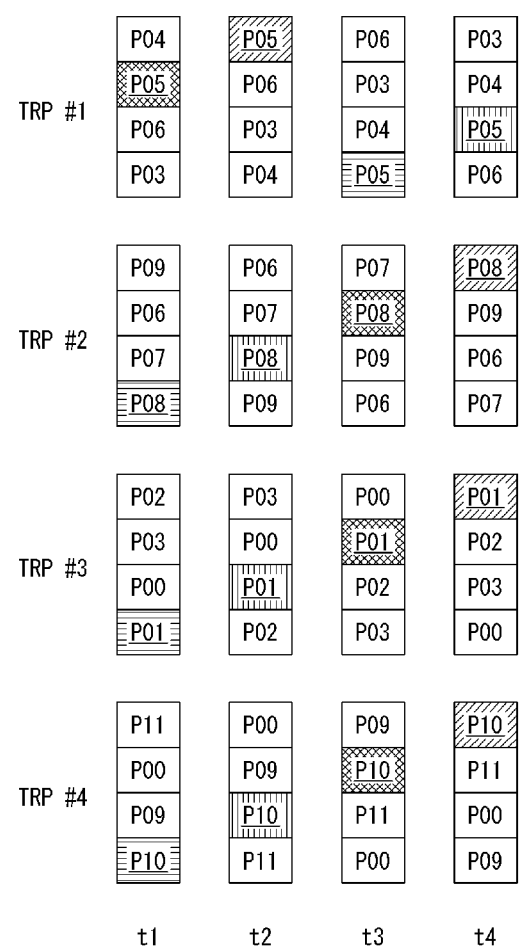
FIG. 51 is a conceptual diagram illustrating a scheduling map based on beams received by a terminal over time in FIGS. 50A to 50D.

FIG. 51 is a conceptual diagram illustrating a scheduling map based on beams received by a terminal over time in FIGS. 50A to 50D.

Referring to FIG. 51, according to a scheduling map based on beams received by the terminal over time, when the terminal is located in the region R7 between TRP #1 and TRP #3, the terminal may receive communication services from transceivers always through a total of 4 beams in each scheduling time. In this case, the total of 4 beams may be served in the unit cluster, including three beams in one sub-frequency band and one beam in another sub-frequency band in order in each scheduling time.

For example, the port P08 of TRP #2, port 01 of TRP #3, and port P10 of TRP #4 may provide communication services to the terminal by transmitting and receiving beams in the sub-frequency band B #4 in the scheduling time t1. Also, the port P05 of TRP #1 may provide communication services to the terminal by transmitting and receiving beams in the sub-frequency band B #2.

FIGS. 52A to 52D are conceptual diagrams illustrating an eighth exemplary embodiment of beams received by a terminal over time.

Figure 52A:
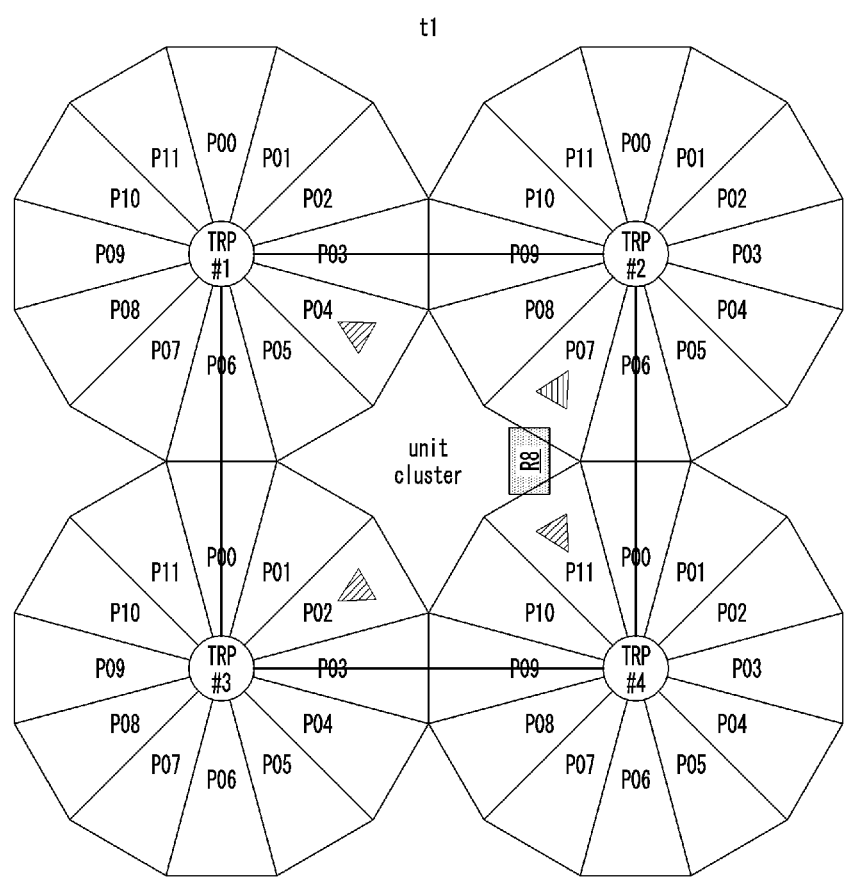
FIGS. 52A to 52D are conceptual diagrams illustrating an eighth exemplary embodiment of beams received by a terminal over time.

Referring to FIG. 52A, beams, which a terminal receives when located in a region R8 near to the center of the cluster and between TRP #1 and TRP #3 in the scheduling time t1, may include a beam transmitted by TRP #1 through a port P04 using the sub-frequency band B #1, a beam transmitted by TRP #2 through a port P07 using the sub-frequency band B #3, a beam transmitted by TRP #3 through a port P02 using the sub-frequency band B #1, and a beam transmitted by TRP #4 through a port P11 using the sub-frequency band B #1. As such, the number of beams that the terminal located in the region R8 receives may be 4.

Figure 52B:
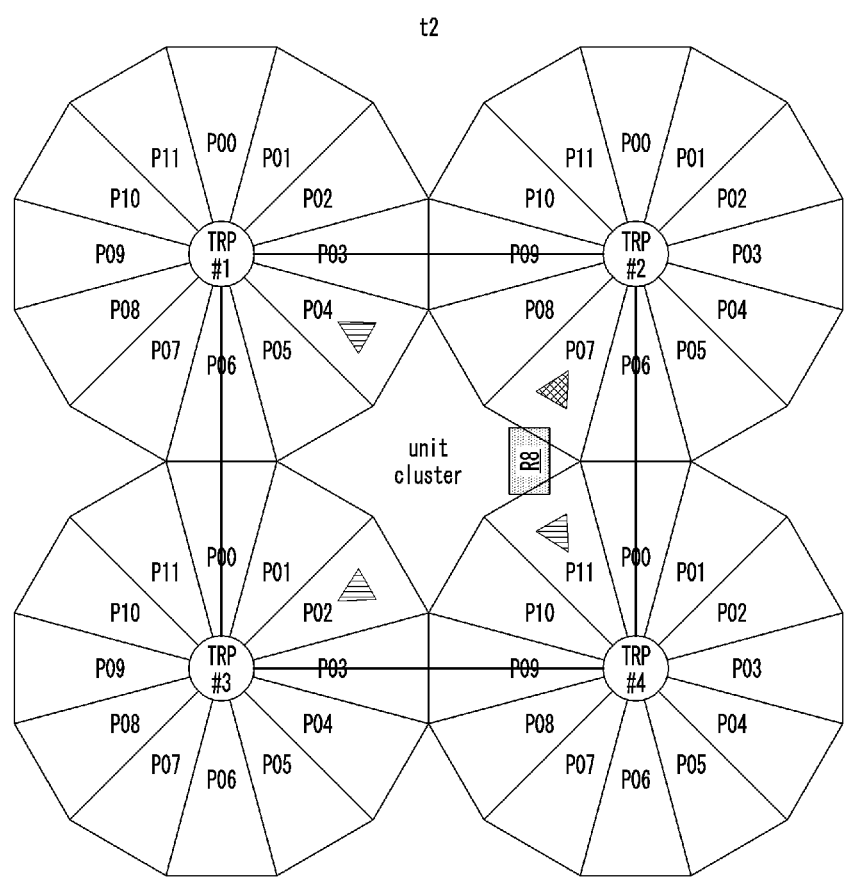

Referring to FIG. 52B, beams, which a terminal receives when located in the region R8 near to the center of the cluster and between TRP #1 and TRP #3 in the scheduling time t2, may include a beam transmitted by TRP #1 through a port P04 using the sub-frequency band B #4, a beam transmitted by TRP #2 through a port P07 using the sub-frequency band B #2, a beam transmitted by TRP #3 through a port P02 using the sub-frequency band B #4, and a beam transmitted by TRP #4 through a port P11 using the sub-frequency band B #4. As such, the number of beams that the terminal located in the region R8 receives may be 4.

Figure 52C:
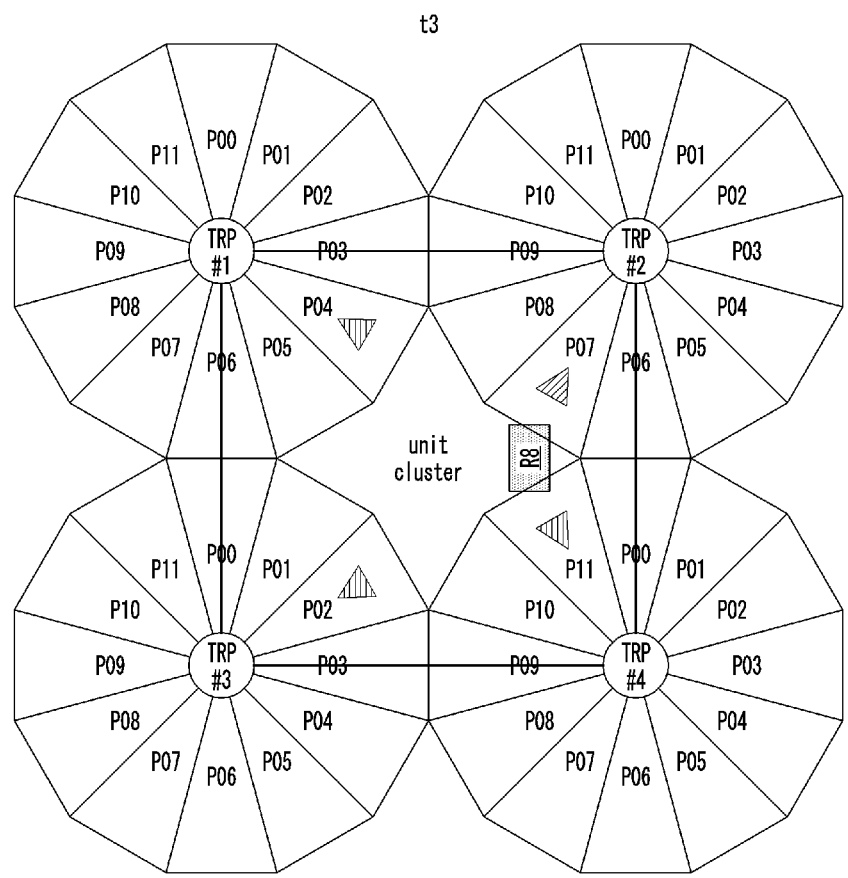

Referring to FIG. 52C, beams, which a terminal receives when located in the region R8 near to the center of the cluster and between TRP #1 and TRP #3 in the scheduling time t3, may include a beam transmitted by TRP #1 through a port P04 using the sub-frequency band B #3, a beam transmitted by TRP #2 through a port P07 using the sub-frequency band B #1, a beam transmitted by TRP #3 through a port P02 using the sub-frequency band B #3, and a beam transmitted by TRP #4 through a port P11 using the sub-frequency band B #3. As such, the number of beams that the terminal located in the region R8 receives may be 4.

Figure 52D:
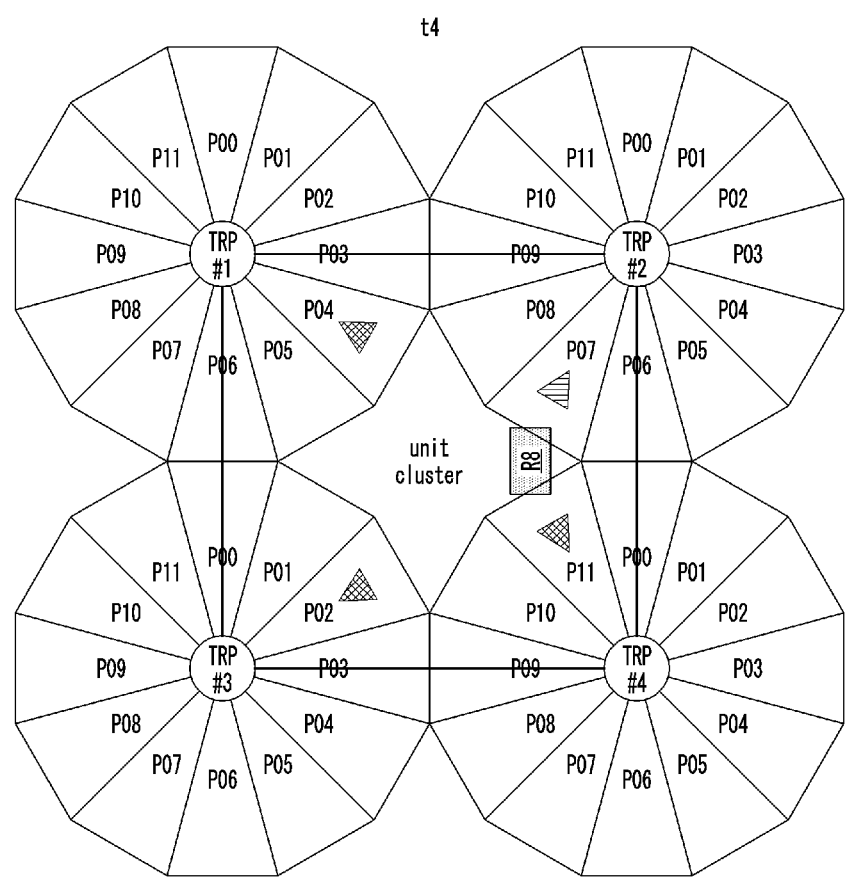

Referring to FIG. 52D, beams, which a terminal receives when located in the region R8 near to the center of the cluster and between TRP #1 and TRP #3 in the scheduling time t4, may include a beam transmitted by TRP #1 through a port P04 using the sub-frequency band B #2, a beam transmitted by TRP #2 through a port P07 using the sub-frequency band B #4, a beam transmitted by TRP #3 through a port P02 using the sub-frequency band B #2, and a beam transmitted by TRP #4 through a port P11 using the sub-frequency band B #2. As such, the number of beams that the terminal located in the region R8 receives may be 4.

Figure 53:
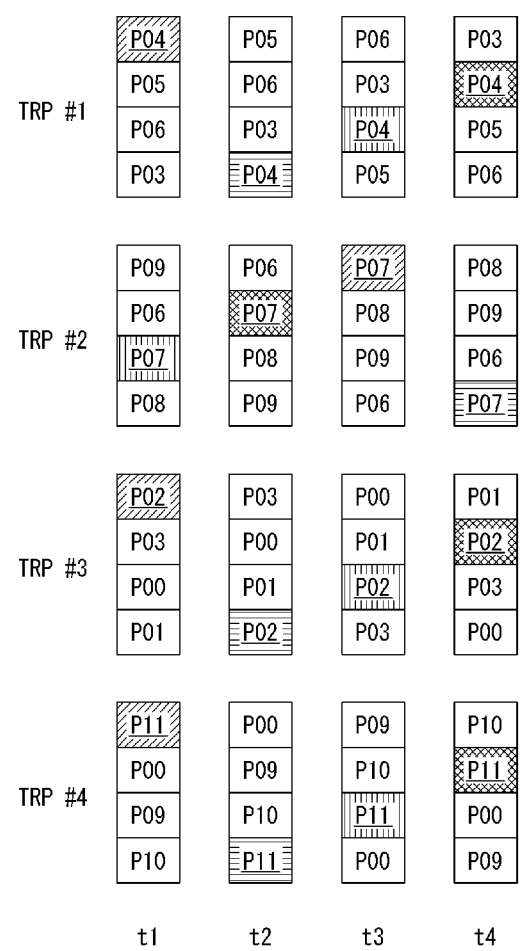
FIG. 53 is a conceptual diagram illustrating a scheduling map based on beams received by a terminal over time in FIGS. 52A to 52D.

FIG. 53 is a conceptual diagram illustrating a scheduling map based on beams received by a terminal over time in FIGS. 52A to 52D.

Referring to FIG. 53, according to a scheduling map based on beams received by the terminal over time, when the terminal located in the region R8 near the center of the cluster and between TRP #1 and TRP #3, the terminal may receive communication services from transceivers always through a total of 4 beams in each scheduling time. In this case, the total of 4 beams may be served in the unit cluster, including three beams in one sub-frequency band and one beam in another sub-frequency band in order in each scheduling time.

For example, the port P04 of TRP #1, port 02 of TRP #3, and port P11 of TRP #4 may provide communication services to the terminal by transmitting and receiving beams in the sub-frequency band B #1 in the scheduling time t1. Also, the port P07 of TRP #2 may provide communication services to the terminal by transmitting and receiving beams in the sub-frequency band B #3.

FIGS. 54A to 54D are conceptual diagrams illustrating a ninth exemplary embodiment of beams received by a terminal over time.

Figure 54A:
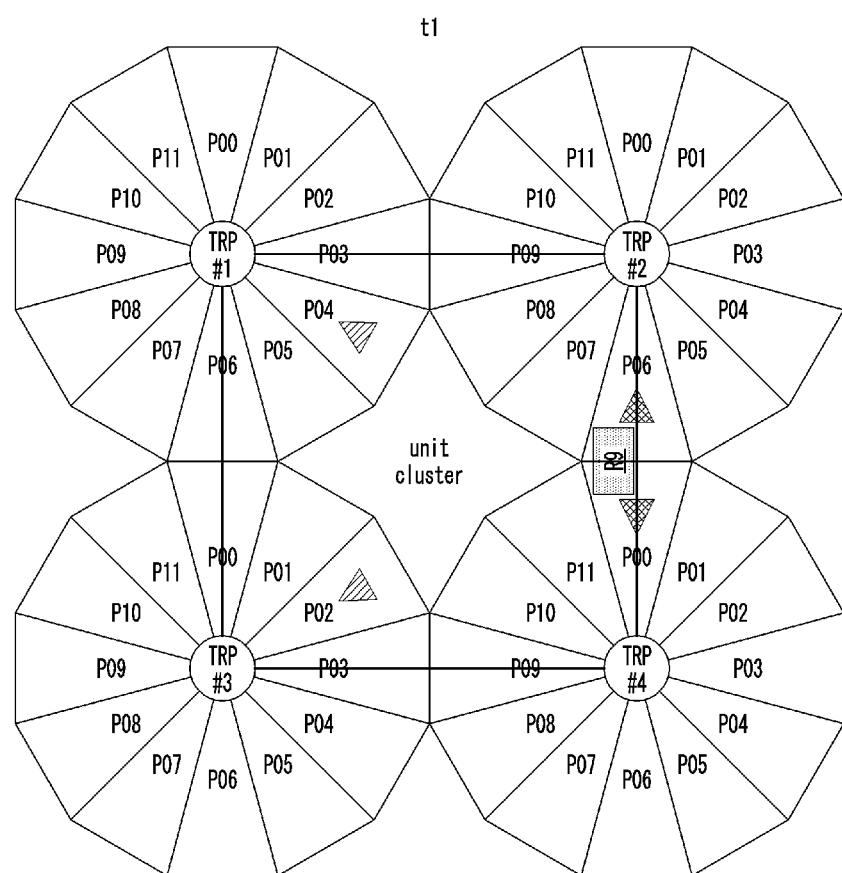
FIGS. 54A to 54D are conceptual diagrams illustrating a ninth exemplary embodiment of beams received by a terminal over time.

Referring to FIG. 54A, beams, which a terminal receives when located in a region R9 between TRP #2 and TRP #4 in the scheduling time t1, may include a beam transmitted by TRP #1 through a port P04 using the sub-frequency band B #1, a beam transmitted by TRP #2 through a port P06 using the sub-frequency band B #2, a beam transmitted by TRP #3 through a port P02 using the sub-frequency band B #1, and a beam transmitted by TRP #4 through a port P00 using the sub-frequency band B #2. As such, the number of beams that the terminal located in the region R9 receives may be 4.

Figure 54B:
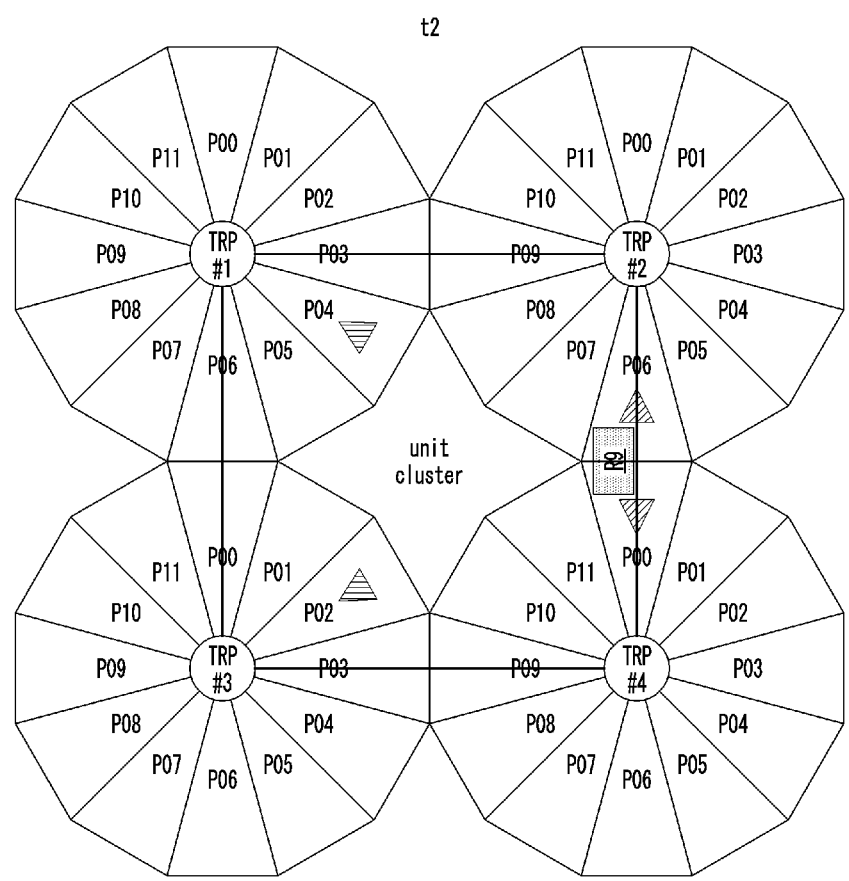

Referring to FIG. 54B, beams, which a terminal receives when located in the region R9 between TRP #2 and TRP #4 in the scheduling time t2, may include a beam transmitted by TRP #1 through a port P04 using the sub-frequency band B #4, a beam transmitted by TRP #2 through a port P06 using the sub-frequency band B #1, a beam transmitted by TRP #3 through a port P02 using the sub-frequency band B #4, and a beam transmitted by TRP #4 through a port P00 using the sub-frequency band B #1. As such, the number of beams that the terminal located in the region R9 receives may be 4.

Figure 54C:
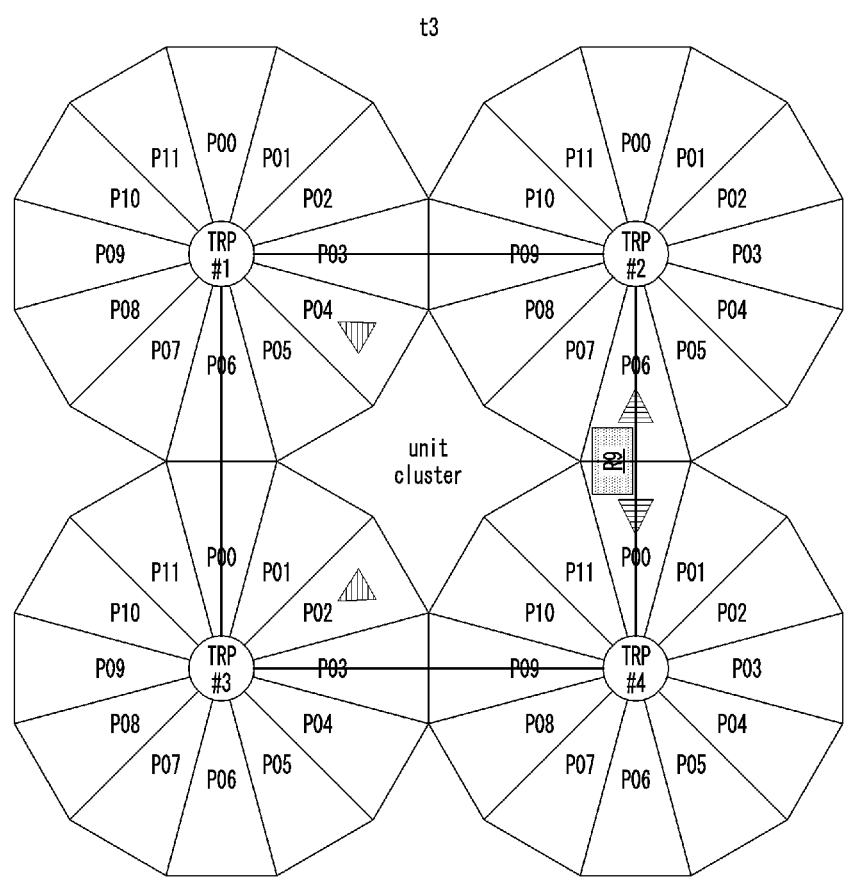

Referring to FIG. 54C, beams, which a terminal receives when located in the region R9 between TRP #2 and TRP #4 in the scheduling time t3, may include a beam transmitted by TRP #1 through a port P04 using the sub-frequency band B #3, a beam transmitted by TRP #2 through a port P06 using the sub-frequency band B #4, a beam transmitted by TRP #3 through a port P02 using the sub-frequency band B #3, and a beam transmitted by TRP #4 through a port P00 using the sub-frequency band B #4. As such, the number of beams that the terminal located in the region R9 receives may be 4.

Figure 54D:
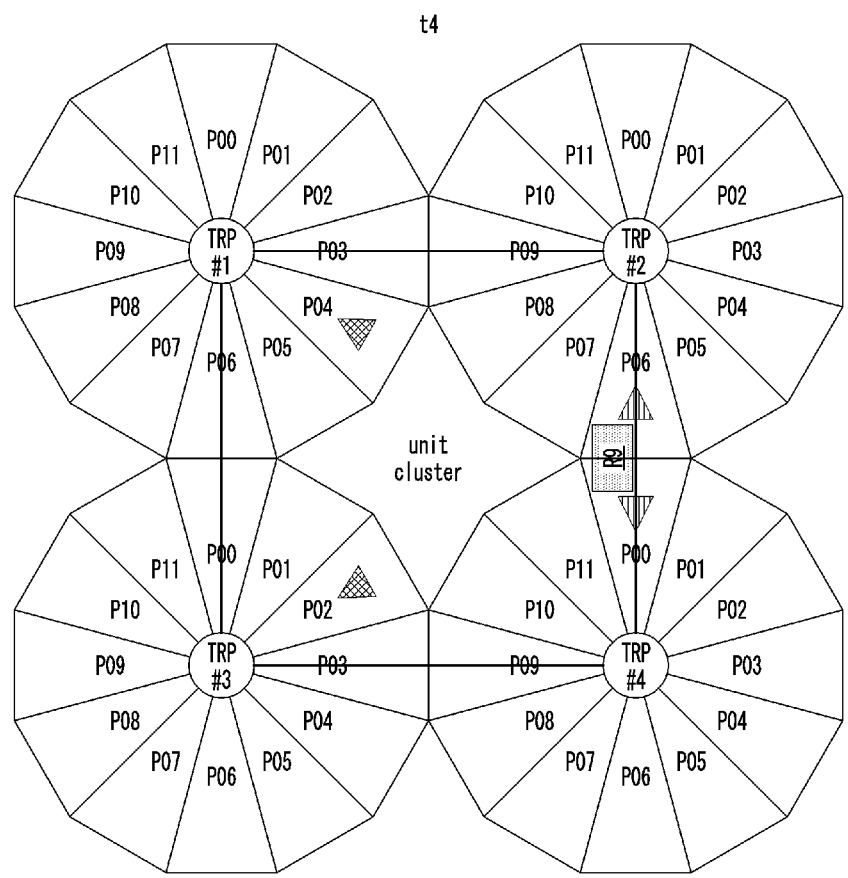

Referring to FIG. 54D, beams, which a terminal receives when located in the region R9 between TRP #2 and TRP #4 in the scheduling time t4, may include a beam transmitted by TRP #1 through a port P04 using the sub-frequency band B #2, a beam transmitted by TRP #2 through a port P06 using the sub-frequency band B #3, a beam transmitted by TRP #3 through a port P02 using the sub-frequency band B #2, and a beam transmitted by TRP #4 through a port P00 using the sub-frequency band B #3. As such, the number of beams that the terminal located in the region R9 receives may be 4.

Figure 55:
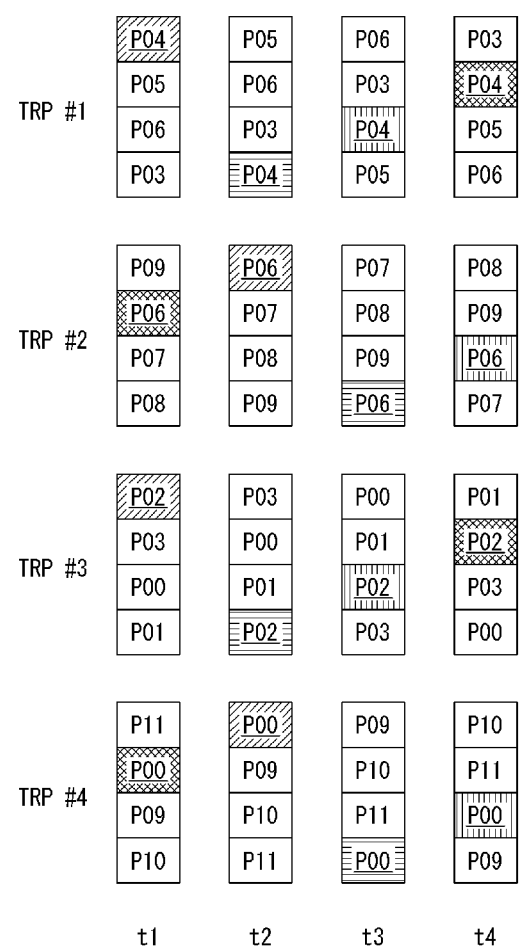
FIG. 55 is a conceptual diagram illustrating a scheduling map based on beams received by a terminal over time in FIGS. 54A to 54D.
Figure 56A:
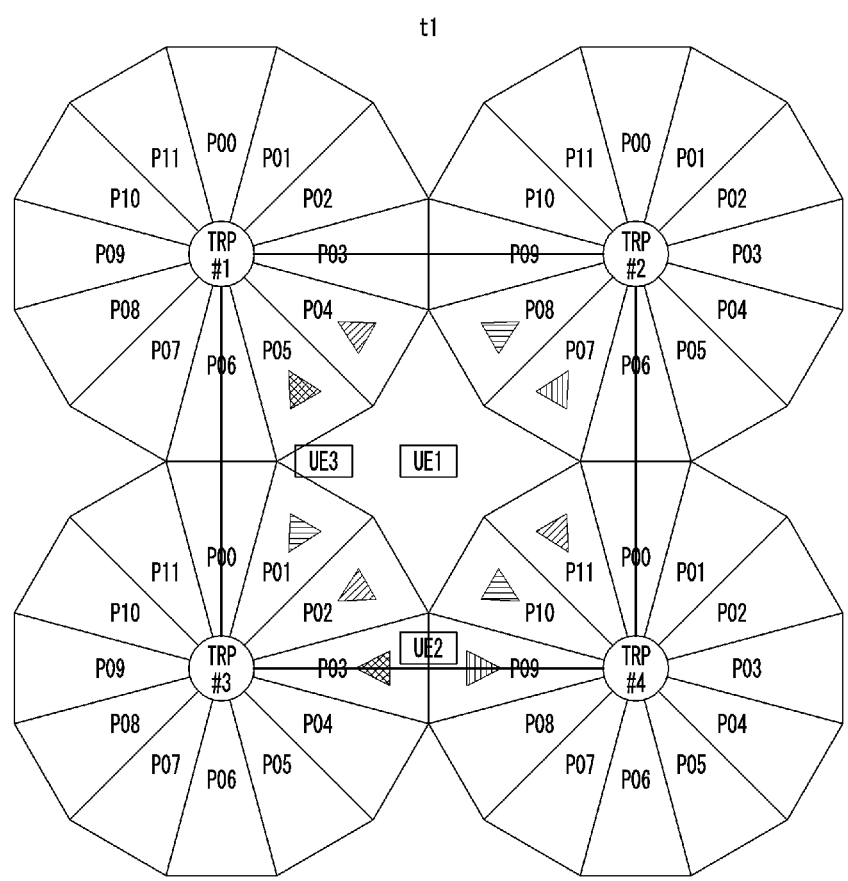
FIGS. 56A to 56D are conceptual diagrams illustrating a first exemplary embodiment of an intelligent scheduling procedure when a plurality of terminals are located in a unit cluster.
Figure 56B:
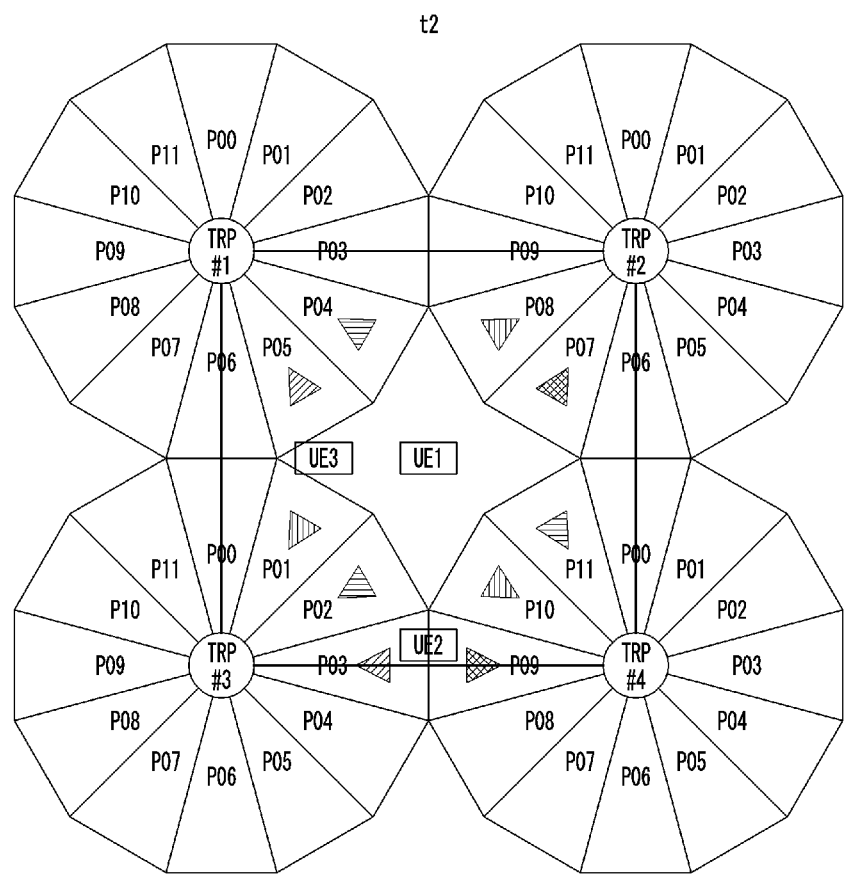
Figure 56C:
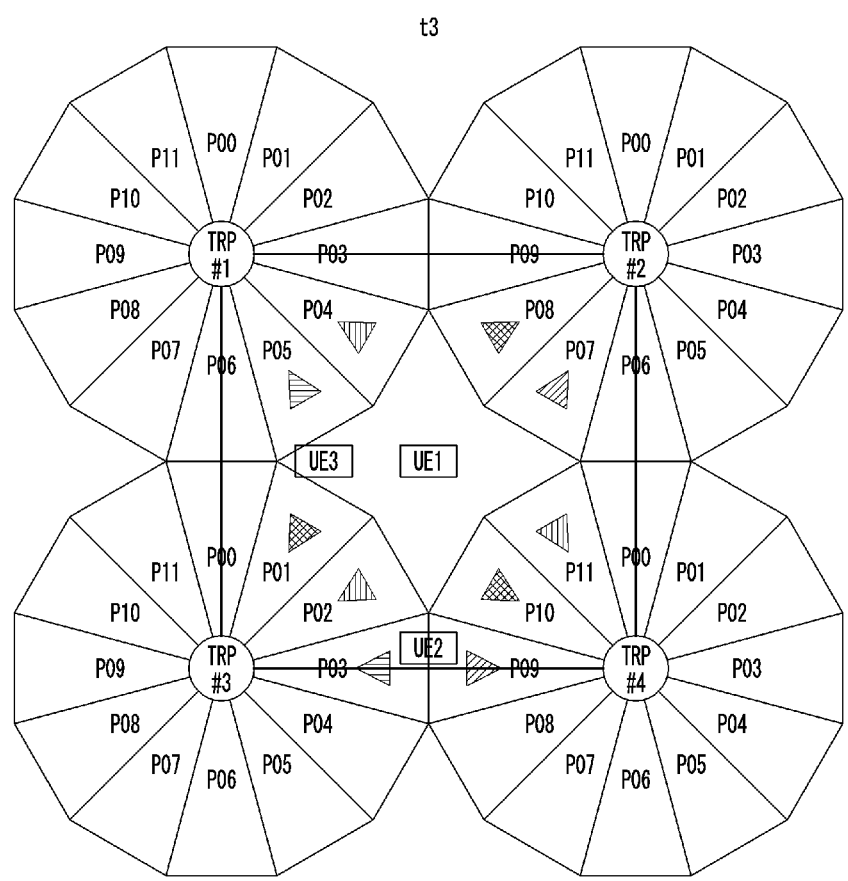
Figure 56D:
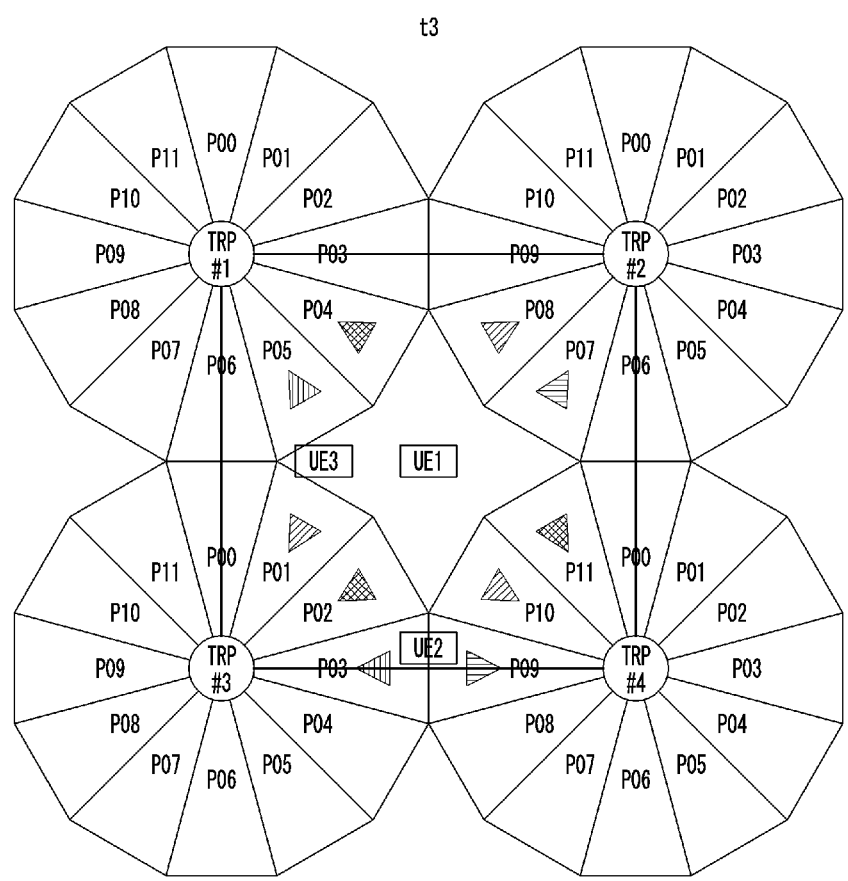

FIG. 55 is a conceptual diagram illustrating a scheduling map based on beams received by a terminal over time in FIGS. 54A to 54D.

Referring to FIG. 55, according to a scheduling map based on beams received by the terminal over time, when the terminal is located in the region R9 between TRP #2 and TRP #4, the terminal may receive communication services from transceivers always through a total of 4 beams in each scheduling time. In this case, the total of 4 beams may be served in the unit cluster, including two beams in one sub-frequency band and two beams in another sub-frequency band in order in each scheduling time.

For example, the port P04 of TRP #1 and the port 02 of TRP #3 may provide a communication service to the terminal by transmitting and receiving beams in the sub-frequency band B #3 in the scheduling time t1. Also, the port P06 of TRP #2 and the port 00 of TRP #4 may provide a communication service to the terminal by transmitting and receiving beams in the sub-frequency band B #4.

Referring again to FIG. 26, the central control apparatus may perform intelligent scheduling for the unit cluster (S2650).

FIGS. 56A to 56D are conceptual diagrams illustrating a first exemplary embodiment of an intelligent scheduling procedure when a plurality of terminals are located in a unit cluster.

Referring to FIGS. 56A to 56D, a first terminal UE1, a second terminal UE2, and a third terminal UE3 may be located in the unit cluster. In this case, the first terminal may be located in a region R1 near the center of the unit cluster, the second terminal may be located in a region R5 between TRP #3 and TRP #4, and the third terminal may be located in a region R7 close to the center and between TRP #1 and TRP #3.

The central control apparatus may perform scheduling for the first to third terminals based on a scheduling map generated for each region.

Figure 57:
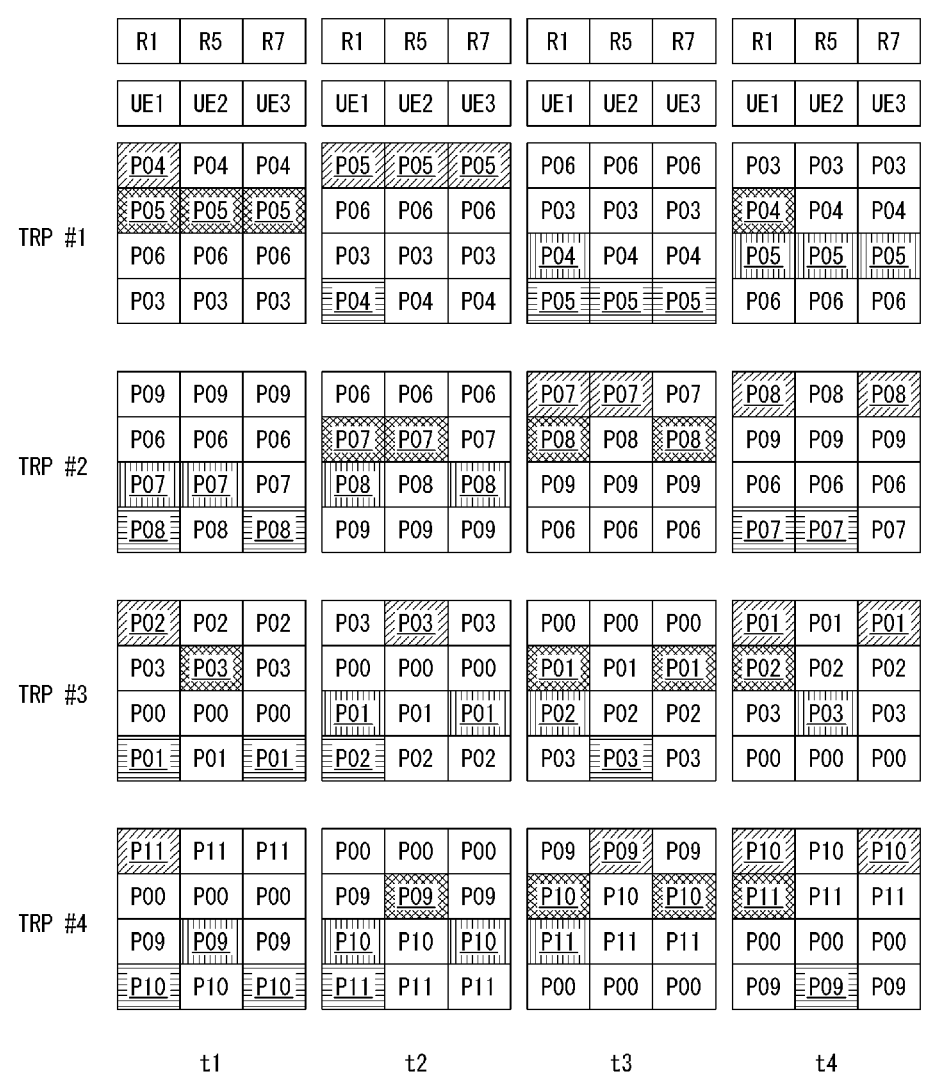

FIG. 57 is a conceptual diagram illustrating a first exemplary embodiment of a procedure of scheduling a plurality of terminals using a scheduling map.

Referring to FIG. 57, the central control apparatus may perform intelligent scheduling for the first terminal by using a scheduling map of the region R1. Also, the central control apparatus may perform intelligent scheduling for the second terminal by using a scheduling map of the region R5. Also, the central control apparatus may perform intelligent scheduling for the third terminal by using a scheduling map of the region R7.

Figure 58:
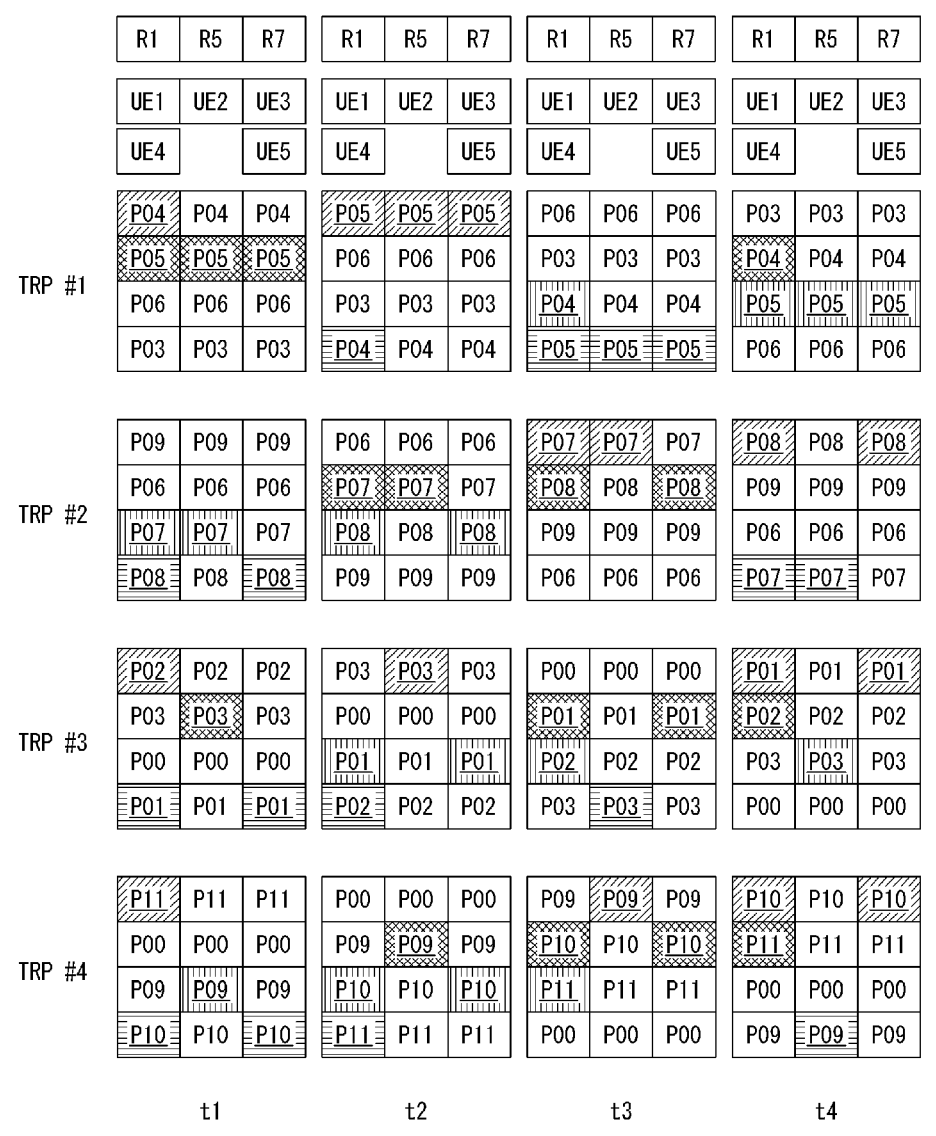

FIG. 58 is a conceptual diagram illustrating a second exemplary embodiment of a procedure of scheduling a plurality of terminals using a scheduling map.

Referring to FIG. 58, first to fifth terminals UE1 to UE5 may be located in the unit cluster. In this case, the first terminal and the fourth terminal may be located in a region R1 near the center of the unit cluster, the second terminal may be located in a region R5 between TRP #3 and TRP #4, and the third terminal and the fifth terminal may be in a region R7 near the center of the unit cluster and between TRP #1 and TRP #3. As such, two terminals may be located in the center of the unit cluster, and two terminals may be located in the region R7 located between TRP #1 and TRP #3 and near to the center of the unit cluster.

The central control apparatus may perform scheduling for the first to fifth terminals based on scheduling maps generated for the respective regions. The central control apparatus may perform intelligent scheduling for the first terminal and the fourth terminal by using the scheduling map of the region R1. Also, the central control apparatus may perform intelligent scheduling for the second terminal by using the scheduling map of the region R5. Also, the central control apparatus may perform intelligent scheduling for the third terminal and the fifth terminal by using the scheduling map of the region R7.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a central control apparatus in a communication system, the operation method comprising:
    configuring a unit cluster using a first transceiver and a second transceiver, the first transceiver and the second transceiver being connected to the central control apparatus;
    performing first scheduling so that at least one port among N ports of the first transceiver and M ports of the second transceiver provides communication services to a service coverage of the unit cluster for each scheduling period in a beam sweeping scheme by using a first sub-frequency band;
    generating first scheduling information including information on identifiers of transceivers and indexes of ports proving the communication services for each scheduling period according to the first scheduling, and transmitting the first scheduling information to the terminal by using the first transceiver or the second transceiver; and
    controlling the first transceiver and the second transceiver to communicate with the terminal according to the first scheduling information.

2. The operation method according to claim 1, further comprising:
    instructing a measurement report of received signal strengths;
    receiving, from the first transceiver, information on received signal strength(s) of signal(s) received by the first transceiver from the second transceiver, information on reception port(s) of the first transceiver, and information on transmission port(s) of the second transceiver;
    deriving information on opposing ports of the first transceiver and the second transceiver based on the information on the received signal strength(s), the information of the reception port(s) of the first transceiver, and the information of the transmission port(s) of the second transceiver;
    allocating port indexes to the N ports and the M ports based on the information on the opposing ports of the first transceiver and the second transceiver.

3. The operation method according to claim 2, further comprising:
    obtaining a maximum received signal strength from the information on the received signal strength(s); and estimating a distance between the first transceiver and the second transceiver based on the obtained maximum received signal strength.

4. The operation method according to claim 1, further comprising:
performing second scheduling so that at least two ports, among the N ports of the first transceiver and the M ports of the second transceiver, provide communication services to the service coverage of the unit cluster, for each scheduling period, in a beam sweeping scheme using K sub-frequency bands, K being a natural number not less than 2;
generating, according to the second scheduling, second scheduling information on indexes of the at least two ports and identifiers of transceivers to which the at least two ports belong, which provide the communication services for each scheduling period, and transmitting the second scheduling information to the terminal through the first transceiver or the second transceiver; and
controlling the first transceiver and the second transceiver to perform communications using multiple beams in a radio link established with the terminal according to the second scheduling information.

5. The operation method according to claim 4, further comprising:
generating a per-region scheduling map for each scheduling period;
determining a position of the terminal in the service coverage;
performing third scheduling according to the identified position of the terminal based on the per-region scheduling map;
generating, according to the third scheduling, third scheduling information including indexes of per-region port(s) and per-region transceiver(s), which provide communication services to the position of the terminal for each scheduling period, and transmitting the third scheduling information to the terminal through the first transceiver or the second transceiver; and
controlling the first transceiver and the second transceiver to perform communications using per-region multiple beams in a radio link established with the terminal according to the third scheduling information.

6. The operation method according to claim 5, wherein the generating of the per-region scheduling map comprises:
determining beam patterns formed in the service coverage of the unit cluster for each scheduling period; and
generating the per-region scheduling map for each scheduling period based on the determined beam patterns.

7. The operation method according to claim 6, wherein the determining of the beam patterns comprises:
determining the beam patterns in a same sub-frequency band for consecutive scheduling periods, and/or determining the beam patterns in consecutive sub-frequency bands for one scheduling time.

8. The operation method according to claim 5, wherein the determining of the position comprises:
controlling each of the first transceiver and the second transceiver to transmit at least one subframe including transceiver identifier(s) (ID(s)) and port index(es) to the terminal;
receiving, from the terminal, a first transceiver ID and a first port index for a first subframe successfully decoded by the terminal among the at least one subframe; and identifying the position of the terminal based on the first transceiver ID and the first port index.

9. The operation method according to claim 8, wherein each of the at least one subframe further includes flag bit(s) indicating type information, and is transmitted on a physical downlink shared channel(s) (PDSCH(s)) at an interval of L subframes, L being a natural number.

10. A central control apparatus comprising:
a processor;
a memory electronically communicating with the processor; and
instructions stored in the memory,
wherein when executed by the processor, the instructions cause the central control apparatus to:
configure a unit cluster using a first transceiver and a second transceiver, the first transceiver and the second transceiver being connected to the central control apparatus;
perform first scheduling so that at least one port among N ports of the first transceiver and M ports of the second transceiver provides communication services to a service coverage of the unit cluster for each scheduling period in a beam sweeping scheme by using a first sub-frequency band;
generate first scheduling information including information on identifiers of transceivers and indexes of ports proving the communication services for each scheduling period according to the first scheduling, and transmit the first scheduling information to the terminal by using the first transceiver or the second transceiver; and
control the first transceiver and the second transceiver to communicate with the terminal according to the first scheduling information.

11. The central control apparatus according to claim 10, wherein the instructions further cause the central control apparatus to:
instruct a measurement report of received signal strengths;
receive, from the first transceiver, information on received signal strength(s) of signal(s) received by the first transceiver from the second transceiver, information on reception port(s) of the first transceiver, and information on transmission port(s) of the second transceiver;
derive information on opposing ports of the first transceiver and the second transceiver based on the information on the received signal strength(s), the information of the reception port(s) of the first transceiver, and the information of the transmission port(s) of the second transceiver; and
allocate port indexes to the N ports and the M ports based on the information on the opposing ports of the first transceiver and the second transceiver.

12. The central control apparatus according to claim 10, wherein the instructions further cause the central control apparatus to:
perform second scheduling so that at least two ports, among the N ports of the first transceiver and the M ports of the second transceiver, provide communication services to the service coverage of the unit cluster, for each scheduling period, in a beam sweeping scheme using K sub-frequency bands, K being a natural number not less than 2;
generate, according to the second scheduling, second scheduling information on indexes of the at least two ports and identifiers of transceivers to which the at least two ports belong, which provide the communication services for each scheduling period, and transmit the second scheduling information to the terminal through the first transceiver or the second transceiver; and control the first transceiver and the second transceiver to perform communications using multiple beams in a radio link established with the terminal according to the second scheduling information.

13. The central control apparatus according to claim 12, wherein the instructions further cause the central control apparatus to:

generate a per-region scheduling map for each scheduling period;

determine a position of the terminal in the service coverage;

perform third scheduling according to the identified position of the terminal based on the per-region scheduling map;

generate, according to the third scheduling, third scheduling information including indexes of per-region port(s) and per-region transceiver(s), which provide communication services to the position of the terminal for each scheduling period, and transmit the third scheduling information to the terminal through the first transceiver or the second transceiver; and control the first transceiver and the second transceiver to perform communications using per-region multiple beams in a radio link established with the terminal according to the third scheduling information.

14. The central control apparatus according to claim 13, wherein in the generating of the per-region scheduling map, the instructions further cause the central control apparatus to:

determine beam patterns formed in the service coverage of the unit cluster for each scheduling period; and generate the per-region scheduling map for each scheduling period based on the determined beam patterns.

15. The central control apparatus according to claim 13, wherein in the determining of the beam patterns, the instructions further cause the central control apparatus to:

control each of the first transceiver and the second transceiver to transmit at least one subframe including transceiver identifier(s) (ID(s)) and port index(es) to the terminal;

receive, from the terminal, a first transceiver ID and a first port index for a first subframe successfully decoded by the terminal among the at least one subframe; and identify the position of the terminal based on the first transceiver ID and the first port index.

* * * * *